US011435744B2

US 11,435,744 B2
*Sep. 6, 2022

(12) United States Patent
Cooper

(10) Patent No.: US 11,435,744 B2
(45) Date of Patent: *Sep. 6, 2022

(54) AUTONOMOUSLY DELIVERING ITEMS TO CORRESPONDING DELIVERY LOCATIONS PROXIMATE A DELIVERY ROUTE

(71) Applicant: United Parcel Service of America, Inc., Atlanta, GA (US)

(72) Inventor: Jeffrey Cooper, Marietta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/921,454

(22) Filed: Jul. 6, 2020

(65) Prior Publication Data

US 2020/0333785 A1    Oct. 22, 2020

Related U.S. Application Data

(63) Continuation of application No. 15/621,140, filed on Jun. 13, 2017, now Pat. No. 10,775,792.

(51) Int. Cl.
*G05D 1/02*    (2020.01)
*B64C 39/02*   (2006.01)
(Continued)

(52) U.S. Cl.
CPC ......... *G05D 1/0202* (2013.01); *B64C 39/024* (2013.01); *B64D 1/00* (2013.01);
(Continued)

(58) Field of Classification Search
CPC .............. G05D 1/0202; B64C 39/024; B64C 2201/128; B64C 2201/145; B64D 1/00;
(Continued)

(56) References Cited

U.S. PATENT DOCUMENTS 3,053,480 A    9/1962  Vanderlip
3,526,127 A    9/1970  Sarkis
(Continued)

FOREIGN PATENT DOCUMENTS

CN    101124842 A    2/2008
CN    101260908 A    9/2008
(Continued)

OTHER PUBLICATIONS

LaPierre, Charles M., "Personal Navigation System for the Visually Impaired", Department of Electronics, Faculty of Engineering Carleton University, Senior Project, Sep. 3, 1998, 30 pages.
(Continued)

*Primary Examiner* — Rodney A Bonnette
(74) *Attorney, Agent, or Firm* — Shook, Hardy & Bacon L.L.P.

(57) ABSTRACT

Various systems and methodologies may be utilized to determine whether a particular shipment/item is eligible for delivery between a manual delivery vehicle and a final destination location via an autonomous delivery vehicle. To ensure autonomous deliveries are performed in a resource effective manner, shipments/items deemed eligible for autonomous delivery may be vetted by comparing the destination for the autonomous delivery shipment/item against one or more manual delivery destinations (serviced by the manual delivery vehicle operator), and ultimately identifying an optimal launch location for the autonomous delivery vehicle to leave the manual delivery vehicle to complete the autonomous delivery. If the autonomous delivery location does not satisfy applicable autonomous delivery criteria, the autonomous delivery shipment/item may be reclassified for manual delivery by the manual delivery vehicle operator.

20 Claims, 16 Drawing Sheets

(51) Int. Cl.

| | | |
|---|---|---|
| *G08G 5/02* | (2006.01) | |
| *B64D 1/00* | (2006.01) | |
| *G08G 5/00* | (2006.01) | |
| *G06Q 50/30* | (2012.01) | |
| *G06Q 10/08* | (2012.01) | |
| *G01C 21/20* | (2006.01) | |
| *G06Q 10/04* | (2012.01) | |
| *G01S 17/933* | (2020.01) | |
| *G08G 5/04* | (2006.01) | |
| *G01S 13/935* | (2020.01) | |

(52) U.S. Cl.
CPC ............ *G01C 21/20* (2013.01); *G06Q 10/047* (2013.01); *G06Q 10/08* (2013.01); *G06Q 10/083* (2013.01); *G06Q 50/30* (2013.01); *G08G 5/0013* (2013.01); *G08G 5/0034* (2013.01); *G08G 5/0069* (2013.01); *G08G 5/025* (2013.01); *B64C 2201/128* (2013.01); *B64C 2201/145* (2013.01); *G01S 13/935* (2020.01); *G01S 17/933* (2013.01); *G08G 5/045* (2013.01)

(58) Field of Classification Search
CPC ...... G01C 21/20; G06Q 10/047; G06Q 10/08; G06Q 10/083; G06Q 50/30; G08G 5/0013; G08G 5/0034; G08G 5/0069; G08G 5/025; G08G 5/045; G01S 13/935; G01S 17/933
See application file for complete search history.

(56) References Cited

U.S. PATENT DOCUMENTS

| | | | |
|---|---|---|---|
| 3,591,310 | A | 7/1971 | Mouille |
| 3,986,686 | A | 10/1976 | Girard |
| 4,478,379 | A | 10/1984 | Kerr |
| 4,493,136 | A | 1/1985 | Groutage et al. |
| 4,542,928 | A | 9/1985 | Fowler, Jr. |
| 4,553,719 | A | 11/1985 | Ott |
| 4,609,167 | A | 9/1986 | Dean et al. |
| 4,626,993 | A | 12/1986 | Okuyama et al. |
| 4,773,011 | A | 9/1988 | VanHoose |
| 4,777,416 | A | 10/1988 | Georg et al. |
| 4,795,111 | A | 1/1989 | Moller |
| 4,809,540 | A | 3/1989 | Lackner et al. |
| 4,842,218 | A | 6/1989 | Groutage et al. |
| 4,945,759 | A | 8/1990 | Krofchalk et al. |
| 4,992,947 | A | 2/1991 | Nimura et al. |
| 5,041,976 | A | 8/1991 | Marko et al. |
| 5,060,156 | A | 10/1991 | Vajgart et al. |
| 5,170,353 | A | 12/1992 | Verstraete |
| 5,272,638 | A | 12/1993 | Martin et al. |
| 5,470,233 | A | 11/1995 | Fruchterman et al. |
| 5,474,259 | A | 12/1995 | De Forges De Parny et al. |
| 5,491,631 | A | 2/1996 | Shirane et al. |
| 5,544,061 | A | 8/1996 | Morimoto et al. |
| 5,559,707 | A | 9/1996 | DeLorme et al. |
| 5,587,911 | A | 12/1996 | Asano et al. |
| 5,680,312 | A | 10/1997 | Oshizawa et al. |
| 5,774,828 | A | 6/1998 | Brunts et al. |
| 5,798,733 | A | 8/1998 | Ethridge |
| 5,802,492 | A | 9/1998 | DeLorme et al. |
| 5,815,093 | A | 9/1998 | Kikinis |
| 5,831,860 | A | 11/1998 | Foladare et al. |
| 5,874,905 | A | 2/1999 | Nanba et al. |
| 5,887,269 | A | 3/1999 | Brunts et al. |
| 5,890,441 | A | 4/1999 | Swinso et al. |
| 5,896,968 | A | 4/1999 | Bruntz |
| 5,928,291 | A | 7/1999 | Jenkins et al. |
| 5,931,888 | A | 8/1999 | Hiyokawa |
| 5,968,109 | A | 10/1999 | Israni et al. |
| 5,987,381 | A | 11/1999 | Oshizawa |
| 6,002,981 | A | 12/1999 | Kreft |
| 6,056,237 | A | 5/2000 | Woodland |
| 6,064,941 | A | 5/2000 | Nimura et al. |
| 6,084,870 | A | 7/2000 | Wooten et al. |
| 6,091,325 | A | 7/2000 | Zur et al. |
| 6,092,021 | A | 7/2000 | Ehlbeck et al. |
| 6,108,603 | A | 8/2000 | Karunanidhi |
| 6,112,152 | A | 8/2000 | Tuttle |
| 6,112,200 | A | 8/2000 | Livshutz et al. |
| 6,115,669 | A | 9/2000 | Watanabe et al. |
| 6,163,748 | A | 12/2000 | Guenther |
| 6,178,377 | B1 | 1/2001 | Ishihara et al. |
| 6,181,994 | B1 | 1/2001 | Colson et al. |
| 6,201,544 | B1 | 3/2001 | Ezaki |
| 6,232,915 | B1 | 5/2001 | Dean et al. |
| 6,249,740 | B1 | 6/2001 | Ito et al. |
| 6,253,129 | B1 | 6/2001 | Jenkins et al. |
| 6,270,038 | B1 | 8/2001 | Cycon et al. |
| 6,282,489 | B1 | 8/2001 | Bellesfield et al. |
| 6,301,531 | B1 | 10/2001 | Pierro et al. |
| 6,306,063 | B1 | 10/2001 | Horgan et al. |
| 6,321,158 | B1 | 11/2001 | DeLorme et al. |
| 6,324,659 | B1 | 11/2001 | Pierro |
| 6,330,499 | B1 | 12/2001 | Chou et al. |
| 6,336,073 | B1 | 1/2002 | Ihara et al. |
| 6,338,152 | B1 | 1/2002 | Fera et al. |
| 6,356,838 | B1 | 3/2002 | Paul |
| 6,389,337 | B1 | 5/2002 | Kolls |
| 6,411,891 | B1 | 6/2002 | Jones |
| 6,421,605 | B1 | 7/2002 | Steiner et al. |
| 6,424,157 | B1 | 7/2002 | Gollomp et al. |
| 6,438,471 | B1 | 8/2002 | Katagishi et al. |
| 6,456,933 | B1 | 9/2002 | Hessing |
| 6,459,969 | B1 | 10/2002 | Bates et al. |
| 6,459,986 | B1 | 10/2002 | Boyce et al. |
| 6,462,675 | B1 | 10/2002 | Humphrey et al. |
| 6,463,343 | B1 | 10/2002 | Emens et al. |
| 6,484,080 | B2 | 11/2002 | Breed |
| 6,498,982 | B2 | 12/2002 | Bellesfield et al. |
| 6,498,986 | B1 | 12/2002 | Kurtzberg et al. |
| 6,509,749 | B1 | 1/2003 | Buelna et al. |
| 6,525,672 | B2 | 2/2003 | Chainer et al. |
| 6,549,833 | B2 | 4/2003 | Katagishi et al. |
| 6,553,816 | B1 | 4/2003 | Palanisamy et al. |
| 6,571,213 | B1 | 5/2003 | Altendahl et al. |
| 6,577,937 | B1 | 6/2003 | Shuman et al. |
| 6,581,004 | B2 | 6/2003 | Mori et al. |
| 6,587,785 | B2 | 7/2003 | Jijina et al. |
| 6,594,579 | B1 | 7/2003 | Lowrey et al. |
| 6,598,748 | B2 | 7/2003 | Mileaf et al. |
| 6,604,033 | B1 | 8/2003 | Banet et al. |
| 6,609,051 | B2 | 8/2003 | Fiechter et al. |
| 6,611,740 | B2 | 8/2003 | Lowrey et al. |
| 6,636,790 | B1 | 10/2003 | Lightner et al. |
| 6,651,034 | B1 | 11/2003 | Hedlund et al. |
| 6,662,091 | B2 | 12/2003 | Wilson et al. |
| 6,675,635 | B2 | 1/2004 | Kasen et al. |
| 6,708,926 | B2 | 3/2004 | Bonisch |
| 6,732,031 | B1 | 5/2004 | Lightner et al. |
| 6,732,063 | B2 | 5/2004 | Famili et al. |
| 6,735,504 | B2 | 5/2004 | Katagishi et al. |
| 6,735,506 | B2 | 5/2004 | Breed et al. |
| 6,738,697 | B2 | 5/2004 | Breed |
| 6,741,927 | B2 | 5/2004 | Jones |
| 6,741,938 | B2 | 5/2004 | Berndorfer |
| 6,748,318 | B1 | 6/2004 | Jones |
| 6,754,582 | B1 | 6/2004 | Smith et al. |
| 6,763,299 | B2 | 7/2004 | Jones |
| 6,775,642 | B2 | 8/2004 | Remboski et al. |
| 6,804,606 | B2 | 10/2004 | Jones |
| 6,812,888 | B2 | 11/2004 | Drury et al. |
| 6,813,559 | B1 | 11/2004 | Bodin et al. |
| 6,819,988 | B2 | 11/2004 | Dietz et al. |
| 6,840,093 | B2 | 1/2005 | Kasen et al. |
| 6,845,939 | B1 | 1/2005 | Baldwin |
| 6,847,871 | B2 | 1/2005 | Malik et al. |
| 6,850,824 | B2 | 2/2005 | Breed |
| 6,857,262 | B2 | 2/2005 | Rendahl et al. |
| 6,859,039 | B2 | 2/2005 | Horie et al. |
| 6,859,722 | B2 | 2/2005 | Jones |

(56) References Cited

U.S. PATENT DOCUMENTS

| | | |
|---|---|---|
| 6,904,359 B2 | 6/2005 | Jones |
| 6,911,830 B2 | 6/2005 | Heremans et al. |
| 6,920,779 B2 | 7/2005 | Carlstrom et al. |
| 6,937,992 B1 | 8/2005 | Benda et al. |
| 6,947,827 B2 | 9/2005 | Fuse et al. |
| 6,970,183 B1 | 11/2005 | Monroe |
| 6,975,938 B2 | 12/2005 | Odagawa et al. |
| 6,980,885 B2 | 12/2005 | Ye et al. |
| 6,988,026 B2 | 1/2006 | Breed et al. |
| 7,016,774 B2 | 3/2006 | Barber et al. |
| 7,050,897 B2 | 5/2006 | Breed et al. |
| 7,059,566 B2 | 6/2006 | Byers et al. |
| 7,075,421 B1 | 7/2006 | Tuttle |
| 7,082,359 B2 | 7/2006 | Breed |
| 7,089,099 B2 | 8/2006 | Shostak et al. |
| 7,089,110 B2 | 8/2006 | Pechatnikov et al. |
| 7,089,784 B2 | 8/2006 | Jakoby et al. |
| 7,103,460 B1 | 9/2006 | Breed |
| 7,133,804 B2 | 11/2006 | Tonack et al. |
| 7,146,264 B2 | 12/2006 | Bates et al. |
| 7,155,321 B2 | 12/2006 | Bromley et al. |
| 7,197,500 B1 | 3/2007 | Israni et al. |
| 7,212,976 B2 | 5/2007 | Scheer |
| 7,216,037 B2 | 5/2007 | Graulich et al. |
| 7,228,232 B2 | 6/2007 | Bodin et al. |
| 7,231,294 B2 | 6/2007 | Bodin et al. |
| 7,251,612 B1 | 7/2007 | Parker et al. |
| 7,257,396 B2 | 8/2007 | Olsen et al. |
| 7,286,913 B2 | 10/2007 | Bodin et al. |
| 7,295,924 B2 | 11/2007 | Smith et al. |
| 7,299,125 B2 | 11/2007 | Marks et al. |
| 7,313,467 B2 | 12/2007 | Breed et al. |
| 7,317,975 B2 | 1/2008 | Woolford et al. |
| 7,324,666 B2 | 1/2008 | Zoken et al. |
| 7,373,244 B2 | 5/2008 | Kreft |
| 7,376,497 B2 | 5/2008 | Chen |
| 7,378,940 B2 | 5/2008 | Jenney et al. |
| 7,379,800 B2 | 5/2008 | Breed |
| 7,383,125 B2 | 6/2008 | de Silva et al. |
| 7,400,954 B2 | 7/2008 | Sumcad et al. |
| 7,408,453 B2 | 8/2008 | Breed |
| 7,417,547 B2 | 8/2008 | Kennedy |
| 7,418,320 B1 | 8/2008 | Bodin et al. |
| 7,421,321 B2 | 9/2008 | Breed et al. |
| 7,444,210 B2 | 10/2008 | Breed et al. |
| 7,457,693 B2 | 11/2008 | Olsen et al. |
| 7,467,034 B2 | 12/2008 | Breed et al. |
| 7,469,183 B2 | 12/2008 | Bodin et al. |
| 7,480,551 B1 | 1/2009 | Lowrey et al. |
| 7,486,181 B2 | 2/2009 | Olsen et al. |
| 7,527,288 B2 | 5/2009 | Breed |
| 7,555,370 B2 | 6/2009 | Breed et al. |
| 7,573,386 B2 | 8/2009 | Lahiri |
| 7,575,197 B2 | 8/2009 | McCoskey et al. |
| 7,580,782 B2 | 8/2009 | Breed et al. |
| 7,587,345 B2 | 9/2009 | Mann et al. |
| 7,603,894 B2 | 10/2009 | Breed |
| 7,624,024 B2 | 11/2009 | Levis et al. |
| 7,630,802 B2 | 12/2009 | Breed |
| 7,633,379 B2 | 12/2009 | Jenney et al. |
| 7,643,797 B2 | 1/2010 | Ban et al. |
| 7,650,210 B2 | 1/2010 | Breed |
| 7,657,354 B2 | 2/2010 | Breed et al. |
| 7,660,577 B2 | 2/2010 | Radosta et al. |
| 7,660,666 B2 | 2/2010 | Finn et al. |
| 7,663,502 B2 | 2/2010 | Breed |
| 7,667,604 B2 | 2/2010 | Ebert et al. |
| 7,672,756 B2 | 3/2010 | Breed |
| 7,693,626 B2 | 4/2010 | Breed et al. |
| 7,706,937 B2 | 4/2010 | Hasegawa et al. |
| 7,715,961 B1 | 5/2010 | Kargupta |
| 7,734,390 B2 | 6/2010 | Chen |
| 7,737,857 B2 | 6/2010 | Ebert et al. |
| 7,760,080 B2 | 7/2010 | Breed et al. |
| 7,782,208 B2 | 8/2010 | Kennedy |
| 7,786,864 B1 | 8/2010 | Shostak et al. |
| 7,797,104 B2 | 9/2010 | Finn et al. |
| 7,880,594 B2 | 2/2011 | Breed et al. |
| 7,889,096 B2 | 2/2011 | Breed |
| 7,969,306 B2 | 6/2011 | Ebert et al. |
| 8,036,788 B2 | 10/2011 | Breed |
| 8,108,321 B2 | 1/2012 | Neal et al. |
| 8,131,301 B1 | 3/2012 | Ahmed et al. |
| 8,179,257 B2 | 5/2012 | Allen, Jr. et al. |
| 8,326,315 B2 | 12/2012 | Phillips et al. |
| 8,406,757 B1 | 3/2013 | Singh et al. |
| 8,442,682 B2 | 5/2013 | Wagner |
| 8,447,804 B2 | 5/2013 | Bai et al. |
| 8,510,043 B1 | 8/2013 | Whiton et al. |
| 8,511,606 B1 | 8/2013 | Lutke et al. |
| 8,515,580 B2 | 8/2013 | Taylor et al. |
| 8,571,781 B2 | 10/2013 | Bernstein et al. |
| 8,599,023 B2 | 12/2013 | Leggett, Jr. et al. |
| 8,639,543 B2 | 1/2014 | Boss et al. |
| 8,645,189 B2 | 2/2014 | Lyle |
| 8,670,933 B2 | 3/2014 | Schenken et al. |
| 8,686,841 B2 | 4/2014 | Macheca et al. |
| 8,738,423 B2 | 5/2014 | Lyle |
| 8,794,564 B2 | 8/2014 | Hutson |
| 8,897,953 B2 | 11/2014 | Olse et al. |
| 8,899,903 B1 | 12/2014 | Saad et al. |
| 8,909,391 B1 | 12/2014 | Peeters et al. |
| 8,930,044 B1 | 1/2015 | Peeters et al. |
| 8,948,935 B1 | 2/2015 | Peeters et al. |
| 8,950,698 B1 | 2/2015 | Rossi |
| 8,973,814 B2 | 3/2015 | Wilke et al. |
| 8,983,682 B1 | 3/2015 | Peeters et al. |
| 8,989,922 B2 | 3/2015 | Jones et al. |
| 9,004,396 B1 | 4/2015 | Colin et al. |
| 9,051,043 B1 | 6/2015 | Peeters et al. |
| 9,056,676 B1 | 6/2015 | Wang |
| 9,082,100 B2 | 7/2015 | Hurley et al. |
| 9,087,451 B1 | 7/2015 | Jarrell |
| 9,109,904 B2 | 8/2015 | Forstall et al. |
| 9,125,987 B2 | 9/2015 | Levien et al. |
| 9,139,310 B1 | 9/2015 | Wang |
| 9,146,557 B1 | 9/2015 | Ahmed et al. |
| 9,147,173 B2 | 9/2015 | Jones et al. |
| 9,147,260 B2 | 9/2015 | Hampapur et al. |
| 9,164,509 B2 | 10/2015 | Kim et al. |
| 9,170,117 B1 | 10/2015 | Abuelsaad et al. |
| 9,171,340 B2 | 10/2015 | Leggett, Jr. et al. |
| 9,174,733 B1 | 11/2015 | Burgess et al. |
| 9,174,738 B1 | 11/2015 | Roach et al. |
| 9,205,922 B1 | 12/2015 | Bouwer |
| 9,211,025 B1 | 12/2015 | Elhawwashy |
| 9,222,781 B2 | 12/2015 | Schenken et al. |
| 9,235,213 B2 | 1/2016 | Villamar |
| 9,244,147 B1 | 1/2016 | Soundararajan et al. |
| 9,245,183 B2 | 1/2016 | Haas et al. |
| 9,254,363 B2 | 2/2016 | Levien et al. |
| 9,256,852 B1 | 2/2016 | Myllymaki |
| 9,260,244 B1 | 2/2016 | Cohn |
| 9,262,929 B1 | 2/2016 | Roy et al. |
| 9,272,743 B2 | 3/2016 | Thielman |
| 9,273,981 B1 | 3/2016 | Downey et al. |
| 9,280,038 B1 | 3/2016 | Pan et al. |
| 9,284,062 B2 | 3/2016 | Wang |
| 9,310,518 B2 | 4/2016 | Haas et al. |
| 9,311,820 B2 | 4/2016 | Batla et al. |
| 9,317,659 B2 | 4/2016 | Balinski et al. |
| 9,321,531 B1 | 4/2016 | Takayama et al. |
| 9,323,895 B2 | 4/2016 | Balinski et al. |
| 9,346,547 B2 | 5/2016 | Patrick et al. |
| 9,354,296 B2 | 5/2016 | Ubhi et al. |
| 9,359,074 B2 | 6/2016 | Ganesh et al. |
| 9,363,008 B2 | 6/2016 | Boss et al. |
| 9,373,136 B2 | 6/2016 | Leggett et al. |
| 9,373,149 B2 | 6/2016 | Abhyanker |
| 9,376,208 B1 | 6/2016 | Gentry |
| 9,377,781 B1 | 6/2016 | Lee et al. |
| 9,384,668 B2 | 7/2016 | Raptopoulos et al. |
| 9,387,927 B2 | 7/2016 | Rischmuller et al. |
| 9,387,928 B1 | 7/2016 | Gentry et al. |

(56) References Cited

U.S. PATENT DOCUMENTS

| | | |
|---|---|---|
| 9,405,292 B2 | 8/2016 | Nagasawa |
| 9,412,279 B2 | 8/2016 | Kantor et al. |
| 9,412,280 B1 | 8/2016 | Zwillinger et al. |
| 9,420,562 B1 | 8/2016 | Cai et al. |
| 9,421,869 B1 | 8/2016 | Ananthanarayanan et al. |
| 9,421,972 B2 | 8/2016 | Davidsson et al. |
| 9,422,139 B1 | 8/2016 | Bialkowski et al. |
| 9,447,448 B1 | 9/2016 | Kozloski et al. |
| 9,448,562 B1 | 9/2016 | Sirang et al. |
| 9,452,820 B1 | 9/2016 | Wirth |
| 9,454,151 B2 | 9/2016 | Srivastava et al. |
| 9,454,157 B1 | 9/2016 | Hafeez et al. |
| 9,459,620 B1 | 10/2016 | Schaffalitzky |
| 9,459,622 B2 | 10/2016 | Abhyanker |
| 9,460,616 B1 | 10/2016 | Miyahira et al. |
| 9,463,875 B2 | 10/2016 | Abuelsaad et al. |
| 9,466,154 B2 | 10/2016 | Akselrod et al. |
| 9,467,839 B1 | 10/2016 | Nishimura et al. |
| 9,471,062 B1 | 10/2016 | Theobald |
| 9,471,064 B1 | 10/2016 | Boland et al. |
| 9,472,027 B2 | 10/2016 | Akselrod et al. |
| 9,481,458 B2 | 11/2016 | Casado Magana et al. |
| 9,481,460 B1 | 11/2016 | Kozloski et al. |
| 9,488,979 B1 | 11/2016 | Chambers et al. |
| 9,489,852 B1 | 11/2016 | Chambers et al. |
| 9,494,937 B2 | 11/2016 | Siegel et al. |
| 9,510,316 B2 | 11/2016 | Skaaksrud |
| 9,513,136 B2 | 12/2016 | Santilli et al. |
| 9,523,986 B1 | 12/2016 | Abebe et al. |
| 9,534,917 B2 | 1/2017 | Abuelsaad et al. |
| 9,561,852 B1 | 2/2017 | Beaman et al. |
| 9,567,081 B1 | 2/2017 | Beckman et al. |
| 9,576,482 B2 | 2/2017 | Yamamoto |
| 9,582,719 B2 | 2/2017 | Haas et al. |
| 9,584,977 B2 | 2/2017 | Yamamoto |
| 9,593,806 B2 | 3/2017 | Allen, Jr. et al. |
| 9,600,997 B1 | 3/2017 | Abrahams et al. |
| 9,613,274 B2 | 4/2017 | Stevens et al. |
| 9,623,969 B2 | 4/2017 | Nelson |
| 9,629,161 B2 | 4/2017 | Hopkins et al. |
| 9,637,233 B2 | 5/2017 | Bivens et al. |
| 9,646,493 B2 | 5/2017 | Yamamoto |
| 9,651,945 B1 | 5/2017 | Erickson et al. |
| 9,654,928 B2 | 5/2017 | Cai et al. |
| 9,659,502 B1 | 5/2017 | Abebe et al. |
| 9,659,503 B2 | 5/2017 | Gordon et al. |
| 9,665,992 B2 | 5/2017 | Akselrod et al. |
| 9,669,927 B2 | 6/2017 | Hodge et al. |
| 9,699,622 B1 | 7/2017 | Nishimura et al. |
| 9,702,830 B1 | 7/2017 | Akselrod et al. |
| 9,718,564 B1 | 8/2017 | Beckman et al. |
| 9,731,821 B2 | 8/2017 | Hoareau et al. |
| 9,734,684 B2 | 8/2017 | Bryson et al. |
| 9,734,725 B2 | 8/2017 | Gordon et al. |
| 9,773,398 B2 | 9/2017 | Abrahams et al. |
| 9,817,396 B1 | 11/2017 | Takayama et al. |
| 9,957,048 B2 | 5/2018 | Gil |
| 9,969,495 B2 | 5/2018 | Gil |
| 9,981,745 B2 | 5/2018 | Gil |
| 10,131,428 B1 | 11/2018 | Sopper et al. |
| 10,202,192 B2 | 2/2019 | Gil et al. |
| 10,255,577 B1 | 4/2019 | Steves et al. |
| 10,453,022 B2 | 10/2019 | Gil |
| 10,460,281 B2 | 10/2019 | Gil |
| 10,706,384 B1 | 6/2020 | Bolton et al. |
| 10,706,382 B2 | 7/2020 | Gil |
| 10,730,626 B2 | 8/2020 | Gil et al. |
| 10,796,269 B2 | 10/2020 | Gil et al. |
| 10,860,971 B2 | 12/2020 | Gil et al. |
| 2002/0049535 A1 | 4/2002 | Rigo et al. |
| 2002/0052688 A1 | 5/2002 | Yofu |
| 2002/0165665 A1 | 11/2002 | Kim |
| 2002/0188392 A1 | 12/2002 | Breed et al. |
| 2003/0009270 A1 | 1/2003 | Breed |
| 2003/0020623 A1 | 1/2003 | Cao et al. |
| 2003/0055666 A1 | 3/2003 | Roddy et al. |
| 2003/0065771 A1 | 4/2003 | Cramer et al. |
| 2003/0093199 A1 | 5/2003 | Mavreas |
| 2003/0137426 A1 | 7/2003 | Anthony et al. |
| 2003/0208309 A1 | 11/2003 | Triphathi |
| 2004/0024502 A1 | 2/2004 | Squires et al. |
| 2004/0039509 A1 | 2/2004 | Breed |
| 2004/0044452 A1 | 3/2004 | Bauer et al. |
| 2004/0078125 A1 | 4/2004 | Woodard et al. |
| 2004/0130442 A1 | 7/2004 | Breed et al. |
| 2004/0152485 A1 | 8/2004 | Deeds |
| 2004/0158398 A1 | 8/2004 | Chen et al. |
| 2004/0167689 A1 | 8/2004 | Bromley et al. |
| 2004/0174264 A1 | 9/2004 | Reisman et al. |
| 2004/0215382 A1 | 10/2004 | Breed et al. |
| 2004/0243430 A1 | 12/2004 | Horstemeyer |
| 2004/0249519 A1 | 12/2004 | Frink |
| 2005/0038581 A1 | 2/2005 | Kapolka et al. |
| 2005/0051623 A1 | 3/2005 | Okuda et al. |
| 2005/0082421 A1 | 4/2005 | Perlo et al. |
| 2005/0101268 A1 | 5/2005 | Radosta et al. |
| 2005/0107993 A1 | 5/2005 | Cuthbert et al. |
| 2005/0125117 A1 | 6/2005 | Breed |
| 2005/0137789 A1 | 6/2005 | Furukawa |
| 2005/0192727 A1 | 9/2005 | Shostak et al. |
| 2005/0222723 A1 | 10/2005 | Estes et al. |
| 2005/0273218 A1 | 12/2005 | Breed et al. |
| 2006/0015503 A1 | 1/2006 | Simons et al. |
| 2006/0025897 A1 | 2/2006 | Shostak et al. |
| 2006/0031042 A1 | 2/2006 | Ogura et al. |
| 2006/0055564 A1 | 3/2006 | Olsen et al. |
| 2006/0069473 A1 | 3/2006 | Sumcad et al. |
| 2006/0142934 A1 | 6/2006 | Kim |
| 2006/0180371 A1 | 8/2006 | Breed et al. |
| 2006/0212193 A1 | 9/2006 | Breed |
| 2006/0212194 A1 | 9/2006 | Breed |
| 2006/0235739 A1 | 10/2006 | Levis et al. |
| 2006/0243043 A1 | 11/2006 | Breed |
| 2006/0244581 A1 | 11/2006 | Breed et al. |
| 2006/0270421 A1 | 11/2006 | Phillips et al. |
| 2006/0271246 A1 | 11/2006 | Bell et al. |
| 2006/0284839 A1 | 12/2006 | Breed et al. |
| 2007/0005202 A1 | 1/2007 | Breed |
| 2007/0057781 A1 | 3/2007 | Breed |
| 2007/0060084 A1 | 3/2007 | Thompson et al. |
| 2007/0075919 A1 | 4/2007 | Breed |
| 2007/0096565 A1 | 5/2007 | Breed et al. |
| 2007/0103284 A1 | 5/2007 | Chew et al. |
| 2007/0124040 A1 | 5/2007 | Chen |
| 2007/0126561 A1 | 6/2007 | Breed |
| 2007/0139216 A1 | 6/2007 | Breed |
| 2007/0156312 A1 | 7/2007 | Breed et al. |
| 2007/0173991 A1 | 7/2007 | Tenzer et al. |
| 2007/0174004 A1 | 7/2007 | Tenzer et al. |
| 2007/0205881 A1 | 9/2007 | Breed |
| 2007/0239346 A1 | 10/2007 | Hawkins et al. |
| 2007/0250264 A1 | 10/2007 | Sekine et al. |
| 2007/0271014 A1 | 11/2007 | Breed |
| 2007/0299587 A1 | 12/2007 | Breed et al. |
| 2008/0004764 A1 | 1/2008 | Chinnadurai et al. |
| 2008/0021604 A1 | 1/2008 | Bouvier et al. |
| 2008/0021642 A1 | 1/2008 | Furukawa |
| 2008/0032666 A1 | 2/2008 | Hughes et al. |
| 2008/0040005 A1 | 2/2008 | Breed |
| 2008/0042410 A1 | 2/2008 | Breed et al. |
| 2008/0046149 A1 | 2/2008 | Breed |
| 2008/0065290 A1 | 3/2008 | Breed et al. |
| 2008/0086240 A1 | 4/2008 | Breed |
| 2008/0114502 A1 | 5/2008 | Breed et al. |
| 2008/0129475 A1 | 6/2008 | Breed et al. |
| 2008/0140278 A1 | 6/2008 | Breed |
| 2008/0147265 A1 | 6/2008 | Breed |
| 2008/0147271 A1 | 6/2008 | Breed |
| 2008/0154458 A1 | 6/2008 | Brandstetter et al. |
| 2008/0161989 A1 | 7/2008 | Breed |
| 2008/0162034 A1 | 7/2008 | Breen |
| 2008/0174485 A1 | 7/2008 | Carani et al. |
| 2008/0214235 A1 | 9/2008 | Sagou et al. |
| 2008/0216567 A1 | 9/2008 | Breed |

(56) References Cited

U.S. PATENT DOCUMENTS

| | | |
|---|---|---|
| 2008/0221776 A1 | 9/2008 | McClellan |
| 2008/0284575 A1 | 11/2008 | Breed |
| 2008/0291022 A1 | 11/2008 | Amador et al. |
| 2009/0030999 A1 | 1/2009 | Gatzke et al. |
| 2009/0043441 A1 | 2/2009 | Breed |
| 2009/0051566 A1 | 2/2009 | Olsen et al. |
| 2009/0055045 A1 | 2/2009 | Biswas et al. |
| 2009/0100031 A1 | 4/2009 | Gilligan et al. |
| 2009/0102638 A1 | 4/2009 | Olsen et al. |
| 2009/0191849 A1 | 7/2009 | Fioretti et al. |
| 2009/0197584 A1 | 8/2009 | Snow et al. |
| 2009/0232358 A1 | 9/2009 | Cross |
| 2009/0243925 A1 | 10/2009 | Kellermeier et al. |
| 2009/0259358 A1 | 10/2009 | Andreasen |
| 2009/0271722 A1 | 10/2009 | Park |
| 2010/0009712 A1 | 1/2010 | Kodama |
| 2010/0023203 A1 | 1/2010 | Shibi |
| 2010/0030466 A1 | 2/2010 | Rogers et al. |
| 2010/0094688 A1 | 4/2010 | Olsen et al. |
| 2010/0094769 A1 | 4/2010 | Davidson et al. |
| 2010/0100315 A1 | 4/2010 | Davidson et al. |
| 2010/0100507 A1 | 4/2010 | Davidson et al. |
| 2010/0138701 A1 | 6/2010 | Costantino |
| 2010/0148947 A1 | 6/2010 | Morgan et al. |
| 2010/0174446 A1 | 7/2010 | Andreasen et al. |
| 2010/0207754 A1 | 8/2010 | Shostak et al. |
| 2010/0217480 A1 | 8/2010 | Link, II |
| 2010/0289644 A1 | 11/2010 | Slavin et al. |
| 2011/0025496 A1 | 2/2011 | Cova et al. |
| 2011/0084162 A1 | 4/2011 | Goossen et al. |
| 2011/0106362 A1 | 5/2011 | Seitz |
| 2011/0118932 A1 | 5/2011 | Singh et al. |
| 2011/0153645 A1 | 6/2011 | Hoover et al. |
| 2011/0224898 A1 | 9/2011 | Scofield et al. |
| 2011/0294521 A1 | 12/2011 | Freathy et al. |
| 2012/0030133 A1 | 2/2012 | Rademaker |
| 2012/0091259 A1 | 4/2012 | Morris et al. |
| 2012/0104151 A1 | 5/2012 | Mccann |
| 2012/0136743 A1 | 5/2012 | Mcquade et al. |
| 2012/0154579 A1 | 6/2012 | Hampapur et al. |
| 2012/0232743 A1 | 9/2012 | Singh |
| 2012/0239243 A1 | 9/2012 | Medwin et al. |
| 2012/0253548 A1 | 10/2012 | Davidson |
| 2012/0257519 A1 | 10/2012 | Frank et al. |
| 2013/0059626 A1 | 3/2013 | Hopkins et al. |
| 2013/0231130 A1 | 9/2013 | Cherian et al. |
| 2013/0240673 A1 | 9/2013 | Schlosser et al. |
| 2013/0304349 A1 | 11/2013 | Davidson |
| 2013/0325320 A1 | 12/2013 | Dimitriadis |
| 2013/0331127 A1 | 12/2013 | Sabatelli et al. |
| 2013/0345961 A1 | 12/2013 | Leader et al. |
| 2014/0032034 A1 | 1/2014 | Raptopoulos et al. |
| 2014/0061376 A1 | 3/2014 | Fisher et al. |
| 2014/0110527 A1 | 4/2014 | Sing |
| 2014/0121959 A1 | 5/2014 | Hurley et al. |
| 2014/0128103 A1 | 5/2014 | Joao et al. |
| 2014/0129059 A1 | 5/2014 | Scarlatti et al. |
| 2014/0143171 A1 | 5/2014 | Hurley et al. |
| 2014/0149244 A1 | 5/2014 | Abhyanker |
| 2014/0150806 A1 | 6/2014 | Hu et al. |
| 2014/0172194 A1 | 6/2014 | Levien et al. |
| 2014/0180914 A1 | 6/2014 | Abhyanker |
| 2014/0192667 A1 | 7/2014 | Kalapatapu et al. |
| 2014/0192737 A1 | 7/2014 | Belghoul et al. |
| 2014/0206400 A1 | 7/2014 | De Vries |
| 2014/0217230 A1 | 8/2014 | Helou, Jr. |
| 2014/0254896 A1 | 9/2014 | Zhou et al. |
| 2014/0280865 A1 | 9/2014 | Albertson et al. |
| 2014/0316243 A1 | 10/2014 | Niedermeyer |
| 2014/0358437 A1 | 12/2014 | Fletcher |
| 2014/0372025 A1 | 12/2014 | Yoshida |
| 2015/0006005 A1 | 1/2015 | Yu et al. |
| 2015/0012154 A1 | 1/2015 | Senkel et al. |
| 2015/0081587 A1 | 3/2015 | Gillen |
| 2015/0120094 A1 | 4/2015 | Kimchi et al. |
| 2015/0154540 A1 | 6/2015 | Skaaksrud |
| 2015/0154559 A1 | 6/2015 | Barbush et al. |
| 2015/0158599 A1 | 6/2015 | Sisko |
| 2015/0178649 A1 | 6/2015 | Furman et al. |
| 2015/0183528 A1 | 7/2015 | Walsh et al. |
| 2015/0189655 A1 | 7/2015 | Hopkins et al. |
| 2015/0259078 A1 | 9/2015 | Filipovic et al. |
| 2015/0284076 A1 | 10/2015 | Cacciaguera |
| 2015/0284079 A1 | 10/2015 | Matsuda |
| 2015/0286216 A1 | 10/2015 | Miwa |
| 2015/0305077 A1 | 10/2015 | Johnsson et al. |
| 2015/0307191 A1 | 10/2015 | Samuel et al. |
| 2015/0323932 A1 | 11/2015 | Paduano et al. |
| 2015/0336667 A1 | 11/2015 | Srivastava et al. |
| 2015/0360777 A1 | 12/2015 | Mottale |
| 2015/0363843 A1 | 12/2015 | Loppatto et al. |
| 2015/0370251 A1 | 12/2015 | Siegel et al. |
| 2015/0375398 A1 | 12/2015 | Penn et al. |
| 2016/0003637 A1 | 1/2016 | Andersen |
| 2016/0009392 A1 | 1/2016 | Korhonen et al. |
| 2016/0011592 A1 | 1/2016 | Zhang et al. |
| 2016/0016652 A1 | 1/2016 | Barrett et al. |
| 2016/0016664 A1 | 1/2016 | Basuni |
| 2016/0023743 A1 | 1/2016 | Barrett et al. |
| 2016/0027307 A1 | 1/2016 | Abhyanker et al. |
| 2016/0033966 A1 | 2/2016 | Farris et al. |
| 2016/0039541 A1 | 2/2016 | Beardsley et al. |
| 2016/0068264 A1 | 3/2016 | Ganesh et al. |
| 2016/0068265 A1 | 3/2016 | Hoareau et al. |
| 2016/0083110 A1 | 3/2016 | Pan et al. |
| 2016/0086494 A1 | 3/2016 | Anandayuvaraj et al. |
| 2016/0096622 A1 | 4/2016 | Richardson |
| 2016/0101874 A1 | 4/2016 | Mckinnon et al. |
| 2016/0107750 A1 | 4/2016 | Yates |
| 2016/0114887 A1 | 4/2016 | Zhou et al. |
| 2016/0115702 A1 | 4/2016 | Nordbruch et al. |
| 2016/0130000 A1 | 5/2016 | Rimanelli |
| 2016/0137293 A1 | 5/2016 | Santangelo |
| 2016/0137304 A1 | 5/2016 | Phan et al. |
| 2016/0137311 A1 | 5/2016 | Peverill et al. |
| 2016/0140496 A1 | 5/2016 | Simms et al. |
| 2016/0140851 A1 | 5/2016 | Levy et al. |
| 2016/0144734 A1 | 5/2016 | Wang et al. |
| 2016/0144982 A1 | 5/2016 | Sugumaran |
| 2016/0157653 A1 | 6/2016 | Manitta |
| 2016/0159472 A1 | 6/2016 | Chan et al. |
| 2016/0163205 A1 | 6/2016 | Jenkins |
| 2016/0167778 A1 | 6/2016 | Meringer et al. |
| 2016/0178803 A1 | 6/2016 | Haas et al. |
| 2016/0185466 A1 | 6/2016 | Dreano, Jr. |
| 2016/0189101 A1 | 6/2016 | Kantor et al. |
| 2016/0189549 A1 | 6/2016 | Marcus |
| 2016/0191142 A1 | 6/2016 | Boss et al. |
| 2016/0196756 A1 | 7/2016 | Prakash et al. |
| 2016/0200207 A1 | 7/2016 | Lee et al. |
| 2016/0200438 A1 | 7/2016 | Bokeno et al. |
| 2016/0207627 A1 | 7/2016 | Hoareau et al. |
| 2016/0209839 A1 | 7/2016 | Hoareau et al. |
| 2016/0214713 A1 | 7/2016 | Cragg |
| 2016/0214714 A1 | 7/2016 | Sekelsky |
| 2016/0214717 A1 | 7/2016 | De Silva |
| 2016/0221186 A1 | 8/2016 | Perrone |
| 2016/0221683 A1 | 8/2016 | Roberts et al. |
| 2016/0225263 A1 | 8/2016 | Salentiny et al. |
| 2016/0229299 A1 | 8/2016 | Streett |
| 2016/0229534 A1 | 8/2016 | Hutson |
| 2016/0239798 A1 | 8/2016 | Borley et al. |
| 2016/0244162 A1 | 8/2016 | Weller |
| 2016/0244187 A1 | 8/2016 | Byers et al. |
| 2016/0253908 A1 | 9/2016 | Chambers et al. |
| 2016/0257401 A1 | 9/2016 | Buchmueller et al. |
| 2016/0257423 A1 | 9/2016 | Martin |
| 2016/0257424 A1 | 9/2016 | Stabler et al. |
| 2016/0257426 A1 | 9/2016 | Mozer |
| 2016/0272308 A1 | 9/2016 | Gentry |
| 2016/0272312 A1 | 9/2016 | Mallard |
| 2016/0272316 A1 | 9/2016 | Nelson |
| 2016/0280075 A1 | 9/2016 | McGrady |
| 2016/0280371 A1 | 9/2016 | Canavor et al. |

(56) References Cited

U.S. PATENT DOCUMENTS

| | | |
|---|---|---|
| 2016/0297521 A1 | 10/2016 | Cheatham et al. |
| 2016/0300493 A1 | 10/2016 | Ubhi et al. |
| 2016/0300496 A1 | 10/2016 | Cheatham et al. |
| 2016/0304198 A1 | 10/2016 | Jourdan |
| 2016/0304217 A1 | 10/2016 | Fisher et al. |
| 2016/0306355 A1 | 10/2016 | Gordon et al. |
| 2016/0307449 A1 | 10/2016 | Gordon et al. |
| 2016/0311529 A1 | 10/2016 | Brotherton-Ratcliffe et al. |
| 2016/0320773 A1 | 11/2016 | Skaaksrud |
| 2016/0325835 A1 | 11/2016 | Abuelsaad et al. |
| 2016/0364989 A1 | 12/2016 | Speasl et al. |
| 2016/0376004 A1 | 12/2016 | Claridge et al. |
| 2017/0025022 A1 | 1/2017 | Henry et al. |
| 2017/0081043 A1 | 3/2017 | Jones et al. |
| 2017/0084159 A1 | 3/2017 | Cai et al. |
| 2017/0096222 A1 | 4/2017 | Spinelli et al. |
| 2017/0121023 A1 | 5/2017 | High et al. |
| 2017/0129603 A1 | 5/2017 | Raptopoulos et al. |
| 2017/0132558 A1 | 5/2017 | Perez |
| 2017/0132562 A1 | 5/2017 | High et al. |
| 2017/0140655 A1 | 5/2017 | Erickson et al. |
| 2017/0160752 A1 | 6/2017 | Boland et al. |
| 2017/0176194 A1 | 6/2017 | Gordon et al. |
| 2017/0178500 A1 | 6/2017 | Miyahira et al. |
| 2017/0178501 A1 | 6/2017 | Miyahira et al. |
| 2017/0188545 A1 | 7/2017 | Bivens et al. |
| 2017/0190422 A1 | 7/2017 | Beaman et al. |
| 2017/0213084 A1 | 7/2017 | Akselrod et al. |
| 2017/0213455 A1 | 7/2017 | Yamamoto |
| 2017/0280678 A1 | 10/2017 | Jones et al. |
| 2017/0308850 A1 | 10/2017 | Roush et al. |
| 2017/0313421 A1 | 11/2017 | Gil |
| 2017/0313422 A1 | 11/2017 | Gil |
| 2017/0316375 A1 | 11/2017 | Gil |
| 2017/0316376 A1 | 11/2017 | Cooper |
| 2017/0316699 A1 | 11/2017 | Gil et al. |
| 2017/0316701 A1 | 11/2017 | Gil et al. |
| 2017/0337510 A1 | 11/2017 | Shroff et al. |
| 2017/0337511 A1 | 11/2017 | Shroff et al. |
| 2018/0111683 A1 | 4/2018 | Di Benedetto et al. |
| 2018/0130017 A1 | 5/2018 | Gupte |
| 2018/0134388 A1 | 5/2018 | Gil |
| 2018/0155027 A1 | 6/2018 | Gil |
| 2018/0155028 A1 | 6/2018 | Gil |
| 2018/0155029 A1 | 6/2018 | Gil |
| 2018/0155030 A1 | 6/2018 | Gil |
| 2018/0155031 A1 | 6/2018 | Gil |
| 2018/0155032 A1 | 6/2018 | Gil et al. |
| 2018/0349840 A1 | 12/2018 | Gil et al. |
| 2018/0356823 A1 | 12/2018 | Cooper |
| 2019/0122172 A1 | 4/2019 | Gil et al. |
| 2019/0161190 A1 | 5/2019 | Gil et al. |

FOREIGN PATENT DOCUMENTS

| | | |
|---|---|---|
| CN | 104843408 A | 8/2015 |
| CN | 105008747 A | 10/2015 |
| CN | 204688411 U | 10/2015 |
| CN | 105015799 A | 11/2015 |
| CN | 105069595 A | 11/2015 |
| CN | 105314102 A | 2/2016 |
| CN | 105438472 A | 3/2016 |
| CN | 105508499 A | 4/2016 |
| CN | 105658519 A | 6/2016 |
| CN | 106163459 A | 11/2016 |
| CN | 205991133 U | 3/2017 |
| CN | 106576383 A | 4/2017 |
| DE | 112011103690 T5 | 9/2013 |
| EP | 1788495 A1 | 5/2007 |
| GB | 2530626 A | 3/2016 |
| GB | 2500839 B | 4/2017 |
| JP | 6095018 B2 | 3/2017 |
| KR | 10-2010-0022828 A | 3/2010 |
| WO | 2005/098282 A1 | 10/2005 |
| WO | 2010/027469 A1 | 3/2010 |
| WO | 2015/061008 A1 | 4/2015 |
| WO | 2015/076886 A2 | 5/2015 |
| WO | 2016/140988 A1 | 9/2016 |
| WO | 2016/203385 A1 | 12/2016 |
| WO | 2018/065977 A1 | 4/2018 |

OTHER PUBLICATIONS

Allen, David, "Fire Hydrant Maintenance Using GPS and GIS", Proceedings of the 19th Annual ERSI User conference, Available online at: <http://proceedings.esri.com-library>, Accessed on Sep. 7, 2010, 5 pages.

"Bearing Straight", Forbes.com, Available online at: <http://www.forbes.com-forbes-life-magazine/1998/0504/096_print.html>, Accessed on Sep. 3, 2010, 3 pages.

Brusnighan et al., "Orientation Aid Implementing the Global Positioning System", Division of Rehabilitation, University of Illinois, IEEE, 1989, pp. 33-34.

"Car-Cameras-Mobile-Vehicle-Camera-Systems", Available online at: <http://www.spytechs.com/Car-Cameras/default.htm>, Aug. 12, 2011, 4 pages.

Ciulla, Vincent T., "Auto Repair: Flash Codes", Available online at: <http://autorepair.about.com/library/glossary/bldef-228.htm>, Accessed on Jun. 27, 2011, 1 page.

Stanfford et al., "A Handheld Data Logger with Integral GPS for Producing Weed Maps by Field Walking", Computers and Electronics in Agriculture 14, 1996, pp. 235-247.

Doherty et al., "Moving Beyond Observed Outcomes: Integrating Global Positioning Systems and Interactive Computer-Based Travel Behavior Surveys", Transportation Research Circular: Personal Travel: The Long and Short of it, Transportation Research Board, National Research Council, Washington, 1999, 15 pages.

Gerke et al., "Case Construction for Mining Supply Chain Processes", Springer, Berlin, Heidelberg, Available online at: <https://rd.springer.com/chapter/10.1007/978-3-642-01190-0_16>, 2009, pp. 181-192.

"In-Vehicle-Dash-Camera-Recording-System", Available online at: <http://www.truckercam.com/>, Accessed on Aug. 12, 2011, 1 page.

"Telematics", Wikipedia, Available online at: <http://en.wikipedia.org/wiki/Telematics>, Accessed on Jun. 28, 2011, 6 pages.

"J1587 Protocol Stack Overview", Simma Software, Internet Archive, Available online at: <web.archive.org/web/20090419231206/http://www.simmasoftware.com/j1587.html>, Accessed on Apr. 19, 2009, 1 page.

LaPierre, Charles M., "Personal Navigation System for the Visually Impaired", A thesis submitted to the Faculty of Graduate Studies and Research in partial fulfillment of the requirements for the degree of Master of Engineering, Sep. 3, 1998, 30 pages.

Marmasse et al., "Location-aware information delivery with comMotion", HUG 2000 Proceedings, MIT Media Laboratory, Springer-Verlag, 2000, pp. 157-171.

McNally, et al., "TRACER: In-vehicle, GPS-based, Wireless Technology for Traffic Surveillance and Management", University of California, Irvine, Jul. 2003, 80 pages.

"On-Board Diagnostics", Wikipedia, Available online at: <http://en.wikipedia.org/wiki/On-board_diagnostics>, Accessed on Jun. 24, 2011, 10 pages.

Phatak, Makarand, "Where on Earth am I? Don't Worry, GPS Satellites will Guide you", Resonance, vol. 3, No. 8, Sep. 1998, pp. 14-25.

Rogers et al., "Personalization of the Automotive Information Environment", Daimler-Benz Research and Technology Center and Computational Learning Laboratory, 1997, 6 pages.

"SAE International", Wikipedia, Available online at: <http://en.wikipedia.org/wiki/SAE_International>, Accessed on Jun. 24, 2011, 5 pages.

"SAE J 1857-2003 (SAE J1857-2003) Flywheel Dimensions for Truck and Bus Applications", American National Standards Institute, Standards Store, Available online at: <http://webstore.ansi.org/RecordDetail.aspx?sku=SAE-+J+1857-2003+(SAE+J1857-2003)>, Accessed on Jun. 24, 2011, 1 page.

(56) References Cited

OTHER PUBLICATIONS

Shin et al., "1-1-9 Caller Location Information System", Proceedings of the 19th Annual ERSI User Conference, Available online at: <http://proceedings.esri.com-library>, Accessed on Sep. 3, 2010, 9 pages.
Staff, "Oil Lasts Longer in Diesels, Thanks to Novel Viscosity Sensor", MachineDesign.com, Available online at: <http://machinedesign.com/article/oil-lasts-longer-in-diesels-thanks-to-novel-viscosity-sensor-1214>, Dec. 14, 2006, pp. 1-3.
Non-Final Office Action received for U.S. Appl. No. 15/870,166, dated Feb. 3, 2021, 11 pages.
Non-Final Office Action received for U.S. Appl. No. 15/870,180, dated Feb. 5, 2021, 20 pages.
Non-Final Office Action received for U.S. Appl. No. 15/870,180, dated Feb. 7, 2022, 19 pages.
Notice of Allowance received for Chinese Patent Application No. 201780026272.0, dated Feb. 9, 2022, 8 pages (3 pages of English Translation and 5 pages of Official Copy).
Preinterview First Office Action received for U.S Appl. No. 16/906,238 dated Mar. 10, 2022, 4 pages.

AUTONOMOUSLY DELIVERING ITEMS TO CORRESPONDING DELIVERY LOCATIONS PROXIMATE A DELIVERY ROUTE

RELATED APPLICATION

This patent application claims the benefit of and is a continuation of U.S. patent application Ser. No. 15/621,140, filed Jun. 13, 2017 and entitled "AUTONOMOUSLY DELIVERING ITEMS TO CORRESPONDING DELIVERY LOCATIONS PROXIMATE A DELIVERY ROUTE." This application is hereby expressly incorporated by reference in its entirety.

BACKGROUND

As autonomous delivery hardware, such as flying delivery drones, becomes more prevalent, the focus of innovation has generally been on the autonomous delivery hardware itself and guidance algorithms for directing autonomous delivery vehicles to intended destinations. Specifically, the autonomous delivery industry has, to date, focused on innovating locomotion mechanisms, power generation and storage devices, lift capacity of the delivery hardware, travel range of the delivery hardware, guidance and obstacle avoidance algorithms, and/or the like.

However, efficient item delivery requires a consideration of other aspects beyond hardware and navigation concerns. For example, selecting an appropriate delivery time and delivery route may significantly impact delivery efficiency, and accordingly additional innovation is needed to enable autonomous vehicles to efficiently deliver items to various locations.

BRIEF SUMMARY

Various embodiments are directed to systems and methods for establishing autonomous delivery vehicle routes based on established manual delivery vehicle routes to enable efficient operation of both manual delivery vehicles and autonomous delivery vehicles. To minimize autonomous vehicle travel distances, the autonomous vehicles may be configured to launch from the manual delivery vehicles as the manual delivery vehicle traverses a pre-established vehicle route. Accordingly, various embodiments are configured to determine optimal launch locations from the manual delivery vehicle to minimize travel distances for the autonomous delivery vehicles and to minimize travel delays to the manual delivery vehicle while the autonomous delivery vehicle is on a delivery assignment.

Various embodiments are directed to an autonomous vehicle item delivery system for autonomously delivering at least one item to a destination location. In certain embodiments, the system comprises: a manual delivery vehicle operable by a vehicle operator, wherein the manual delivery vehicle is configured to traverse an assigned manual delivery vehicle route between a plurality of manual delivery locations; an autonomous delivery vehicle (e.g., an unmanned aerial vehicle) configured for autonomously transporting at least one item between the manual delivery vehicle and an autonomous delivery location; and a computing entity comprising one or more memory storage areas and one or more hardware processors. In certain embodiments, the one or more hardware processors are configured to: receive item data for the at least one item identified for autonomous delivery, wherein the item data identifies an autonomous delivery location for the at least one item; determining, based at least in part on the item data, a launch location along the manual delivery vehicle route for the at least one item; and wherein the autonomous vehicle is configured to depart the manual delivery vehicle at the launch location to deliver the at least one item to the autonomous delivery location.

In certain embodiments, the manual delivery vehicle comprises an onboard computing entity configured to monitor the location of the manual delivery vehicle relative to the launch location, and wherein the onboard computing entity of the manual delivery vehicle is configured to transmit a signal to the autonomous delivery vehicle when the manual delivery vehicle is at least substantially located at the launch location. The launch location may be a manual delivery location for a second item.

Moreover, in certain embodiments, the autonomous delivery vehicle is configured to receive manual delivery vehicle location data indicative of a current location of the manual delivery vehicle; and the autonomous delivery vehicle is configured to, based at least in part on the manual delivery vehicle location data, return to the manual delivery vehicle after completing delivery of the at least one item to the autonomous delivery location.

Certain embodiments are directed to a method for delivering at least one item from a manual delivery vehicle to a destination location via an autonomous delivery vehicle. The method may comprise steps for: receiving, via a computing entity, item data for a plurality of items to be delivered to corresponding delivery locations at least in part via a delivery vehicle; electronically classifying, based at least in part on the item data, each of the plurality of items as one of manual-delivery eligible or autonomous-delivery eligible, wherein manual delivery-eligible items are eligible for final delivery between the delivery vehicle and corresponding manual delivery locations by a delivery vehicle operator and autonomous-delivery eligible items are eligible for final delivery between the delivery vehicle and corresponding autonomous delivery locations by an autonomous vehicle; determining whether at least one autonomous delivery-eligible item satisfies autonomous delivery criteria by: comparing a destination location for the at least one autonomous delivery-eligible item against the delivery locations corresponding to the manual delivery eligible items; and responsive to determining that the autonomous delivery criteria is satisfied: identifying at least one manual delivery location as a launch location for the autonomous vehicle to depart the delivery vehicle for final delivery to the destination location; monitoring the location of the delivery vehicle relative to the launch location; and upon detecting that the delivery vehicle is at the launch location, causing the autonomous vehicle to depart from the delivery vehicle to deliver the at least one autonomous-delivery eligible item to the destination location. Upon determining that the autonomous delivery criteria is not satisfied, certain embodiments comprise steps for reclassifying the at least one autonomous-delivery eligible item to be a manual-delivery eligible item.

In certain embodiments, the autonomous delivery criteria defines a geographical area surrounding the destination location and a minimum presence time that the delivery vehicle must be present within the geographical area. In such embodiments, determining whether the at least one autonomous delivery-eligible item satisfies autonomous delivery criteria comprises: comparing the manual delivery locations against the geographical area to determine whether one or more of the manual delivery locations are within the geographical area; determining an estimated delivery time for each manual-delivery eligible shipment destined to be delivered to a manual delivery location located within the geographical area; comparing the cumulative estimated delivery time for all manual-delivery eligible shipments destined to be delivered to corresponding manual delivery locations located within the geographical area against the minimum presence time; and responsive to determining that the cumulative estimated delivery time for all manual-delivery eligible shipments destined to be delivered to corresponding manual delivery locations located within the geographical area satisfies the minimum presence time, identifying at least one of the manual delivery locations located within the geographical area to be the launch location. In certain embodiments, determining an estimated delivery time for each manual-delivery eligible shipment comprises: retrieving, from a location database, a location profile for each manual delivery location located within the geographical area; and retrieving, from the location profile corresponding to each manual delivery location located within the geographical area, an estimated delivery time for deliveries to the manual delivery location. In certain embodiments, the cumulative estimated delivery time for all manual-delivery eligible shipments comprises the estimated delivery time for deliveries to each manual delivery location within the geographical area and the estimated travel time for the delivery vehicle to travel between each of the manual delivery locations within the geographical area. In certain embodiments, the delivery criteria defines a first geographical area surrounding the destination location and an associated first minimum presence time, and a second geographical area surrounding the destination location and an associated second minimum presence time, wherein the second geographical area is larger than the first geographical area and the second minimum presence time is longer than the first minimum presence time.

In various embodiments, the autonomous delivery criteria defines a geographical area surrounding a manual delivery location, and determining whether the at least one autonomous delivery-eligible item satisfies autonomous delivery criteria comprises: comparing the at least one autonomous delivery location against the geographical area to determine whether the at least one autonomous delivery location is within the geographical area; and responsive to determining that the autonomous delivery location is within the geographical area, identifying the manual delivery location to be the launch location. In various embodiments, the geographical area is defined based at least in part on a maximum estimated round trip time for an autonomous vehicle to deliver an item to the autonomous delivery location from the manual delivery location.

In various embodiments, the autonomous delivery criteria indicates that autonomous delivery is available to a predefined listing of delivery locations, and determining whether the at least one autonomous delivery-eligible item satisfies autonomous delivery criteria comprises: comparing the at least one autonomous delivery location against the predefined listing of delivery locations; and responsive to determining that the autonomous delivery location matches one of the predefined listings of delivery locations, identifying a manual delivery location to be the launch location. In various embodiments, the predefined listing of delivery locations is identified based at least in part on one or more manual delivery locations for one or more of the manual-delivery eligible items.

In certain embodiments, the item data identifies one or more item attributes for the corresponding item, and identifying one or more items as autonomous-delivery eligible comprises: comparing the one or more item attributes against autonomous-delivery eligibility criteria; wherein the autonomous-delivery eligibility criteria defines at least one of: a maximum item size, a maximum item weight, a maximum item value, one or more excluded item contents, a consignee approval requirement, or a delivery location requirement. Moreover, in certain embodiments the method further comprises steps for monitoring the location of the autonomous vehicle while the autonomous vehicle delivers the at least one autonomous-delivery eligible item from the delivery vehicle to the destination location; and upon detecting that the delivery vehicle begins moving before the autonomous vehicle completes the delivery of the at least one autonomous-delivery eligible item, generating an alert to the delivery vehicle operator. In various embodiments, identifying at least one manual delivery location as a launch location for the autonomous vehicle to depart the delivery vehicle comprises: identifying a manual delivery location within a defined distance of the destination location, wherein the defined distance is less than a travel range of the autonomous vehicle.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
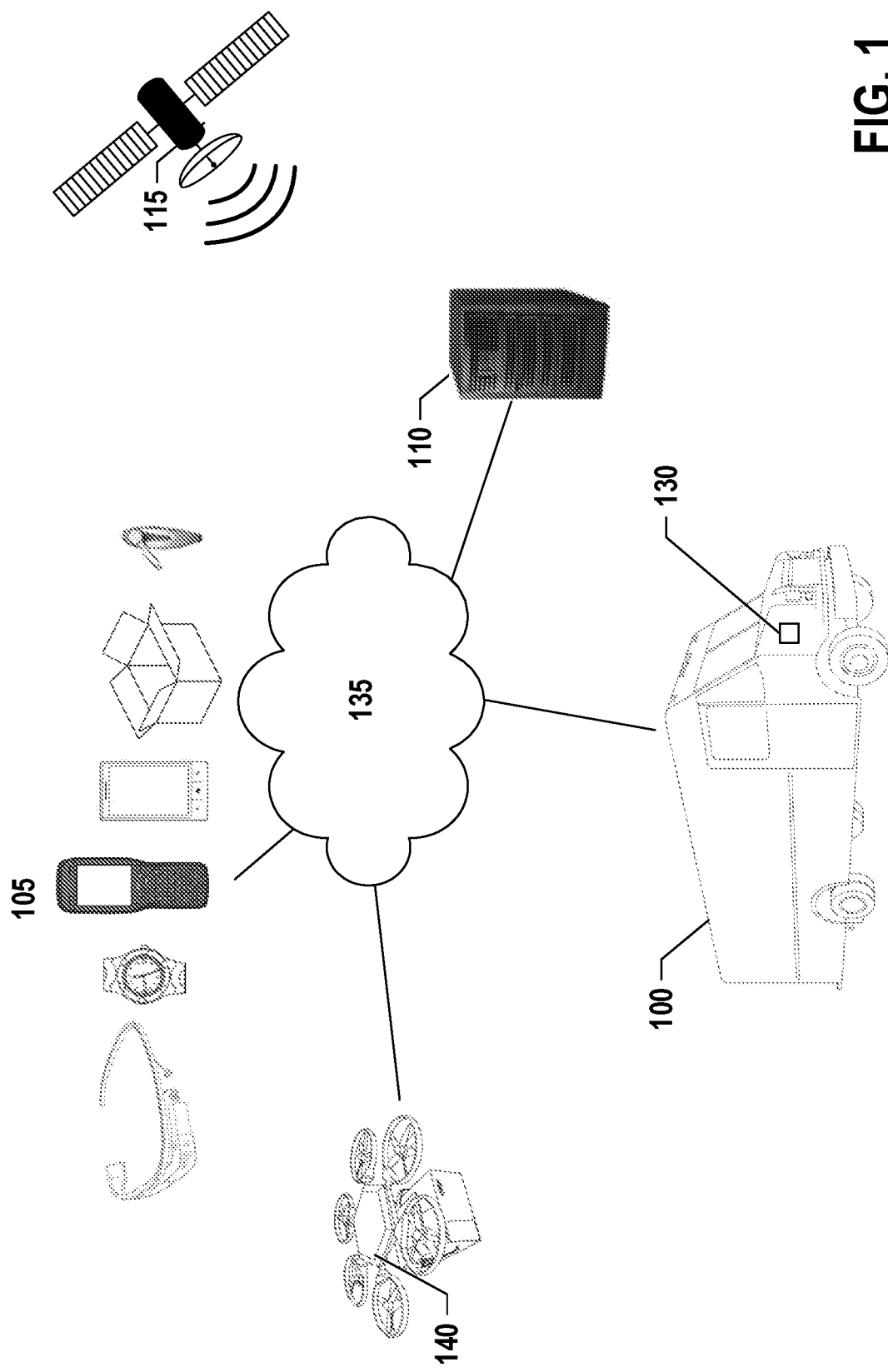
FIG. 1 is a diagram of a system that can be used to practice various embodiments of the present invention.

The present disclosure more fully describes various embodiments with reference to the accompanying drawings.

It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Various embodiments are directed to systems and methods for autonomously delivering items to corresponding destination locations located proximate a delivery route for a manual delivery vehicle (e.g., a delivery vehicle operated by a human; an autonomous base delivery vehicle transporting a human delivery personnel who completes various deliveries; an autonomous base delivery vehicle transporting a plurality of smaller, auxiliary autonomous vehicles (referred to herein simply as autonomous vehicles); and/or the like). The manual delivery vehicle serves as a launching point for the autonomous delivery vehicles, and accordingly various embodiments are configured to determine an optimal launching time/location for the autonomous vehicle to depart from the manual delivery vehicle, relative to the location of the manual delivery vehicle along its route. The optimal launching location may be established based at least in part on the overall travel range of the autonomous vehicle, the estimated travel time for the autonomous vehicle to reach the destination location and to return to the manual delivery vehicle, the estimated amount of time the manual delivery vehicle is likely to remain at a particular location (e.g., a manual delivery destination), and/or the like. Accordingly, the launch location for the autonomous vehicle may be established to minimize travel delays of the manual delivery vehicle while ensuring the autonomous vehicle is able to complete an assigned delivery task and to return to the manual delivery vehicle.

In various embodiments, launch locations are selected from a variety of potential launch locations within a threshold distance away from an intended autonomous delivery destination location. The launch locations may be selected based on the amount of time the manual delivery vehicle is expected to remain within the threshold distance of the intended autonomous delivery destination location (e.g., while a delivery vehicle operator completes manual deliveries to locations within the threshold distance), the estimated amount of time to complete the autonomous delivery, and/or the like.

In certain embodiments, launch locations may be predesignated, and accordingly autonomous delivery may be available only for destination locations located within a predefined distance of a particular predesignated launch location. For example, certain manual delivery destinations (e.g., office buildings, apartment building, malls, and/or other delivery destinations which are expected to require a lengthy stop time to complete deliveries) may be indicated as predesignated launch locations. Accordingly, autonomous delivery may be available only for destination locations within a defined distance away from the predesignated launch locations.

In certain embodiments, launch locations for various autonomous deliveries may be identified based on one or more established clusters of locations, between which autonomous delivery is considered eligible. For example, neighborhoods, geofenced areas, and/or the like may encompass a plurality of clustered destination locations, such that any one of the destination locations within the location cluster may serve as a launch location for autonomous delivery to any other destination locations within the same location cluster. As just one example, a first-visited manual delivery destination location within a location cluster (e.g., the first residence visited by a delivery vehicle operator within a particular neighborhood) may be designated as a launch location for one or more autonomous deliveries to other destination locations located within the same location cluster.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of a system that can be used in conjunction with various embodiments of the present invention. As shown in FIG. 1, the system may include one or more vehicles (e.g., manual delivery vehicles 100, autonomous delivery vehicles 140, and/or the like), one or more mobile computing entities 105, one or more mapping computing entities 110, one or more Global Positioning System (GPS) satellites 115, one or more location sensors, one or more information/data collection devices 130, one or more networks 135, one or more location devices, one or more user computing entities (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like.

Additionally, while FIG. 1 illustrates certain system entities as separate, standalone entities, the various embodiments are not limited to this particular architecture.

A. Exemplary Mapping Computing Entity

Figure 2:
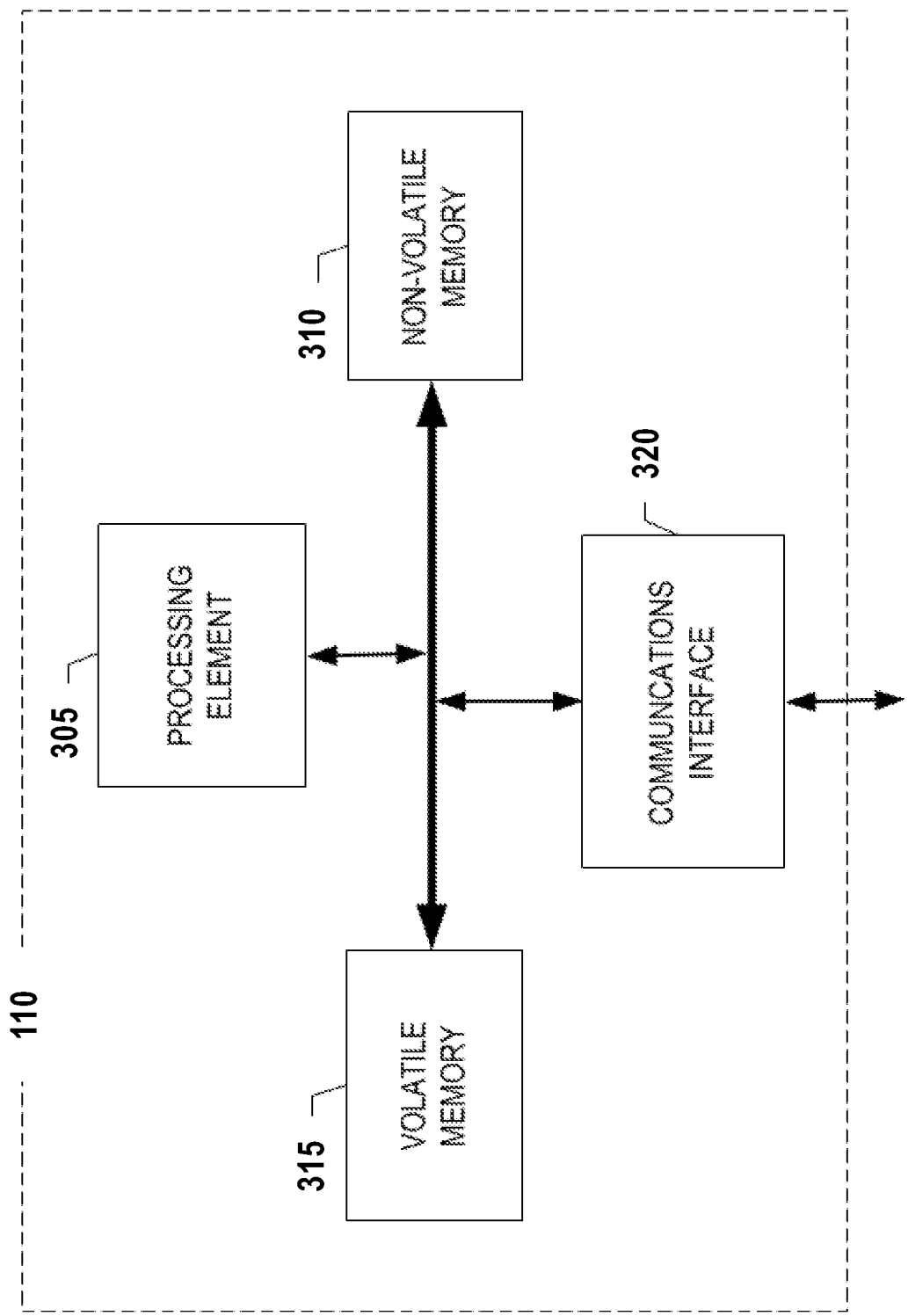
FIG. 2 is a schematic of a mapping computing entity in accordance with certain embodiments of the present invention.

As shown in FIG. 2, in one embodiment, the mapping computing entity 110 may include or be in communication with one or more processing elements 305 (also referred to as processors, processing circuitry, and/or similar terms used herein interchangeably) that communicate with other elements within the mapping computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAIVI, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the mapping computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the mapping computing entity 110 with the assistance of the processing element 305 and operating system.

As indicated, in one embodiment, the mapping computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping computing entity 110 may communicate with computing entities or communication interfaces of the vehicle 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the mapping computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. As yet other examples, the mapping computing entity 110 may be configured to transmit and/or receive information/data transmissions via light-based communication protocols (e.g., utilizing specific light emission frequencies, wavelengths (e.g., visible light, infrared light, and/or the like), and/or the like to transmit data), to transmit data) via sound-based communication protocols (e.g., utilizing specific sound frequencies to transmit data), and/or the like. Although not shown, the mapping computing entity 110 may include or be in communication with one or more input elements, such as a keyboard input, a mouse input, a touch screen/display input, audio input, pointing device input, joystick input, keypad input, and/or the like. The mapping computing entity 110 may also include or be in communication with one or more output elements (not shown), such as audio output, video output, screen/display output, motion output, movement output, and/or the like.

As will be appreciated, one or more of the mapping computing entity's 110 components may be located remotely from other mapping computing entity 110 components, such as in a distributed system. Furthermore, one or more of the components may be combined and additional components performing functions described herein may be included in the mapping computing entity 110. Thus, the mapping computing entity 110 can be adapted to accommodate a variety of needs and circumstances.

B. Exemplary User Computing Entity

In various embodiments, a user device as discussed herein may be a user computing entity 105. As discussed herein, the user computing entity 105 may be a stationary computing device (e.g., a desktop computer, an artificial intelligence (AI) computing entity (e.g., Amazon Echo, Google Home, Apple HomePod, and/or the like) a server, a mounted computing device, and/or the like) or a mobile computing device (e.g., a PDA, a smartphone, a tablet, a phablet, a wearable computing entity, a mobile AI computing entity (e.g., Amazon Echo Dot, and/or the like) and/or the like) having an onboard power supply (e.g., a battery). Moreover, in certain embodiments, the user computing entity 105 may be embodied as an Internet of Things (IoT) computing entity to provide various specific functionalities (e.g., a subset of those discussed herein). For example, the IoT computing entities may comprise a Nest thermostat, a Ring.com doorbell, a Wemo IoT power outlet, a Phillips Hue lightbulb, and/or the like.

Figure 3:
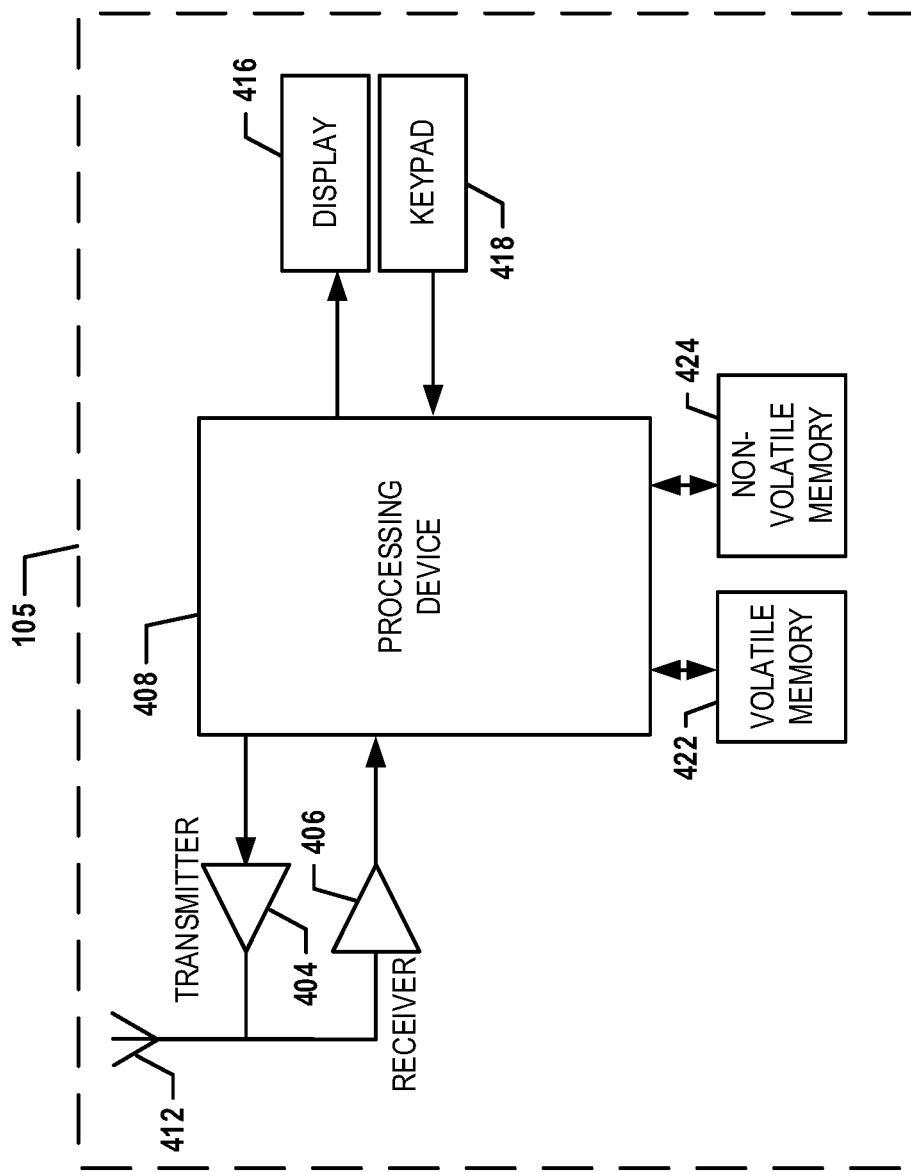
FIG. 3 is a schematic of a mobile computing entity in accordance with certain embodiments of the present invention.
Figure 5:
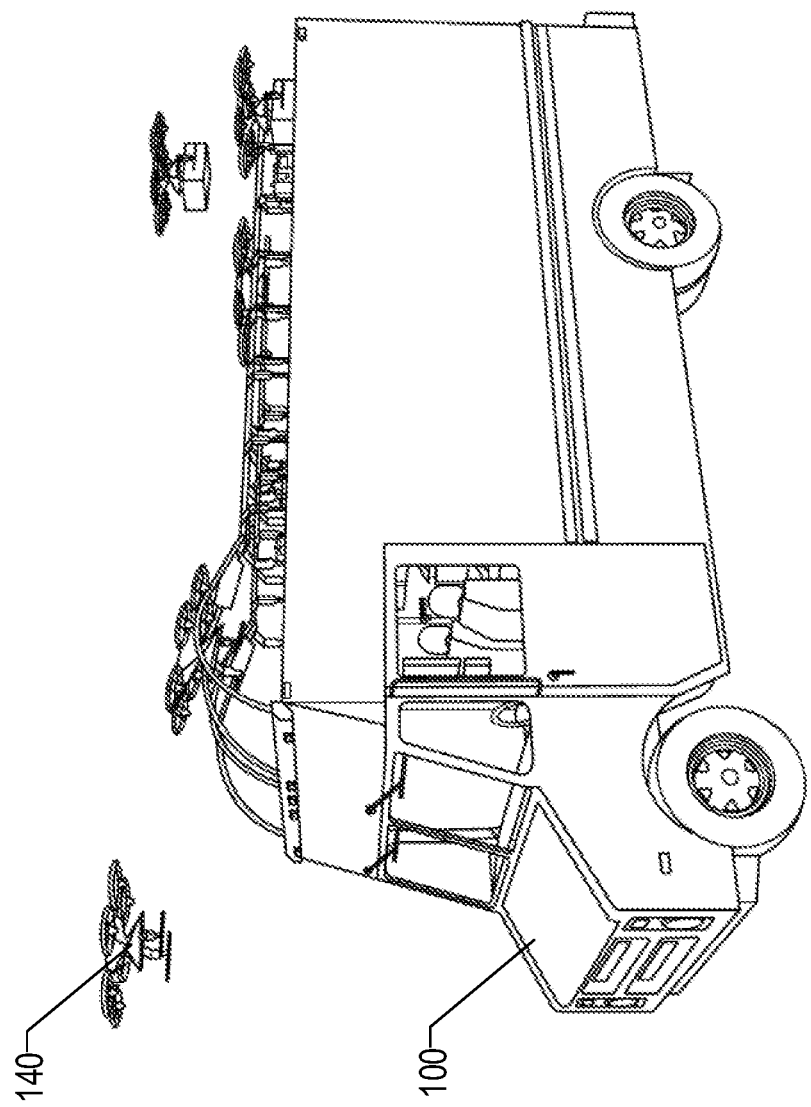
FIG. 5 schematically depicts a manual delivery vehicle and a plurality of autonomous delivery vehicles according to one or more embodiments of the present invention.

FIG. 3 provides an illustrative schematic representative of a user computing entity 105 that can be used in conjunction with embodiments of the present invention. In one embodiment, the user computing entities 105 may include one or more components that are functionally similar to those of the mapping computing entity 110 and/or as described below. As will be recognized, user computing entities 105 can be operated by various parties, including residents, employees, and/or visitors of a facility. As shown in FIG. 5, a user computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as autonomous vehicles 140, mapping computing entities 110, location devices, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. As yet other examples, the user computing entity 105 may be configured to transmit and/or receive information/data transmissions via light-based communication protocols (e.g., utilizing specific light emission frequencies, wavelengths (e.g., visible light, infrared light, and/or the like), and/or the like to transmit data), to transmit data) via sound-based communication protocols (e.g., utilizing specific sound frequencies to transmit data), and/or the like.

Via these communication standards and protocols, the user computing entity 105 can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 (e.g., a mobile user computing entity 105) may include location determining aspects, devices, modules, functionalities, and/or similar words used herein interchangeably. For example, the user computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 105 position in connection with a variety of other systems, including cellular towers, Wi-Fi access points, location devices, and/or the like. Similarly, the user computing entity 105 (e.g., a mobile user computing entity 105) may include indoor positioning aspects, such as a location module adapted to acquire, for example, latitude, longitude, altitude, geocode, course, direction, heading, speed, time, date, location identifying data, and/or various other information/data. Some of the indoor aspects may use various position or location technologies including RFID tags, indoor location devices or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the user computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity can collect contextual information/data as part of the telematics data.

The user computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105.

C. Exemplary Autonomous Vehicle

As utilized herein, autonomous vehicles 140 may be configured for transporting one or more shipments/items (e.g., one or more packages, parcels, bags, containers, loads, crates, items banded together, vehicle parts, pallets, drums, the like, and/or similar words used herein interchangeably). Various autonomous vehicles 140 may be configured as discussed in co-pending U.S. patent application Ser. No. 15/582,129, filed Apr. 28, 2017, and incorporated herein by reference in its entirety.

In certain embodiments, each autonomous vehicle 140 may be associated with a unique vehicle identifier (such as a vehicle ID) that uniquely identifies the autonomous vehicle 140. The unique vehicle ID may include characters, such as numbers, letters, symbols, and/or the like. For example, an alphanumeric vehicle ID (e.g., "AS445") may be associated with each vehicle 100. Although the autonomous vehicles 140 are discussed herein as comprising unmanned aerial vehicles (UAVs), it should be understood that the autonomous vehicles may comprise ground-based autonomous vehicles 140 in certain embodiments.

Figure 4:
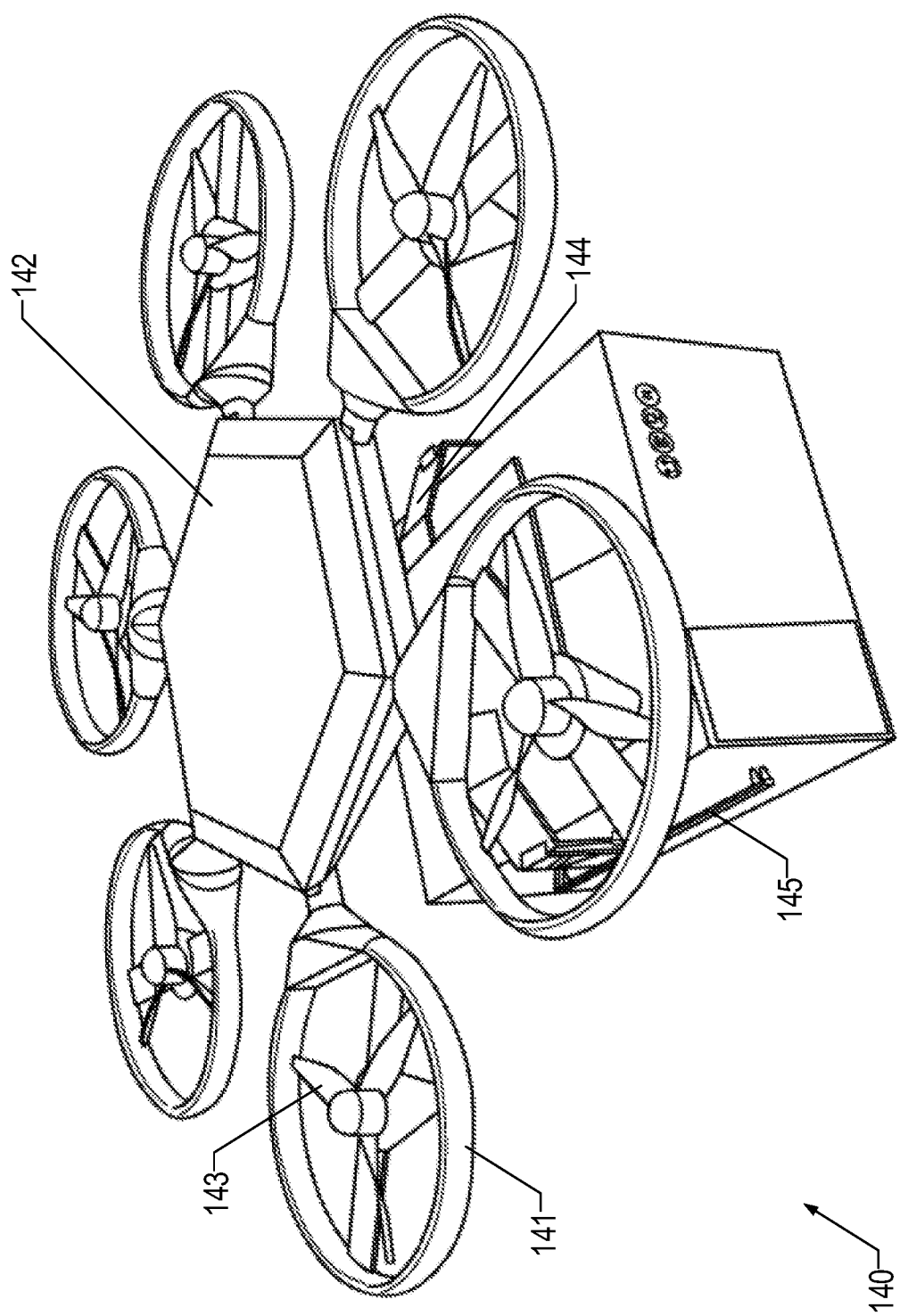
FIG. 4 schematically depicts a top view of an autonomous delivery vehicle according to one or more embodiments of the present invention.

FIG. 4 illustrates an example autonomous vehicle 140 that may be utilized in various embodiments. As shown in FIG. 4, the autonomous vehicle 140 is embodied as a UAV generally comprising a UAV chassis 142 and a plurality of propulsion members 143 extending outwardly from the UAV chassis 142 (in certain embodiments, the propulsion members are surrounded by propeller guards 141). The UAV chassis 142 generally defines a body of the UAV, which the propulsion members 143 (e.g., propellers having a plurality of blades configured for rotating within a propeller guard circumscribing the propellers) are configured to lift and guide during flight. According to various embodiments, the UAV chassis 142 may be formed from any material of suitable strength and weight (including sustainable and reusable materials), including but not limited to composite materials, aluminum, titanium, polymers, and/or the like, and can be formed through any suitable process.

In the embodiment depicted in FIG. 4, the autonomous vehicle 140 is a hexacopter and includes six separate propulsion members 143, each extending outwardly from the UAV chassis 142. However, as will be appreciated from the description herein, the autonomous vehicle 140 may include any number of propulsion members 143 suitable to provide lift and guide the autonomous vehicle 140 during flight. The propulsion members 143 are configured to enable vertical locomotion (e.g., lift) and/or horizontal locomotion, as shown in the example embodiment of FIG. 4, as well as enabling roll, pitch, and yaw movements of the autonomous vehicle 140. Although not shown, it should be understood that autonomous vehicles 140 may comprise any of a variety of propulsion mechanisms, such as balloon-based lift mechanisms (e.g., enabling lighter-than-air transportation), wing-based lift mechanisms, turbine-based lift mechanisms, and/or the like.

In the illustrated embodiment, the propulsion members 143 are electrically powered (e.g., by an electric motor that controls the speed at which the propellers rotate). However, as will be recognized, the propulsion members 143 may be powered by internal combustion engines (e.g., alcohol-fueled, oil-fueled, gasoline-fueled, and/or the like) driving an alternator, hydrogen fuel-cells, and/or the like.

Moreover, as shown in FIG. 4, the lower portion of the UAV chassis 142 is configured to receive and engage a parcel carrier 144 configured for selectively supporting a shipment/item to be delivered from a manual delivery vehicle 100 to a delivery destination. The parcel carrier 144 may define the lowest point of the autonomous vehicle 140 when secured relative to the chassis 142 of the autonomous vehicle 140, such that a shipment/item carried by the autonomous vehicle 140 may be positioned below the chassis of the autonomous vehicle 140 during transit. In certain embodiments, the parcel carrier 144 may comprise one or more parcel engagement arms 145 configured to detachably secure a shipment/item relative to the autonomous vehicle 140. In such embodiments, the shipment/item may be suspended by the parcel engagement arms 145 below the autonomous vehicle 140, such that it may be released from the autonomous vehicle 140 while the autonomous vehicle 140 hovers over a desired delivery destination. However, it should be understood that the parcel carrier 144 may have any of a variety of configurations enabling the autonomous vehicle 140 to support a shipment/item during transit. For example, the parcel carrier 144 may comprise a parcel cage for enclosing a shipment/item during transit, a parcel platform positioned above the UAV chassis 142, and/or the like.

In certain embodiments, the parcel carrier 144 may be detachably secured relative to the UAV chassis 142, for example, such that alternative parcel carriers 144 having shipments/items secured thereto may be alternatively connected relative to the UAV chassis 142 for delivery. In certain embodiments, a UAV may be configured to deliver a shipment/item secured within a parcel carrier 144, and return to a manual delivery vehicle 100 where the now-empty parcel carrier 144 (due to the delivery of the shipment/item that was previously secured therein) may be detached from the autonomous vehicle 140 and a new parcel carrier 144 having a second shipment/item may secured to the UAV chassis 142.

As indicated by FIG. 5, which illustrates an example manual delivery vehicle 100 according to various embodiments, the autonomous vehicle 140 may be configured to selectively engage a portion of the manual delivery vehicle 100 such that the manual delivery vehicle 100 may transport the autonomous vehicle 140. For example, the UAV chassis 142 may be configured to engage one or more vehicle guide mechanisms secured relative to the manual delivery vehicle 100 to detachably secure the autonomous vehicle 140 relative to the manual delivery vehicle 100 when not delivering shipments/items. As discussed herein, the guide mechanism of a manual delivery vehicle 100 may be configured to enable an autonomous vehicle 140 to autonomously take-off from the manual delivery vehicle 100 to initiate a delivery activity and/or to autonomously land at the manual delivery vehicle 100 to conclude a delivery activity.

Moreover, the autonomous vehicle 140 additionally comprises an onboard control system (e.g., onboard computing entity) that includes a plurality of sensing devices that assist in navigating autonomous vehicle 140 during flight. For example, the control system is configured to control movement of the vehicle, navigation of the vehicle, obstacle avoidance, item delivery, and/or the like. Although not shown, the control system may additionally comprise one or more user interfaces, which may comprise an output mechanism and/or an input mechanism configured to receive user input. For example, the user interface may be configured to enable autonomous vehicle technicians to review diagnostic information/data relating to the autonomous vehicle 140, and/or a user of the autonomous vehicle 140 may utilize the user interface to input and/or review information/data indicative of a destination location for the autonomous vehicle 140.

The plurality of sensing devices are configured to detect objects around the autonomous vehicle 140 and provide feedback to an autonomous vehicle onboard control system to assist in guiding the autonomous vehicle 140 in the execution of various operations, such as takeoff, flight navigation, and landing, as will be described in greater detail herein. In certain embodiments, the autonomous vehicle control system comprises a plurality of sensors including ground landing sensors, vehicle landing sensors, flight guidance sensors, and one or more cameras. The vehicle landing sensors may be positioned on a lower portion of the UAV chassis 142 and assist in landing the autonomous vehicle 140 on a manual delivery vehicle 100 (e.g., as shown in FIG. 5) as will be described in greater detail herein. The vehicle landing sensors may include one or more cameras (e.g., video cameras and/or still cameras), one or more altitude sensors (e.g., Light Detection and Ranging (LIDAR) sensors, laser-based distance sensors, infrared distance sensors, ultrasonic distance sensors, optical sensors and/or the like). Being located on the lower portion of the UAV chassis 142, the vehicle landing sensors are positioned below the propulsion members 143 and have a line of sight with the manual delivery vehicle's UAV support mechanism (FIG. 5) when the autonomous vehicle 140 approaches the manual delivery vehicle 100 during landing.

The autonomous vehicle's one or more cameras may also be positioned on the lower portion of the UAV chassis 142, on propeller guards 141, and/or the like. The one or more cameras may include video and/or still cameras, and may capture images and/or video of the flight of the autonomous vehicle 140 during a delivery process, and may assist in verifying or confirming delivery of a shipment/item to a destination, as will be described in greater detail herein. Being located on the lower portion of the UAV chassis 142, the one or more cameras are positioned below the propulsion members 143 and have an unobstructed line of sight to view the flight of the autonomous vehicle 140.

The autonomous vehicle's flight guidance sensors may also be positioned on the lower portion of the UAV chassis 142. The flight guidance sensors may include LIDAR, LiDAR, LADAR, SONAR, magnetic-field sensors, RADAR sensors, and/or the like and may be configured to "sense and avoid" objects that the autonomous vehicle 140 may encounter during flight. For example the flight guidance sensors 166 may be configured to detect objects positioned around the autonomous vehicle 140 such that the autonomous vehicle 140 may determine an appropriate flight path to avoid contact with the objects. By positioning the flight guidance sensors on the lower portion of the UAV chassis 142, the flight guidance sensors are positioned below the propulsion members 143 and may have an unobstructed line of sight to view the flight of the autonomous vehicle 140.

Moreover, the autonomous vehicle's ground landing sensors may be coupled to the upper portion of the UAV chassis 142. For example, the ground landing sensors may be coupled to the propulsion members 143 at their outer perimeter on their respective propeller guards. According to various embodiments, the ground landing sensors are generally configured to detect a distance between the autonomous vehicle 140 and surfaces positioned within a line of sight of the ground landing sensors. For example, during flight, the ground landing sensors may detect a distance between the autonomous vehicle 140 and a landing surface, such as the ground or the roof of the manual delivery vehicle. By detecting a distance between the autonomous vehicle 140 and a landing surface, the ground landing sensors may assist in the takeoff and landing of the autonomous vehicle 140. According to various embodiments, the ground landing sensors may include SONAR sensors, LIDAR sensors, IR-Lock sensors, infrared distance sensors, ultrasonic distance sensors, magnetic-field sensors, RADAR sensors, and/or the like.

In various embodiments, the control system of the autonomous vehicle 140 may encompass, for example, an information/data collection device similar to information/data collection device 130 discussed in reference to a manual delivery vehicle 100 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

In one embodiment, the information/data collection device 130 may include, be associated with, or be in wired or wireless communication with one or more processors (various exemplary processors are described in greater detail below), one or more location-determining devices or one or more location sensors (e.g., Global Navigation Satellite System (GNSS) sensors, indoor location sensors, such as Bluetooth sensors, Wi-Fi sensors, and/or the like), one or more real-time clocks, a J-Bus protocol architecture, one or more electronic control modules (ECM), one or more communication ports for receiving information/data from various sensors (e.g., via a CAN-bus), one or more communication ports for transmitting/sending data, one or more RFID tags/sensors, one or more power sources, one or more information/data radios for communication with a variety of communication networks, one or more memory modules, and one or more programmable logic controllers (PLC). It should be noted that many of these components may be located in the autonomous vehicle 140 but external to the information/data collection device 130.

In one embodiment, the one or more location sensors, modules, or similar words used herein interchangeably may be one of several components in wired or wireless communication with or available to the information/data collection device 130. Moreover, the one or more location sensors may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

As discussed herein, triangulation and/or proximity based location determinations may be used in connection with a device associated with a particular autonomous vehicle 140 and with various communication points (e.g., cellular towers, Wi-Fi access points, and/or the like) positioned at various locations throughout a geographic area to monitor the location of the vehicle 100 and/or its operator. The one or more location sensors may be used to receive latitude, longitude, altitude, heading or direction, geocode, course, position, time, location identifying information/data, and/or speed information/data (e.g., referred to herein as location information/data and further described herein below). The one or more location sensors may also communicate with the mapping computing entity 110, the information/data collection device 130, user computing entity 105, and/or similar computing entities.

In one embodiment, the ECM may be one of several components in communication with and/or available to the information/data collection device 130. The ECM, which may be a scalable and subservient device to the information/data collection device 130, may have information/data processing capability to decode and store analog and digital inputs received from, for example, vehicle systems and sensors. The ECM may further have information/data processing capability to collect and present location information/data to the J-Bus (which may allow transmission to the information/data collection device 130), and output location identifying data, for example, via a display and/or other output device (e.g., a speaker).

As indicated, a communication port may be one of several components available in the information/data collection device 130 (or be in or as a separate computing entity). Embodiments of the communication port may include an Infrared information/data Association (IrDA) communication port, an information/data radio, and/or a serial port. The communication port may receive instructions for the information/data collection device 130. These instructions may be specific to the vehicle 100 in which the information/data collection device 130 is installed, specific to the geographic area and/or serviceable point to which the vehicle 100 will be traveling, specific to the function the vehicle serves within a fleet, and/or the like. In one embodiment, the information/data radio may be configured to communicate with a wireless wide area network (WWAN), wireless local area network (WLAN), wireless personal area network (WPAN), or any combination thereof. For example, the information/data radio may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols (including Bluetooth low energy (BLE)), wireless universal serial bus (USB) protocols, and/or any other wireless protocol. As yet other examples, the communication port may be configured to transmit and/or receive information/data transmissions via light-based communication protocols (e.g., utilizing specific light emission frequencies, wavelengths (e.g., visible light, infrared light, and/or the like), and/or the like to transmit data), via sound-based communication protocols (e.g., utilizing specific sound frequencies to transmit data), and/or the like.

In various embodiments, the autonomous vehicle 140 may comprise a user interface one or more input devices and/or one or more output devices configured to receive user input and/or to provide visual and/or audible output to a user (e.g., a programmer; a technician, and/or the like). For example, the vehicle may comprise a touchscreen (e.g., a capacitive touchscreen), a keyboard, a mouse, a touchpad, a display (e.g., an LCD display, an LED display, a tube display, and/or the like), and/or the like.

As discussed herein, the onboard control system of the autonomous vehicle 140 may be configured to generate and/or retrieve navigational instructions for the autonomous vehicle 140 to move to a particular destination location within the facility. The onboard control system may be configured to interpret the navigational instructions relative to a determined location of the autonomous vehicle 140, and to provide signals to the onboard locomotion mechanisms to move the autonomous vehicle 140 along a determined route to the destination location while avoiding obstacles detected by the one or more sensors of the control system.

D. Exemplary Manual Delivery Vehicle

As discussed herein, a manual delivery vehicle 100 may be a human operable delivery vehicle configured for transporting a vehicle operator, a plurality of items, and one or more autonomous vehicles 140 along a delivery route. However, it should be understood that in certain embodiments, the manual delivery vehicle 100 may itself be autonomous or semi-autonomous. In certain embodiments, an autonomous manual delivery vehicle 100 may be configured as an autonomous base vehicle configured to carry a plurality of items, one or more smaller, auxiliary autonomous vehicles (e.g., autonomous vehicles 140 described in detail herein), a human delivery personnel (e.g., who may complete various deliveries from the manual delivery vehicle 100 to respective destination locations), and/or the like. For example, a vehicle 100 may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people, UAVs, and/or shipments/items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100. In various embodiments, the manual delivery vehicle 100 may be configured as discussed in co-pending U.S. patent application Ser. No. 15/582,129, filed Apr. 28, 2017, and incorporated herein by reference in its entirety.

In various embodiments, the manual delivery vehicle 100 comprises one or more autonomous vehicle support mechanisms, as shown in FIG. 5. The autonomous vehicle support mechanisms may be configured to enable the autonomous vehicles 140 to launch and land at the manual delivery vehicle 100 while completing autonomous deliveries. In certain embodiments, the autonomous vehicle support mechanisms may be configured to enable the autonomous vehicles 140 to launch and/or land while the manual delivery vehicle 100 is moving, however certain embodiments may be configured to enable autonomous vehicle 140 launching and/or landing while the manual delivery vehicle 100 is stationary.

Moreover, although not shown, the interior of the manual delivery vehicle 100 may comprise a cargo area configured for storing a plurality of items, a plurality of autonomous vehicles 140, a plurality of autonomous vehicle components, and/or the like. In certain embodiments, items designated for autonomous delivery may be stored in one or more autonomously operated storage assemblies within the cargo area of the manual delivery vehicle 100. When a particular item is identified as ready for delivery, the storage assembly autonomously delivers the item to an autonomous vehicle 140 for delivery.

Moreover, the manual delivery vehicle 100 may comprise and/or be associated with one or more computing entities, devices, and/or similar words used herein interchangeably. For example, the manual delivery vehicle 100 may be associated with an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to the mobile computing entity 105, the mapping computing entity 110, and/or various other computing entities via one of several communication methods.

In one embodiment, the information/data collection device 130 may include, be associated with, or be in wired or wireless communication with one or more processors (various exemplary processors are described in greater detail below), one or more location-determining devices or one or more location sensors (e.g., GNSS sensors), one or more telematics sensors, one or more real-time clocks, a J-Bus protocol architecture, one or more ECMs, one or more communication ports for receiving telematics information/data from various sensors (e.g., via a CAN-bus), one or more communication ports for transmitting/sending data, one or more RFID tags/sensors, one or more power sources, one or more information/data radios for communication with a variety of communication networks, one or more memory modules, and one or more programmable logic controllers (PLC). It should be noted that many of these components may be located in the vehicle 100 but external to the information/data collection device 130.

In one embodiment, the one or more location sensors, modules, or similar words used herein interchangeably may be one of several components in wired or wireless communication with or available to the information/data collection device 130. Moreover, the one or more location sensors may be compatible with GPS satellites 115, LEO satellite systems, DOD satellite systems, the European Union Galileo positioning systems, the Chinese Compass navigation systems, Indian Regional Navigational satellite systems, and/or the like, as discussed above in reference to the autonomous delivery vehicle. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors may be used to receive latitude, longitude, altitude, heading or direction, geocode, course, position, time, and/or speed information/data (e.g., referred to herein as telematics information/data and further described herein below). The one or more location sensors may also communicate with the mapping computing entity 110, the information/data collection device 130, user computing entity 105, and/or similar computing entities.

In one embodiment, the ECM may be one of several components in communication with and/or available to the information/data collection device 130. The ECM, which may be a scalable and subservient device to the information/data collection device 130, may have information/data processing capability to decode and store analog and digital inputs from vehicle systems and sensors (e.g., location sensor). The ECM may further have information/data processing capability to collect and present collected information/data to the J-Bus (which may allow transmission to the information/data collection device 130).

As indicated, a communication port may be one of several components available in the information/data collection device 130 (or be in or as a separate computing entity). Embodiments of the communication port may include an Infrared information/data Association (IrDA) communication port, an information/data radio, and/or a serial port. The communication port may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio may be configured to communicate with WWAN, WLAN, WPAN, or any combination thereof, as discussed in reference to the autonomous vehicle, above.

E. Exemplary Shipment/Item

In one embodiment, a shipment/item may be any tangible and/or physical object. In one embodiment, a shipment/item may be or be enclosed in one or more packages, envelopes, parcels, bags, goods, products, containers, loads, crates, items banded together, vehicle parts, pallets, drums, the like, and/or similar words used herein interchangeably. In one embodiment, each shipment/item may include and/or be associated with a shipment/item identifier, such as an alphanumeric identifier. Such shipment/item identifiers may be represented as text, barcodes, tags, character strings, Aztec Codes, MaxiCodes, information/data Matrices, Quick Response (QR) Codes, electronic representations, and/or the like. A unique shipment/item identifier (e.g., 123456789) may be used by the carrier to identify and track the shipment/item as it moves through the carrier's transportation network and to associate a particular physical shipment/item with an electronically stored shipment/item profile. For example, the shipment/item profile may be stored in a shipment/item level detail database, and may store data informing various carrier personnel and/or delivery vehicles (e.g., autonomous vehicle 140) of delivery-related information/data specific to a particular shipment. Further, such shipment/item identifiers can be affixed to shipments/items by, for example, using a sticker (e.g., label) with the unique shipment/item identifier printed thereon (in human and/or machine readable form) or an RFID tag with the unique shipment/item identifier stored therein. Such items may be referred to as "connected" shipments/items and/or "non-connected" shipments/items.

In one embodiment, connected shipments/items include the ability to determine their locations and/or communicate with various computing entities. This may include the shipment/item being able to communicate via a chip or other devices, such as an integrated circuit chip, RFID technology, NFC technology, Bluetooth technology, Wi-Fi technology, light-based communication protocols, sound-based communication protocols, and any other suitable communication techniques, standards, or protocols with one another and/or communicate with various computing entities for a variety of purposes. Connected shipments/items may include one or more components that are functionally similar to those of the mapping computing entity 110 and/or user computing entity 105 as described herein. For example, in one embodiment, each connected shipment/item may include one or more processing elements, one or more display device/input devices (e.g., including user interfaces), volatile and non-volatile storage or memory, and/or one or more communications interfaces. In this regard, in some example embodiments, a shipment/item may communicate send "to" address information/data, received "from" address information/data, unique identifier codes, location information/data, status information/data, and/or various other information/data.

In one embodiment, non-connected shipments/items do not typically include the ability to determine their locations and/or might not be able communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles in which they are located scanned or located. As will be recognized, an actual scan or location determination of a shipment/item is not necessarily required to determine the location of a shipment/item. That is, a scanning operation might not actually be performed on a label affixed directly to a shipment/item or location determination might not be made specifically for or by a shipment/item. For example, a label on a larger container housing many shipments/items can be scanned, and by association, the location of the shipments/items housed within the container are considered to be located in the container at the scanned location. Similarly, the location of a vehicle transporting many shipments/items can be determined, and by association, the location of the shipments/items being transported by the vehicle are considered to be located in the vehicle 100 at the determined location. These can be referred to as "logical" scans/determinations or "virtual" scans/determinations. Thus, the location of the shipments/items is based on the assumption they are within the container or vehicle, despite the fact that one or more of such shipments/items might not actually be there.

F. Exemplary Shipment/Item Profile

As noted herein, various shipments/items may have an associated shipment/item profile, record, and/or similar words used herein interchangeably stored in a shipment/item detail database. The shipment/item profile may be utilized by the carrier to track the current location of the shipment/item and to store and retrieve information/data about the shipment/item. For example, the shipment/item profile may comprise electronic data corresponding to the associated shipment/item, and may identify various shipping instructions for the shipment/item, various characteristics of the shipment/item, and/or the like. The electronic data may be in a format readable by various computing entities, such as a mapping computing entity 110, a user computing entity 105, an autonomous vehicle control system, and/or the like. However, it should be understood that a computing entity configured for selectively retrieving electronic data within various shipment/item profiles may comprise a format conversion aspect configured to reformat requested data to be readable by a requesting computing entity.

In various embodiments, the shipment/item profile comprises identifying information/data corresponding to the shipment/item. The identifying information/data may comprise information/data identifying the unique item identifier associated with the shipment/item. Accordingly, upon providing the identifying information/data to the item detail database, the item detail database may query the stored shipment/item profiles to retrieve the shipment/item profile corresponding to the provided unique identifier.

Moreover, the shipment/item profiles may comprise shipping information/data for the shipment/item. For example, the shipping information/data may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is required, and/or the like. In certain embodiments, at least a portion of the shipping information/data may be utilized as identifying information/data to identify a shipment/item. For example, a destination location may be utilized to query the item detail database to retrieve data about the shipment/item.

In certain embodiments, the shipment/item profile comprises characteristic information/data identifying shipment/item characteristics. For example, the characteristic information/data may identify dimensions of the shipment/item (e.g., length, width, height), a weight of the shipment/item, contents of the shipment/item, and/or the like. In certain embodiments, the contents of the shipment/item may comprise a precise listing of the contents of the shipment/item (e.g., three widgets) and/or the contents may identify whether the shipment/item contains any hazardous materials (e.g., the contents may indicate whether the shipment/item contains one or more of the following: no hazardous materials, toxic materials, flammable materials, pressurized materials, controlled substances, firearms, and/or the like).

Moreover, as will be discussed in greater detail herein, the characteristic information/data may identify whether the shipment/item is eligible for autonomous delivery. The determination of whether the shipment/item is eligible for autonomous delivery may be based at least in part on an intended recipient's preferences (e.g., provided to the mapping computing entity 110 based at least in part on user input provided by the recipient), and/or based at least in part on various information/data contained within the shipment/item profile. In various embodiments, a computing entity associated with the item detail database (e.g., mapping computing entity 110) may be configured to update the shipment/item profile to include an indication of whether the shipment/item is eligible for autonomous delivery. In making such a determination, the mapping computing entity 110 may be configured to determine whether an intended recipient has expressed a preference for whether autonomous delivery should be used to the deliver the shipment/item. For example, the mapping computing entity 110 may be configured to retrieve information/data from the shipment/item profile that identifies the intended recipient, and the mapping computing entity 110 may be configured to generate and transmit a query to a recipient preference database (e.g., operated by a separate computing entity and/or by the same computing entity) determine whether the recipient has expressed a preference for autonomous delivery of shipments/items. Responsive to determining that the recipient has indicated that autonomous delivery should not be utilized, the mapping computing entity 110 may update the shipment/item profile to indicate that autonomous delivery is not available for the shipment/item. However, if the recipient has indicated that autonomous delivery may be utilized, the mapping computing entity 110 may continue to determine whether the characteristics of the particular item satisfy autonomous delivery criteria. For example, the mapping computing entity 110 may compare the item dimensions against dimensional criteria for autonomous delivery to determine whether the item is sized appropriately for autonomous delivery. For example, the dimensional criteria may identify one or more maximum and/or minimum dimensions for items to be delivered via an autonomous vehicle 140. Due to size limitations of the autonomous vehicles 140 themselves, autonomous delivery may only be available for items sized such that these items may be securely supported by the autonomous vehicle 140. Similarly, the mapping computing entity 110 may compare the weight of the item against weight criteria for autonomous delivery to determine whether the shipment/item is within an appropriate weight range to enable autonomous delivery. For example, the weight criteria may specify a maximum and/or a minimum weight for items to be delivered via an autonomous vehicle 140. The weight criteria may be established based on a weight limit of an autonomous vehicle 140, such that items are only eligible for autonomous delivery if the propulsion mechanisms of the autonomous vehicle 140 are capable of maneuvering the combined weight of the autonomous vehicle 140 and the shipment/item. Finally, the mapping computing entity 110 may compare the contents of the shipment/item against a listing of permitted and/or excluded item contents to determine whether the contents of the shipment/item are eligible for autonomous delivery.

Responsive to determining that the shipment/item satisfies all applicable autonomous delivery criteria, the mapping computing entity 110 may be configured to update the shipment/item profile to indicate that the shipment/item is eligible for autonomous delivery.

G. Exemplary Location Profile

In one embodiment, a serviceable point, serviceable point addresses, and/or similar words used herein interchangeably may be any identifiable location, such as one or more addresses, lockers, access points, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops) geofenced areas, geographic areas, landmarks, buildings, bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location (e.g., front door of a residence, side door of a residence, and/or the like). A serviceable point may also be a commercial location, such as one or more stores in a mall, one or more office buildings, one or more office parks, one or more offices of an apartment complex, one or more garages, one or more lockers or access points, one or more warehouses, one or more restaurants, one or more stores, one or more retail locations, one or more points at such locations, and/or the like. The serviceable point may also be any specific location at a commercial location, e.g., (e.g., front door of a commercial location, dock of a commercial location, and/or the like). A serviceable point may be one or more streets, one or more street segments, one or more zones, one or more areas, one or more latitude and/or longitude points (e.g., 33.7869128, −84.3875602), one or more geocodes, and/or the like. A serviceable point may be any identifiable location. As will be recognized, a variety of approaches and techniques can be used to adapt to various needs and circumstances. In various embodiments, serviceable points may be configured as discussed in co-pending U.S. patent application Ser. No. 14/988,136, filed on Jan. 5, 2016, the contents of which are incorporated herein by reference in their entirety.

In various embodiments, a serviceable point profile corresponding to each of one or more (e.g., all) serviceable points serviced by the carrier may be created and stored in a serviceable point management database in electronic communication with the mapping computing entity 110. Each serviceable point profile stored within the serviceable point management database may comprise serviceable point identifying information/data that may comprise a unique combination of characters, symbols, words, and/or the like that may be utilized to identify a particular serviceable point. In certain embodiments, the identifying information/data may comprise the street address of the serviceable point, and may include the street number, the street name, a sub-unit (e.g., apartment number, suite number, floor number, and/or the like), the city, the state/province, a postal/zip code, and/or the like. Moreover, the identifying information/data may comprise information/data indicative of alternative identifying information/data, if applicable. For example, if a particular location's street address changes, or if the particular location is commonly known by an identifier other than the street address, the serviceable point profile may comprise information/data identifying the previous and/or alternative location identifier for the serviceable point. In certain embodiments, the identifying information/data may comprise a shortened unique identifier that may be utilized to identify a particular serviceable point without utilizing an entire street address. For example, the shortened unique identifier may comprise a unique character string, a unique symbol and/or string of symbols, and/or the like.

Moreover, in various embodiments, each serviceable point profile additionally comprises a geocode for each of the associated serviceable point (e.g., a geocode established by one or more user computing entities 105 (e.g., mobile devices) while the user computing entity 105 is physically located at the serviceable point). As a specific example, a serviceable point profile may identify one or more preferred delivery locations for shipments/items to be delivered to a particular delivery address (e.g., a geocode accurately identifying the location of the front porch of a particular residence). In various embodiments, the serviceable point profile may identify a first delivery location at the corresponding delivery address for manual deliveries (e.g., deliveries made by a carrier employee should be placed on a front porch of the address) and/or may identify a second delivery location at the corresponding delivery address for autonomous deliveries (e.g., deliveries made by an autonomous UAV should be deposited on a second-story balcony of the address). Such data, including the information/data indicating the preferred serviceable point indicators and/or the alternative serviceable point indicators, may be utilized by the mapping computing entity 110 to match a particular serviceable point indicator provided on a shipment/item received by the carrier to one or more appropriate serviceable point profiles. In certain embodiments, the serviceable point profile may comprise one or more images of the serviceable point. For example, the serviceable point profile may comprise a street-view of the serviceable point, and/or one or more close-up views of particular preferred delivery locations for the serviceable point.

Figure 10:
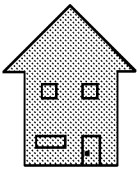
FIG. 10 illustrates example data stored in a serviceable point profile according to various embodiments.
Figure 13:
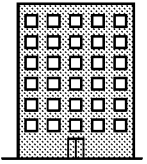
FIG. 13 illustrates example data stored in a serviceable point profile according to various embodiments.
Figure 16:
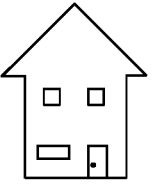
FIG. 16 illustrates example data stored in a serviceable point profile according to various embodiments.

Moreover, each serviceable point profile may comprise information/data indicative of one or more linked serviceable points at geographically distinct locations. The linked serviceable points may be identified in each serviceable point profile based on a determination that autonomous delivery may be achieved between the serviceable point associated with the profile and the linked serviceable point, as discussed in greater detail below. The linked serviceable points to be associated with a particular serviceable point profile may be identified based at least in part on historical, real-time, and/or predictive information/data (e.g., historical information/data indicative of the distance between addresses and/or the elapsed time between deliveries (e.g., manual deliveries, autonomous deliveries, and/or the like to multiple addresses). In various embodiments, the one or more linked serviceable points may be serviceable points eligible for autonomous delivery while a manual delivery vehicle 100 is located at the serviceable point associated with the serviceable point profile. Alternatively, the linked serviceable points may be serviceable points at which a manual delivery vehicle 100 must be located to enable autonomous delivery to the serviceable point associated with the serviceable point profile. Accordingly, in certain embodiments the serviceable point profile may identify at least two discrete listings of linked serviceable points, including a list identifying linked serviceable points to which autonomous delivery is available while the manual delivery vehicle 100 is physically located at the serviceable point, and a list identifying linked serviceable points from which autonomous delivery is available to the serviceable point while the manual delivery vehicle 100 is physically located at a linked serviceable point. FIGS. 10, 13, and 16, discussed in greater detail below, illustrate example information/data that may be stored in a serviceable point profile.

In various embodiments, upon receipt of information/data indicating that a shipment/item is scheduled to be delivered to a particular destination serviceable point, the mapping computing entity 110 may be configured to determine whether the shipment/item is eligible for autonomous delivery (e.g., based on information/data stored within a shipment/item profile associated with the shipment/item), and/or whether other existing shipments/items are eligible for autonomous delivery based on the inclusion of a stop to deliver the shipment/item along a delivery route.

Accordingly, the one or more mapping computing entities 110 may first identify the corresponding serviceable point profile (e.g., stored within the one or more serviceable point management databases) for the particular destination serviceable point. In various embodiments, identifying an appropriate serviceable point profile for a particular shipment/item may comprise steps for obtaining information/data indicative of a destination for a shipment/item (e.g., by querying a shipment/item level detail database, by scanning an indicia on the package, and/or by receiving user input). Upon identifying the destination for the shipment/item, the serviceable point management database may be queried to identify a serviceable point profile corresponding to the destination of the shipment/item. The mapping computing entity 110 may then retrieve information/data associated with the serviceable point profile to ascertain whether a shipment/item destined for the serviceable point is eligible for autonomous delivery.

In various embodiments, the serviceable point profiles may comprise information/data indicative of one or more estimated elapsed times to complete a delivery at the serviceable point. The estimated elapsed time to complete a delivery at the serviceable point may be determined based on historical data, and may represent an average amount of time to make a delivery at the serviceable point. In certain embodiments, the amount of time to make a delivery may be identified as the elapsed time between when the manual vehicle's engine is turned off to enable the vehicle operator to disembark and complete the delivery and when the vehicle's engine is then turned on to enable the vehicle operator to leave the delivery location. Accordingly, the estimated amount of time to complete a delivery at a serviceable point comprises the sum of the estimated amount of time for the driver to unbuckle his/her seatbelt (after turning off the engine), get out of a driver's seat, retrieve a shipment/item to be delivered, disembark from the vehicle, transport the shipment/item from the vehicle to a delivery point at the destination location (e.g., from the vehicle to the front porch of the delivery location), to request and obtain a delivery signature (if applicable), to return to and board the vehicle, to sit in the driver's seat, to buckle the driver's seat belt (before turning on the engine), and to turn on the vehicle's engine.

To establish the estimated elapsed delivery time, a computing entity (e.g., mapping computing entity 110) may store and retrieve historical delivery information/data indicative of historical deliveries to the particular serviceable point. The mapping computing entity 110 may retrieve information/data indicative of the amount of time a vehicle's engine is turned off while a delivery vehicle operator makes a delivery to the destination location. In various embodiments, the mapping computing entity 110 may retrieve historical vehicle telematics information/data and/or service information/data indicative of an amount of time to complete deliveries at various locations from one or more fleet management systems, such as those described in U.S. Pat. No. 9,208,626, the contents of which is incorporated herein by reference in its entirety.

In various embodiments, a serviceable point profile may comprise a plurality of elapsed delivery time estimates for various possible delivery scenarios to the serviceable point. For example, the serviceable point profile may comprise a chart showing various elapsed delivery time estimates corresponding to various delivery scenarios. As a specific example, the elapsed delivery time estimate chart may comprise (1) a delivery time estimate for regular, no-signature required deliveries, (2) a delivery time estimate for heavy (e.g., over 70 lb) deliveries, (3) a delivery time estimate for signature required deliveries, and/or the like. Accordingly, when retrieving information/data regarding the estimated elapsed time to complete an upcoming delivery as discussed herein, the mapping computing entity 110 may be configured to retrieve a delivery estimate corresponding to the delivery type for the upcoming delivery.

IV. Exemplary System Operation

With reference to FIGS. 6-16, various embodiments establish autonomous delivery eligibility for various shipments/items in real-time, while a final delivery route is established for shipments/items to be delivered to associated destination locations (e.g., serviceable points). Certain embodiments establish final autonomous delivery eligibility based on a determination of whether an established delivery route passes within an established proximity to an autonomous delivery location, whether an established delivery route visits one or more serviceable points linked for autonomous delivery to a different serviceable point, whether an established delivery route causes a manual delivery vehicle 100 to be located within a particular geographical area for a threshold period of time, and/or the like. Such concepts are discussed in greater detail herein.

A. Determining Autonomous Delivery Eligibility based on Autonomous Delivery Destination Locations In various embodiments, determining whether one or more items may be delivered autonomously may be based at least in part on the location of the prospective autonomous delivery location (e.g., serviceable point) relative to the location of an established manual delivery vehicle route and/or the location of one or more deliveries on the ordered listing of deliveries to be completed by the manual delivery vehicle 100. As discussed in reference to FIGS. 6-9, autonomous delivery eligibility may be established for autonomous delivery destinations if a manual delivery vehicle route passes within a defined distance (e.g., linear distance) of the autonomous delivery location and remains within the defined distance for at least a threshold period of time to enable an autonomous vehicle 140 to depart from the manual delivery vehicle 100, to complete the delivery, and to return to the manual delivery vehicle 100 while the manual delivery vehicle 100 remains within the defined distance. In certain embodiments, delivery locations existing within the defined distance of the autonomous delivery location may be stored in the serviceable point profile corresponding to the autonomous delivery location as linked serviceable points.

Figure 6:
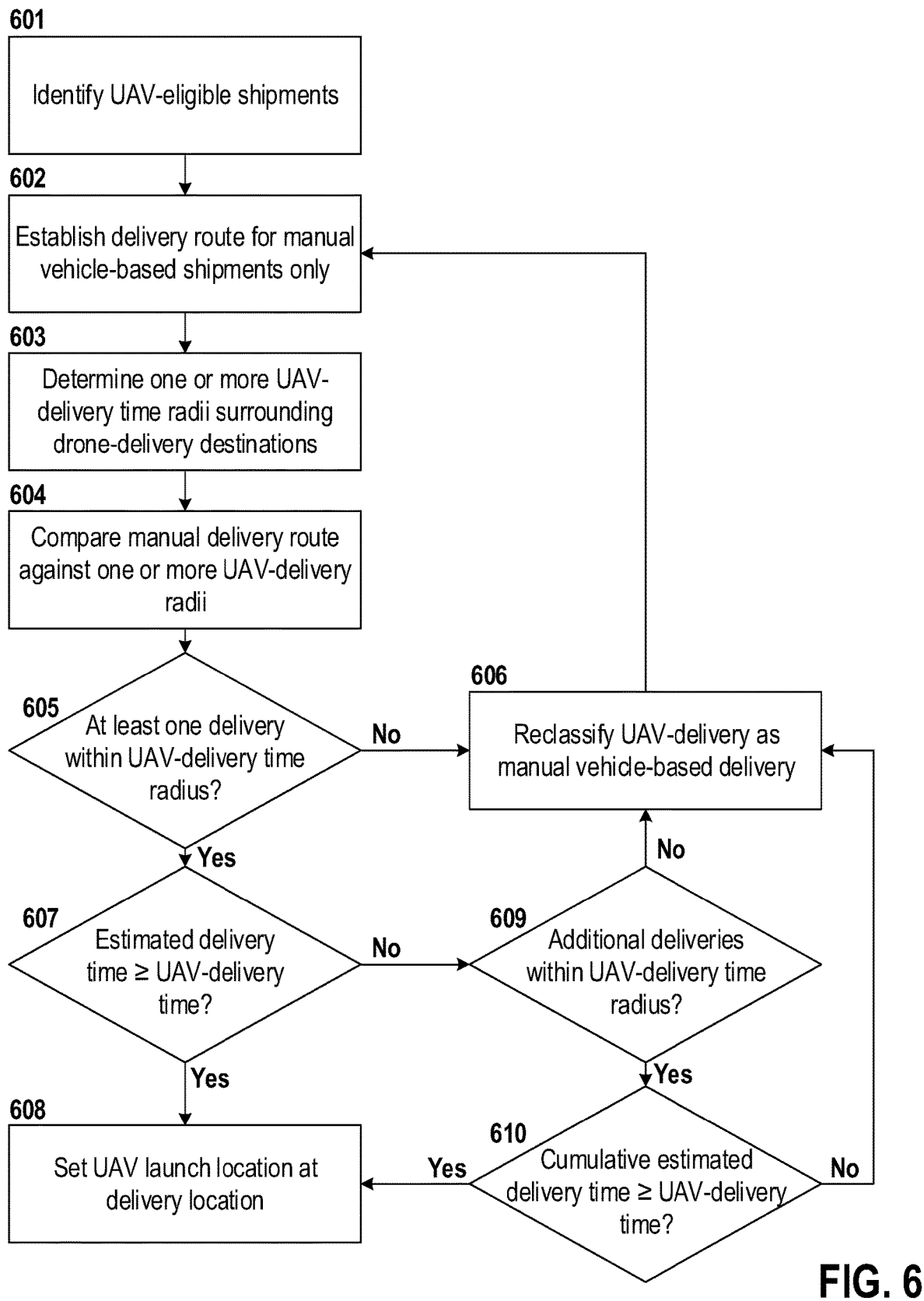
FIG. 6 is a flowchart depicting various steps for establishing a drone launch location according to various embodiments.
Figure 7:
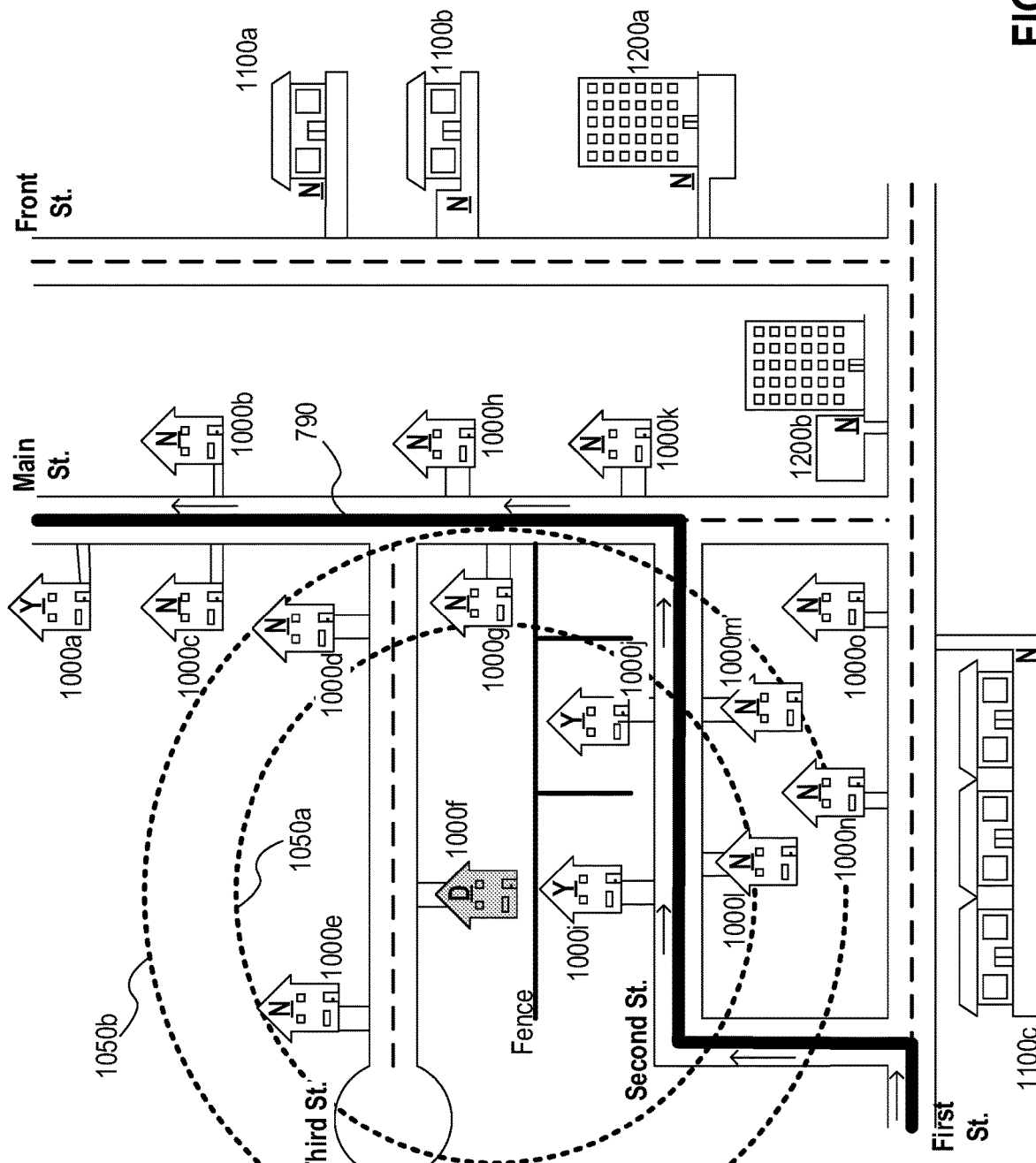
FIGS. 7-9 depict example manual delivery vehicle travel paths relative to various delivery locations according to various embodiments.
Figure 8:
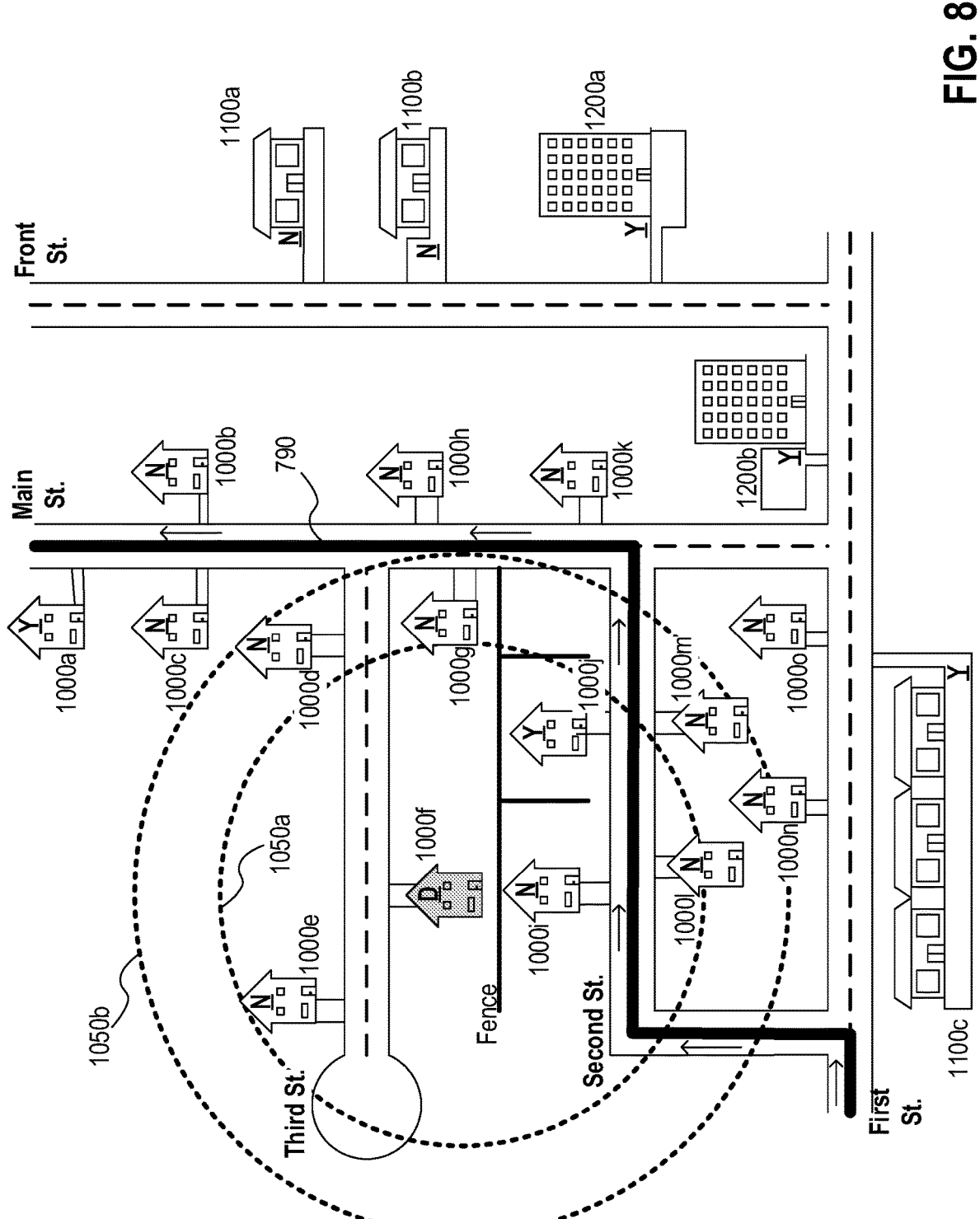
Figure 9:
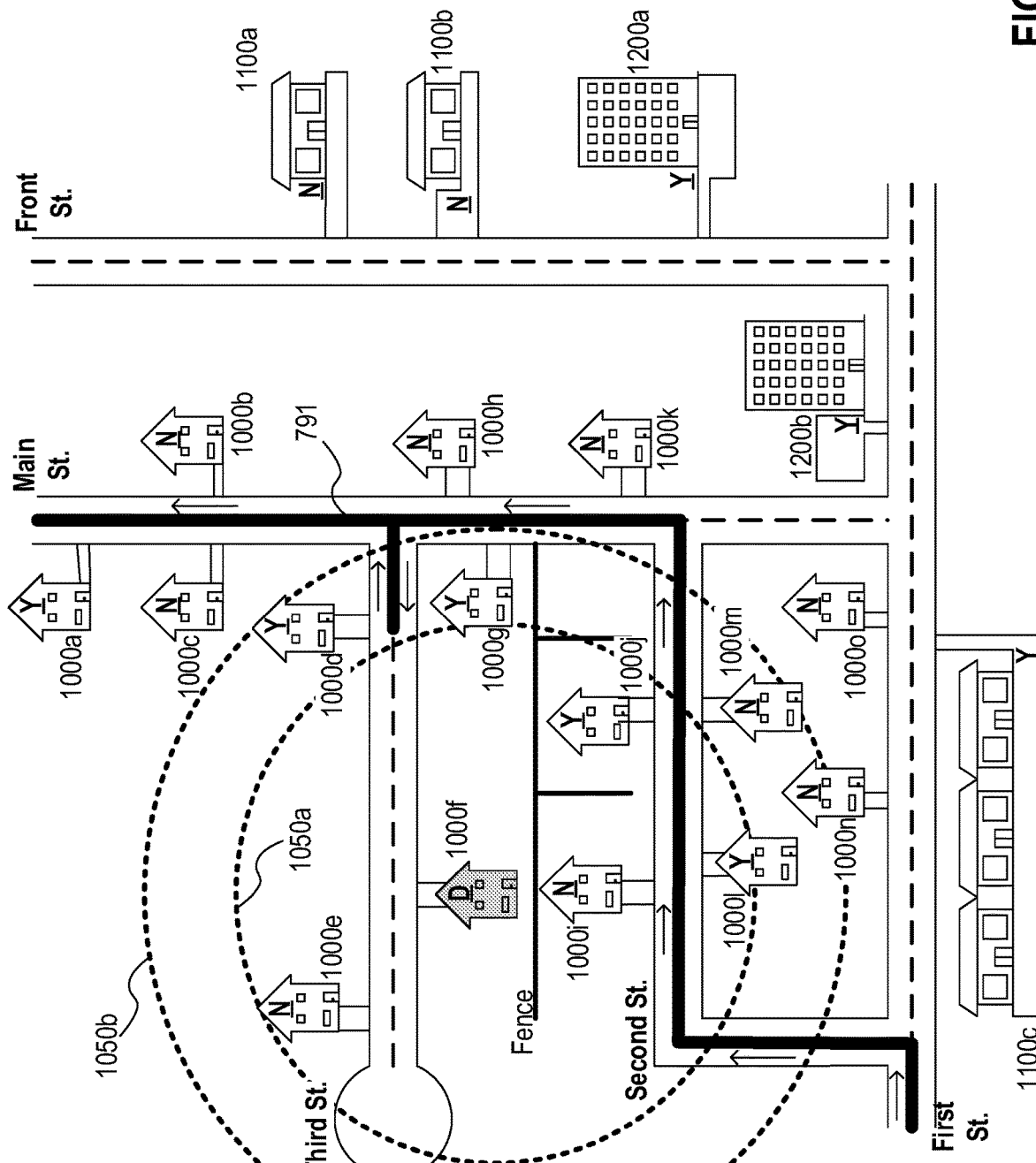

FIG. 6 is a flowchart showing an example method for determining whether autonomous delivery is available for various shipments/items, and FIGS. 7-9 provide schematic illustrations of various scenarios that may arise from the methodology shown in the flowchart of FIG. 6.

As shown at Block 601 of FIG. 6, an example method for establishing autonomous delivery eligibility begins by identifying shipments/item identified as autonomous-delivery eligible. These shipments may be identified based on information/data stored in a corresponding shipment/item profile (e.g., an indicator stored therein providing information/data regarding whether the shipment/item satisfies the one or more criteria for establishing autonomous delivery eligibility for the shipments/items). Identifying the shipments/items as autonomous delivery eligible may thus comprise steps for querying the item detail database to identify those shipment/item profiles indicating that the corresponding shipments/items are eligible for autonomous delivery. In certain embodiments, a mapping computing entity 110 querying the item detail database may populate a listing of autonomous delivery eligible shipments/items for further analysis in determining whether these shipments/items may be delivered autonomously from a manual delivery vehicle 100 traversing an established vehicle route.

A manual delivery vehicle route (e.g., an ordered listing of deliveries and/or a predefined travel path for a manual delivery vehicle) may be established prior to determining whether the autonomous delivery eligible shipments/items may be delivered autonomously, as indicated at Block 602 of FIG. 6. The manual delivery vehicle routes may be established based at least in part on the relative locations of manual deliveries to be delivered by a particular manual deliver vehicle 100 (and the associated manual delivery vehicle operator). In certain embodiments, the order in which the manual deliveries are scheduled to be delivered may be optimized to minimize the amount of resources consumed by the vehicle and/or vehicle operator while completing the delivery route. For example, the manual delivery vehicle route may be optimized to minimize an estimate fuel usage by the vehicle, an estimated amount of time to complete the route, and/or the like. In certain embodiments, a mapping computing entity 110 establishing the manual delivery vehicle route for a particular vehicle may complete the route optimization process for a plurality of vehicle routes in the aggregate, and may delegate various delivery stops to the vehicles to minimize the total resources utilized by the plurality of manual delivery vehicles 100 while completing all of the necessary delivery stops.

In certain embodiments, the manual delivery vehicle routes may be established to optimize resource usage for manual deliveries alone, and autonomous deliveries may be added thereto. However, in certain embodiments, the manual delivery vehicle routes may be established to minimize the amount of resources utilized to complete all of the manual deliveries and the autonomous deliveries. For example, the manual delivery vehicle route may be established having one or more autonomous delivery stops in which the manual delivery vehicle 100 stops at a predetermined location (which may or may not correspond to a manual delivery serviceable point) to enable the autonomous vehicles 140 to complete one or more deliveries while the manual delivery vehicle 100 remains stationary.

The established manual delivery vehicle route may comprise an ordered listing of deliveries to be completed by the manual delivery vehicle 100, and therefore the manual delivery vehicle route may not have an established vehicle travel path associated therewith. In such embodiments, the manual delivery vehicle operator may select a path between each of the deliveries along the delivery route. However, in certain embodiments, the established manual delivery vehicle route may identifying a manual delivery vehicle travel path establishing an expected path between the various established manual delivery vehicle stops along the manual delivery vehicle route.

As indicated at Block 603, the method comprises steps for determining one or more autonomous-vehicle delivery time radii surrounding each autonomous delivery destination serviceable point. The autonomous delivery destination serviceable points are the destination locations corresponding to each of the autonomous-delivery eligible shipments/items identified in the steps discussed at Block 601. For example, the dashed circles shown in FIGS. 7-9 represent the boundaries of geographic areas within respective autonomous-vehicle delivery time radii relating to residence 1000f (shown shaded for emphasis relative to other potential delivery serviceable points). As shown in FIGS. 7-9, each autonomous delivery destination serviceable point may be associated with a plurality of autonomous-vehicle delivery time radii, each representing a different estimated time for the autonomous delivery to complete an autonomous delivery from a manual delivery vehicle 100 positioned at the boundary of the geographical area. For example, boundary 1050a may be representative of an estimated autonomous delivery time of 10 minutes, and boundary 1050b may be representative of an estimated autonomous delivery time of 20 minutes. Although two boundaries are shown in FIGS. 7-9, it should be understood that any number of boundaries may be established for various autonomous delivery destinations.

In various embodiments, the autonomous-vehicle delivery time radii may be established independently for each autonomous delivery serviceable point (e.g., based on historical information/data indicative of an elapsed amount of time to complete autonomous deliveries from manual delivery vehicles 100 positioned at various distances away from the autonomous delivery serviceable point). However, in certain embodiments, the autonomous-vehicle delivery time radii may be established based on standardized distances away from the autonomous delivery serviceable point. For example, the standardized distances may be established based on an estimated time for the autonomous vehicle 140 to travel the standardized distance, to deposit a shipment/item at a destination serviceable point, and to travel the standardized distance again, back to the manual delivery vehicle 100.

With reference again to FIGS. 6-9, the autonomous-delivery time radii are compared against a delivery route (shown as line 790 in FIGS. 6-9) to determine an estimated amount of time that the delivery vehicle is likely to remain within the boundaries of the autonomous-delivery time radii, as indicated at Blocks 604-610. FIGS. 7-9 provide illustrative schematics of various steps performed as indicated at Blocks 605-610.

In each of FIGS. 7-9, the delivery route proceeds along First St., along the entire length of Second St., and then onto Main St. The manual delivery vehicle 100 delivers to various manual delivery serviceable points (indicated with a "Y" indication) along the manual delivery vehicle route. In each of FIGS. 7-9, residence 1000f is indicated as autonomous delivery eligible (indicated by the "D" indication and the grey shading), and residence 1000f is associated with two autonomous delivery radii, 1050a and 1050b. For purposes of discussion, autonomous delivery radii 1050a is associated with a minimum presence time of 10 minutes to permit autonomous delivery to residence 1000f; autonomous delivery radii 1050b is associated with a minimum presence time of 20 minutes to permit autonomous delivery to residence 1000f; and it is assumed that manual deliveries at residences (e.g., any of residences 1000a-1000o) takes 6 minutes.

FIG. 7 illustrates a scenario in which autonomous delivery is available based on the estimated amount of time that the manual delivery vehicle 100 will be positioned within delivery radii 1050a. As shown in FIG. 7, the manual delivery vehicle 100 is scheduled to make deliveries at residences 1000a, 1000i, and 1000j. Because residences 1000i and 1000j are located within delivery radius 1050a (with a minimum presence time of 10 minutes), and each manual delivery is estimated to require 6 elapsed minutes (for a total cumulative time within radius 1050*a* of at least 12 minutes), autonomous delivery to residence 1000*f* is permitted. Following the Blocks shown in FIG. 6, a mapping computing entity 110 reviewing the delivery route would determine that there is at least one delivery within the autonomous-delivery radius, as indicated at Block 605, at Block 607 the mapping computing entity 110 would determine that the estimated time to deliver a shipment/item at the single serviceable point (6 minutes) is less than the minimum presence time. At Block 609, the mapping computing entity 110 would determine that there is more than 1 delivery scheduled within radius 1050*a* (deliveries at residences 1000*i* and 1000*j*). At Block 610, the mapping computing entity 110 would determine that the cumulative estimated delivery time (12 minutes) is greater than the minimum presence time (10 minutes) and the mapping computing entity 110 would set the autonomous vehicle launch location as the first delivery serviceable point approached by the manual delivery vehicle 100 that is positioned within radius 1050*a*, as indicated at Block 608. In the case of FIG. 7, the autonomous vehicle 140 would launch from the manual delivery vehicle 100 when the manual delivery vehicle 100 reached residence 1000*i*. The autonomous vehicle 140 would be expected to complete the autonomous delivery to residence 1000*f* before the manual delivery vehicle 100 completes both deliveries to residences 1000*i* and 1000*j*.

FIG. 8 illustrates a scenario in which autonomous delivery is not available to residence 1000*f* because the manual delivery vehicle 100 is not expected to remain within either distance radii 1050*a*, 1050*b* for at least the minimum presence time. In the illustrated embodiment of FIG. 8, the only manual delivery serviceable point along the manual delivery vehicle route 790 that is within either radii 1050*a*, 1050*b* is a delivery to residence 1000*j*. Because the estimated delivery time to residence 1000*j* (6 minutes) is less than the minimum presence time for radius 1050*a* (10 minutes) and for radius 1050*b* (20 minutes), autonomous delivery may not be available for a shipment/item to be delivered to residence 1000*f*.

Describing the scenario of FIG. 8 in reference to the steps of FIG. 6, the mapping computing entity 110 may begin by first reviewing delivery eligibility under the smallest radius (e.g., corresponding to boundary 1050*a*), and then may repeat the various analytical processes for increasingly large distance radii upon a determination that autonomous delivery eligibility is not established. Accordingly, at Block 605, the mapping computing entity 110 would determine that there is at least one autonomous delivery within boundary 1050*a* (residence 1000*j*), however, at Block 607 the mapping computing entity 110 would determine that the estimated delivery time at the at least one delivery is less than the minimum presence time for the manual delivery vehicle 100 within the boundary 1050*a* (estimated delivery time of 6 minutes, versus a minimum presence time of 10 minutes). At Block 609, the mapping computing entity 110 would determine that no other manual deliveries scheduled within the area bounded by boundary 1050*a*. Although not shown in FIG. 6, the mapping computing entity 110 may then repeat the analysis represented by Blocks 605-610 with respect to the larger radius corresponding to boundary 1050*b*. However, there would be no additional deliveries within the area bounded by 1050*b*, and so the mapping computing entity 110 would then reclassify the delivery to residence 1000*f* as a manual delivery, as indicated at Block 606. Because this is added as a new manual delivery vehicle stop, the mapping computing entity 110 would proceed to generate a new manual delivery vehicle route incorporating a stop at residence 1000*f*, as indicated at Block 602.

FIG. 9 illustrates a scenario in which autonomous delivery is available to residence 1000*f* based on the amount of time that the manual delivery vehicle 100 is estimated to remain within the large area bounded by 1050*b* while traveling along the manual delivery vehicle route 791. In the illustrated embodiment of FIG. 9, the only delivery along the manual delivery vehicle route 791 that is within the area bounded by boundary 1050*a* is to residence 1000*j*. The estimated delivery time at residence 1000*j* (6 minutes) is less than the minimum presence time within boundary 1050*a* (10 minutes), and accordingly autonomous delivery to residence 1000*f* is not available based on the presence of the manual delivery vehicle 100 within boundary 1050*a*. However, there are estimated deliveries to residences 1000*j*, 10001, 1000*g*, and 1000*d* within the area bounded by 1050*b*, for a total estimated delivery time of 24 minutes (6 minutes for each delivery) within the area bounded by 1050*b*. This total estimated delivery time is greater than the minimum presence time for the area within boundary 1050*b* (20 minutes), and accordingly autonomous delivery is available for a shipment/item destined to residence 1000*f* As noted in FIG. 9, the delivery route for the manual delivery vehicle 100 passes out of the area bounded by 1050*b* while the delivery vehicle travels along Main Street, although the manual delivery vehicle 100 passes into the area bounded by 1050*b* while making deliveries to residences 1000*g* and 1000*d*. In various embodiments, determining whether a manual delivery vehicle 100 is estimated to remain within a radius distance for at least a minimum presence time may comprise summing the total estimated amount of time the manual delivery vehicle 100 is expected to remain within the radius distance, regardless of whether the manual delivery vehicle 100 temporarily leaves the bounded area. In other words, the total presence time within the bounded area need not be continuous. However, in certain embodiments, each time the manual delivery vehicle 100 leaves the bounded area, the total presence time may reset, and accordingly the total presence time for the vehicle within a bounded area may be the total continuous presence time for the vehicle within the bounded area. In such an embodiment, the scenario shown in FIG. 9 would not enable autonomous delivery to residence 1000*f*.

With reference again to FIG. 6, the scenario shown in FIG. 9 would be represented by the following computing entity determinations. The mapping computing entity 110 would first proceed through Blocks 605-610 with respect to boundary 1050*a*, and would determine that autonomous delivery is not eligible based on manual deliveries within boundary 1050*a* (the only delivery within boundary 1050*a* is at residence 1000*j*). The mapping computing entity 110 would then repeat the analysis of Blocks 605-610 with respect to boundary 1050*b*. With respect to boundary 1050*b*, the mapping computing entity 110 would determine that there is at least one delivery within boundary 1050*b* (for example, at residence 10001), as shown at Block 605. At Block 607, the mapping computing entity 110 would determine that the estimated delivery time at residence 10001 (6 minutes) is less than the minimum presence time (20 minutes) within boundary 1050*b*. At Block 609, the mapping computing entity 110 would determine that additional deliveries are scheduled within boundary 1050*b* (e.g., deliveries at residences 10001, 1000*j*, 1000*g*, and 1000*d*). At Block 610, the mapping computing entity 110 would determine that the cumulative estimated delivery time for all of the deliveries (24 minutes) is greater than the minimum presence time (20 minutes). Accordingly, at Block 608 the mapping computing entity 110 sets the autonomous delivery launch location as residence 10001 (the first delivery within boundary 1050*b*).

For purposes of simplicity of explanation the forgoing discussion assumed that the manual delivery vehicle 100 is only present within a distance radius during the period of time that the manual delivery vehicle 100 is located at a scheduled delivery stop. However, it should be understood that in various embodiments, the travel time that the manual delivery vehicle 100 is moving within the radius (e.g., between delivery serviceable points), inclusive of travel delays (e.g., stops to turn across traffic, stops at traffic signals, and/or the like) may be considered when determining whether a manual delivery vehicle 100 is estimated to be present within a radius for at least the corresponding minimum presence time.

Moreover, in various embodiments, the launch location for an autonomous vehicle 140 may be set to any of a variety of locations within a radius area. For example, the launch location may be the location where the manual delivery vehicle 100 crosses into the radius area (e.g., at the time and location where the manual delivery vehicle 100 crosses into the radius area). With respect to FIG. 7 as an example, the launch location may be set to be immediately before the manual delivery vehicle 100 makes a right turn to follow the direction of travel of Second Street. Such embodiments are particularly available in embodiments in which the autonomous vehicle 140 is capable of launching from the manual delivery vehicle 100 while the manual delivery vehicle 100 is moving.

In certain embodiments, a determination of whether the manual delivery vehicle 100 is to be located within an autonomous delivery eligibility radius may be determined in real-time, by comparing a mapped representation of the manual delivery vehicle route against one or more boundaries, as illustrated in FIGS. 7-9. However, as discussed herein, various embodiments may determine whether a particular delivery serviceable point is eligible for autonomous delivery based on linked delivery serviceable points stored within a serviceable point profile for the autonomous delivery serviceable point. For example, FIG. 10 provides an example of information/data stored within a serviceable point profile for residence 1000*f* that may be utilized to determine whether autonomous delivery is available. As shown in FIG. 10, the serviceable point profile may comprise information/data identifying the one or more linked delivery serviceable points located within autonomous delivery ranges (e.g., corresponding to boundaries 1050*a*, 1050*b* of FIGS. 7-9). Accordingly, a determination of whether autonomous delivery to the serviceable point (e.g., Residence 1000*o*), may comprise querying the item detail database to determine whether shipments/items are scheduled to be delivered to any of the one or more linked serviceable points, and then determining whether the cumulative delivery time for the one or more shipments/items satisfies an applicable minimum presence time. With reference to the scenario shown in FIG. 7, autonomous delivery eligibility for deliveries to Residence 1000*f* may be determined by querying the serviceable point profile corresponding to Residence 1000*f* (as shown in FIG. 10) to identify linked serviceable points within boundaries 1050*a*, 1050*b*. A mapping computing entity 110 may be configured to determine that Residences 1000*e*, 1000*i*, and 1000*j* are within boundary 1050*a* based on the information/data stored in the serviceable point profile for Residence 1000*f*. Accordingly, the mapping computing entity 110 may then query the item detail database to determine whether shipments/items are scheduled for manual delivery to any of Residences 1000*e*, 1000*i*, and/or 1000*j*. In the scenario shown in FIG. 7, the mapping computing entity 110 may be configured to determine that deliveries are scheduled to Residences 1000*i* and 1000*j*. Accordingly based on the information/data stored within the serviceable point profile (e.g., as shown in FIG. 10), the mapping computing entity 110 may determine that the manual delivery vehicle 100 is estimated to remain within boundary 1050*a* for at least the minimum presence time (e.g., 10 minutes) based on the cumulative delivery time for deliveries to Residences 1000*i* and 1000*j* (e.g., 12 minutes). Accordingly, autonomous delivery to Residence 1000*f* is available.

B. Determining Autonomous Delivery Eligibility based on Manual Delivery Destination Serviceable Points In various embodiments, determining whether one or more items may be delivered autonomously may be based at least in part on the location of the prospective autonomous delivery serviceable point relative to the location of a manual delivery serviceable point identified as an autonomous vehicle launch location. As discussed in reference to FIGS. 11-12, autonomous delivery eligibility may be established for autonomous delivery destinations if an autonomous delivery serviceable point is within a defined distance (e.g., linear distance) of a particular manual delivery serviceable point identified as an autonomous vehicle launch location. For example, delivery serviceable points having an extended estimated elapsed delivery time may be identified as potential autonomous vehicle launch locations, because the manual delivery vehicle 100 is expected to remain stationary for an extended period of time, permitting autonomous deliveries to depart from the manual delivery vehicle 100, deliver a shipment/item at an autonomous delivery serviceable point, and return to the manual delivery vehicle 100 while the manual delivery vehicle 100 remains located at the manual delivery serviceable point.

Establishing a particular manual delivery serviceable point as a launch location may be done dynamically and in real-time, based on the estimated elapsed delivery time at a particular serviceable point. For example, after establishing a manual delivery vehicle 100 route, the estimated elapsed delivery time for each manual delivery serviceable point may be compared against a launch location criteria to determine whether the manual delivery serviceable point may be considered a launch location for the particular delivery route. For example, the launch location criteria may specify a threshold estimated elapsed delivery time (e.g., a minimum estimated elapsed delivery time) for a particular manual delivery serviceable point to be considered a launch location.

Alternatively, various manual delivery serviceable points may be pre-selected as autonomous vehicle launch locations. Such manual delivery serviceable points may be pre-selected based on historical information/data indicating that the manual delivery serviceable points have historically had an extended average elapsed delivery time when making deliveries to the manual delivery serviceable point. For example, based on retrieved historical data, a mapping computing entity 110 may be configured to determine that the average elapsed delivery time for a particular manual delivery serviceable point satisfies launch location criteria (e.g., specifying a threshold (e.g., minimum) estimated elapsed delivery time). As examples, deliveries to large office buildings, apartment buildings, condominium buildings, and/or the like may be determined to satisfy applicable launch location criteria.

In certain embodiments, the defined distance for autonomous deliveries from a particular manual delivery serviceable point may be defined for each manual delivery serviceable point individually. For example, the defined distance for a first apartment building may be larger than the defined distance for a second office building. In such embodiments, the estimated elapsed delivery time for the first apartment building may be longer than the estimated elapsed delivery time for the second office building, and accordingly the amount of time that one or more autonomous vehicles 140 may be away from the manual delivery vehicle 100 may be longer while the manual delivery vehicle 100 is located at the first apartment building than the second office building. However, it should be understood that in certain embodiments, a defined distance for autonomous deliveries may be universally applied to all identified launch locations (e.g., a defined distance of 1 mile may be utilized for all launch locations), and such a defined distance may be based at least in part on a travel range of the autonomous vehicles 140.

Moreover, the defined distance for each launch location may be established dynamically, for example based on the estimated elapsed delivery time for deliveries to a particular manual delivery serviceable point during an established delivery route. Upon establishing a delivery route, inclusive of deliveries to a manual delivery destination identified as a launch location, a mapping computing entity 110 may determine the estimated elapsed delivery time at the identified launch location, and may dynamically establish the defined distance based on the estimated elapsed delivery time. For example, the defined distance may be established as the maximum distance that an autonomous vehicle 140 can travel away from the manual delivery vehicle 100 to complete an autonomous delivery and still return to the manual delivery vehicle 100 before the expiration of the estimated elapsed delivery time at the manual delivery serviceable point. However, it should be understood that the defined distance for each launch location may be pre-established for each launch location, and may not be dependent on expected deliveries to the manual delivery serviceable point. For example, the defined distance for a first apartment building may be set to be 1.5 miles, regardless of the number of deliveries made to the first apartment building during a particular delivery route.

Figure 11:
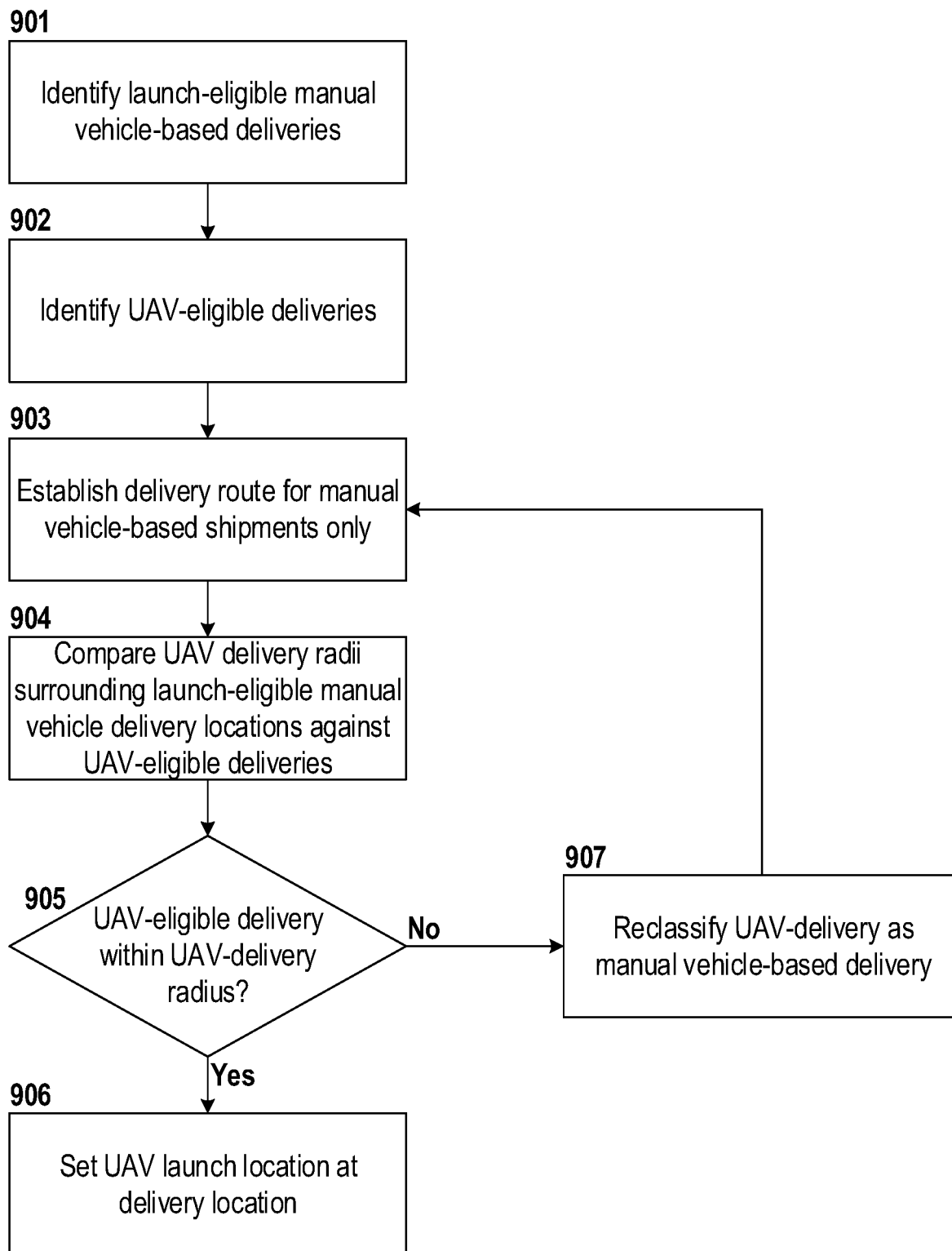
FIG. 11 is a flowchart depicting various steps for establishing a drone launch location according to various embodiments.
Figure 12:
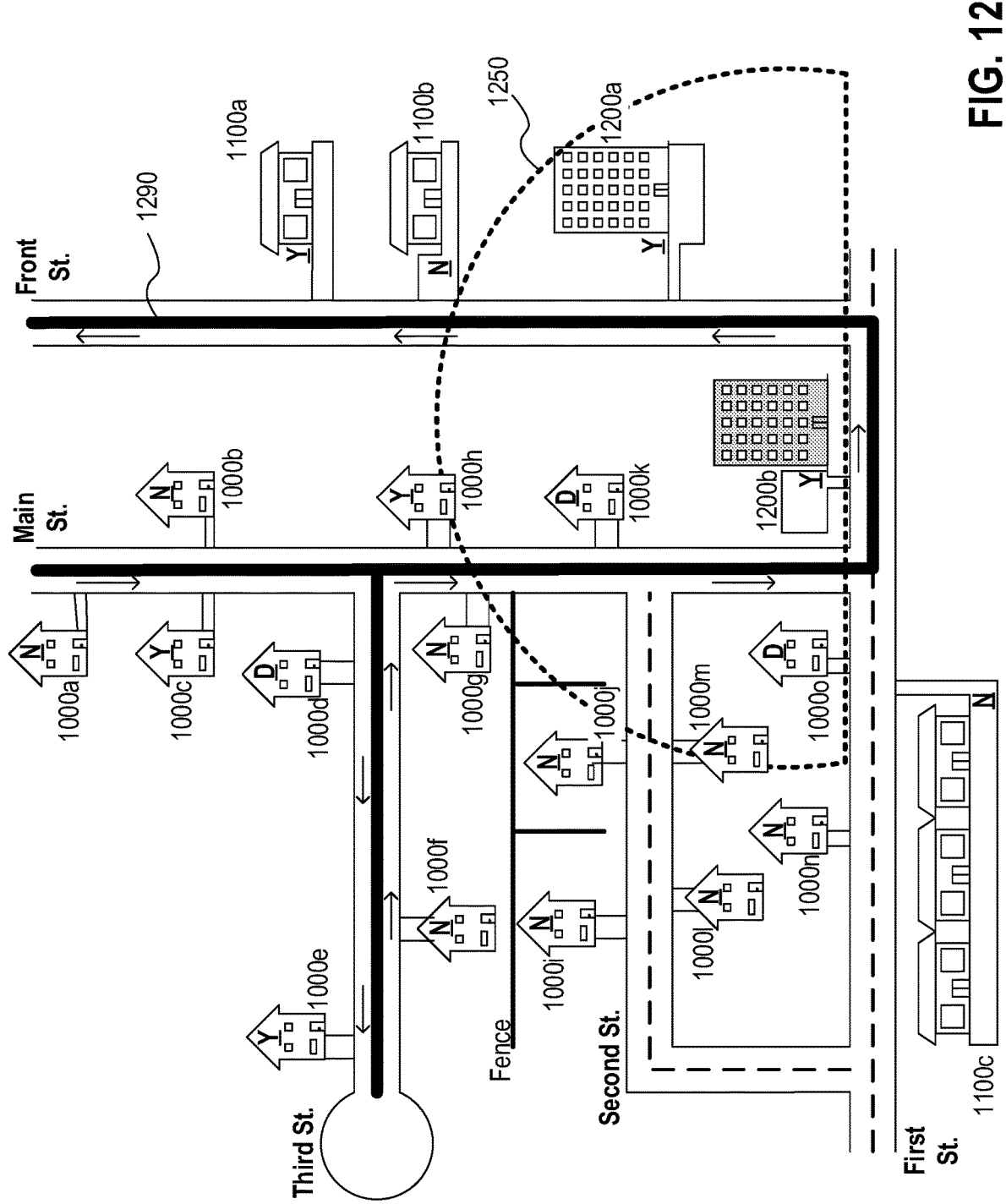
FIG. 12 depicts an example manual delivery vehicle travel path relative to various delivery locations according to various embodiments.

FIG. 11 is a flowchart showing an example method for determining whether autonomous delivery is available for various shipments/items, and FIG. 12 provides a schematic illustration of a scenario in which autonomous delivery is available according to the methodology of FIG. 11.

As shown at Block 901 of FIG. 11, an example method for establishing autonomous delivery eligibility begins by identifying manual delivery serviceable points deemed to be potential launch locations. As noted herein, launch locations may be pre-established, and accordingly various serviceable points may be identified as launch locations for a vehicle route (e.g., a serviceable point profile corresponding to a particular serviceable point may identify that the serviceable point is a launch location). However, as noted above, launch locations may be determined dynamically, based on a determination that a manual delivery vehicle 100 is estimated to remain at a particular manual delivery serviceable point for more than a threshold amount of time, thereby enabling autonomous deliveries to be completed while the manual delivery vehicle 100 remains at the manual delivery serviceable point.

As indicated at Block 902, autonomous-delivery eligible shipments/items are identified that are scheduled to be delivered during a particular vehicle route. As noted above, the autonomous-delivery eligible shipments/items may be indicated as being autonomous-delivery eligible in a shipment/item profile corresponding to the shipment/item.

As noted at Block 903, various embodiments comprise steps for establishing a delivery route for the manual-deliveries. Such a manual delivery vehicle route may be established according to the methodology discussed in reference to FIG. 6, above. Although shown as occurring after Blocks 901 and 902, it should be understood that the steps reflected by Blocks 901-903 may be performed in any order.

With reference to FIGS. 11-12, the location of the identified autonomous-delivery eligible shipments/items may be compared against one or more delivery radius surrounding the one or more identified launch locations to determine whether autonomous delivery from the launch locations may be completed to the autonomous-delivery eligible delivery serviceable points.

For example, in the scenario shown schematically in FIG. 12, a manual delivery vehicle 100 traversing delivery route 1290 makes delivery stops at a plurality of residences 1000*a*-*o*, shops 1100*a*-*c*, and office buildings 1200*a*-*b* (e.g., those indicated with a "Y" to reflect a scheduled manual delivery stop). Of particular relevance, office building 1200*b* (shaded in grey for emphasis) has been indicated as a launch location for autonomous deliveries. As noted above, office building 1200*b* may have been pre-established as a launch location, or office building 1200*b* may have been established as a launch location responsive to determining that the manual delivery vehicle 100 is estimated to be located at the office building 1200*b* for at least a threshold amount of time to enable autonomous deliveries while the manual delivery vehicle 100 remains at the office building 1200*b*.

As shown in FIG. 12, office building 1200*b* may be associated with an autonomous delivery range indicated by boundary 1250. As mentioned herein, the autonomous delivery range may be pre-established for office building 1200*b*, or the autonomous delivery range may be established dynamically, for example, based at least in part on an estimated elapsed time to complete the manual deliveries at the office building 1200*b*.

In the scenario of FIG. 12, comparing the destination serviceable point for various autonomous-delivery eligible shipments/items (Residences 1000*d*, 1000*k*, and 1000*o*; as indicated by the "D" indicator corresponding to each residence) as indicated at Blocks 904-905 of FIG. 11, indicates that only Residences 1000*k* and 1000*o* are within the autonomous-delivery eligible radius of office building 1200*b*. Accordingly, the autonomous-delivery eligible shipment/item destined for Residence 1000*d* is reclassified as a manual delivery shipment/item, as indicated at Block 907, and the delivery route is updated to reflect the stop at Residence 1000*d*, as indicated at Block 903.

With respect to Residences 1000*k* and 1000*o*, the mapping computing entity 110 may determine that these residences are within the autonomous-delivery eligible range of office building 1200*b*, and accordingly the mapping computing entity 110 may establish office building 1200*b* as the launch location for autonomous deliveries to each of Residences 1000*k* and 1000*o*, as shown at Block 906.

In certain embodiments, a determination of whether autonomous delivery may be completed to a particular destination serviceable point may be determined in real-time, by comparing a mapped representation of the autonomous delivery serviceable points against various launch locations, as illustrated in FIG. 12. However, as discussed herein, various embodiments may determine whether a particular delivery serviceable point is eligible for autonomous delivery based on linked delivery serviceable points stored within a serviceable point profile for the identified launch location. For example, FIG. 13 provides an example of information/data stored within a serviceable point profile for office building 1200*b* that may be utilized to determine whether autonomous delivery is available for one or more shipments/items to be delivered to locations surrounding office building 1200*b*. As shown in FIG. 13, the serviceable point profile may comprise information/data identifying the one or more linked delivery serviceable points located within autonomous delivery range (e.g., corresponding to boundary 1250 of FIG. 12). Accordingly, a determination of whether autonomous delivery to a particular serviceable point is available may comprise querying the serviceable point profile database based on information/data identifying a destination serviceable point for a particular shipment/item to determine whether the destination serviceable point is stored as a linked serviceable point to one or more launch locations. With reference to the scenario shown in FIG. 12, upon receipt of information/data indicating that shipments/items to residences 1000*d*, 1000*k*, and 1000*o* are eligible for autonomous delivery, the mapping computing entity 110 may be configured to query the serviceable point profile database to determine whether any of residences 1000*d*, 1000*k*, and/or 1000*o* are identified as linked serviceable points located within an autonomous delivery range of an identified launch location and identified within the serviceable point profile corresponding to the identified launch location. Accordingly, the mapping computing entity 110 would retrieve the serviceable point profile corresponding to the office building 1200*b* (e.g., based on the results of a query for serviceable point profiles identifying one or more of residences 1000*d*, 1000*k*, and/or 1000*o* as linked serviceable points) and would determine that only residences 1000*k* and 1000*o* are located within an autonomous delivery range of office building 1200*b*. Responsive to determining that residence 1000*d* is not identified as a linked serviceable point within other serviceable point profiles corresponding to launch locations, the delivery to residence 1000*d* is reclassified as a manual delivery shipment/item.

Although not shown in any of FIGS. 11-13, in various embodiments a particular launch location may be associated with an autonomous delivery limit establishing a maximum number of autonomous deliveries that may be made while the manual delivery vehicle 100 is located at the launch location. The autonomous delivery limit may be pre-established for a particular launch location, and may be stored in the serviceable point profile for the launch location. In certain embodiments, the autonomous delivery limit may comprise a plurality of autonomous delivery limits, each of which provide an autonomous delivery limit based on the number of autonomous vehicles 140 carried by a particular manual delivery vehicle 100. For example, the autonomous vehicle limit for a particular apartment building may set a first maximum number of autonomous deliveries to 6 for manual delivery vehicles 100 carrying 3 autonomous vehicles 140; and a second maximum number of autonomous deliveries to 12 for manual delivery vehicles 100 carrying 6 autonomous vehicles 140.

C. Determining Autonomous Delivery Eligibility Based on Geofences

In various embodiments, determining whether one or more items may be delivered autonomously may be based at least in part on the location of the prospective autonomous delivery serviceable point relative to a defined geofenced area. As discussed in reference to FIGS. 14-15, autonomous delivery eligibility may be established for autonomous delivery destinations if an autonomous delivery serviceable point is positioned within a geofenced area satisfying a geofence-delivery criteria. For example, if the autonomous delivery serviceable point is positioned within a geofence comprising a threshold (e.g., minimum) number of manual delivery serviceable points along a vehicle route, then the autonomous delivery serviceable point is eligible for autonomous delivery. As a specific example, a particular geofence may be defined around a neighborhood comprising a plurality of residences, around a particular zip code, around a particular town, around a particular subsection of a neighborhood, and/or the like.

In certain embodiments, a mapping computing entity 110 may be configured to automatically generate a geofence to encompass a plurality of delivery serviceable points. For example, a geofence may be automatically generated in response to user input indicating that a plurality of delivery serviceable points should be grouped within the defined geofence. Upon receipt of such user input, the mapping computing entity 110 may be configured to automatically determine the location of boundaries of a geofence to encompass the identified delivery serviceable points, for example, based on location information/data stored in serviceable point profiles corresponding to the identified delivery serviceable points.

In certain embodiments, the mapping computing entity 110 may be configured to store information/data indicative of a plurality of geofenced areas in association with corresponding cluster profiles. Each cluster profile may be stored in a cluster profile database and may comprise information/data identifying those serviceable points within a common geofenced area. For example, all those serviceable points determined to be within a single geofenced area may be identified to be within a single cluster associated with a corresponding cluster profile.

In certain embodiments, the inclusion of a serviceable point within a particular geofenced area may be identified according to information/data stored in serviceable point profiles. For example, each serviceable point profile may comprise a cluster-identifier field having a unique identifier corresponding to the cluster stored therein. To identify serviceable points within a common cluster, the serviceable point profile database may be queried to compile a listing of all those serviceable points sharing a common cluster identifier.

Alternatively, each serviceable point profile may identify each other serviceable point within a common cluster as linked serviceable points within the serviceable point profile. FIG. 16 illustrates example information/data that may be stored in a serviceable point profile for a serviceable point within a cluster of serviceable points, according to one embodiment. As shown in FIG. 16, the serviceable point profile may comprise a cluster identifier field and a listing of linked serviceable points within the same cluster. However, as noted above, a serviceable point profile may comprise only one of (1) the cluster identifier field or (2) the listing of linked serviceable points within the same cluster.

Figure 14:
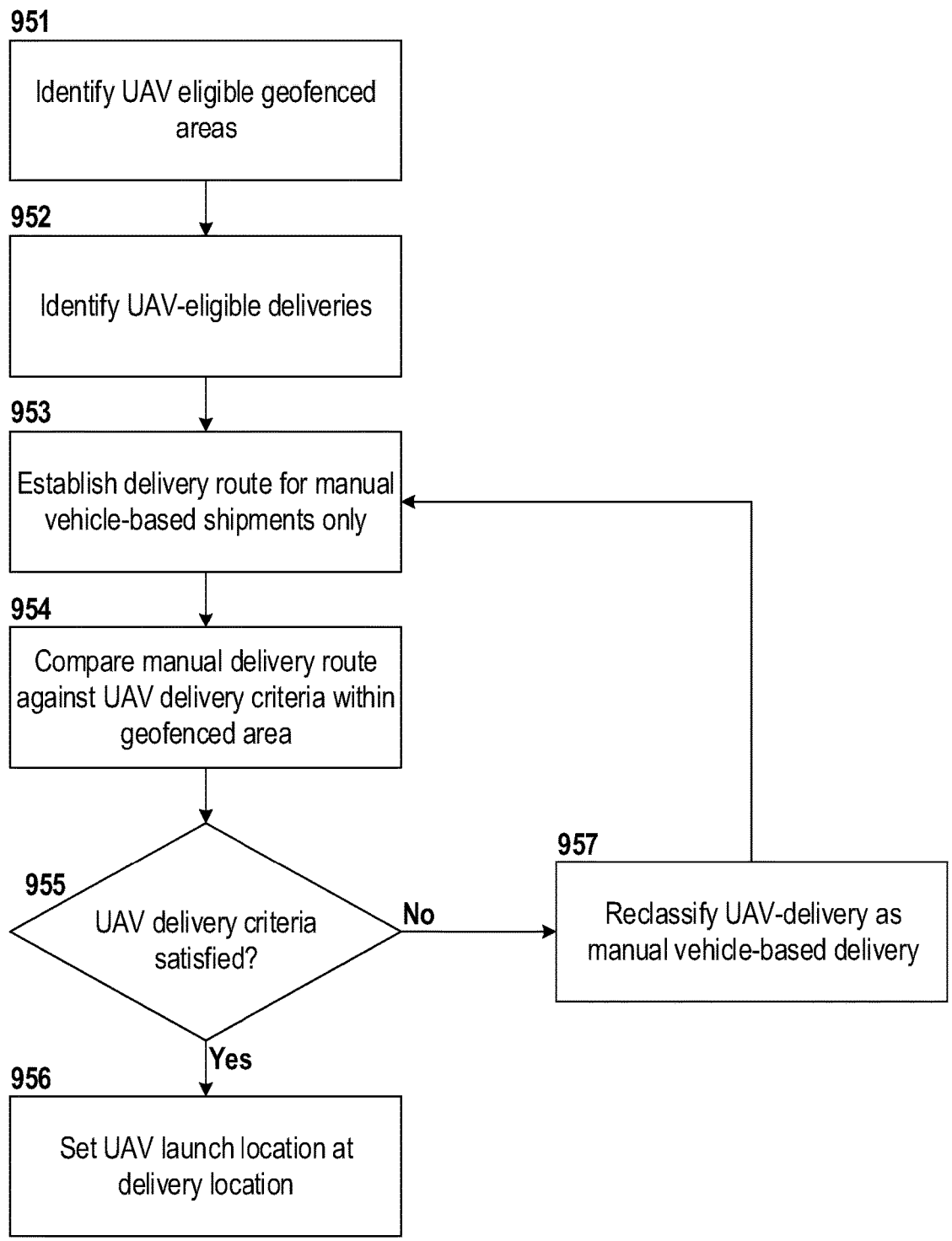
FIG. 14 is a flowchart depicting various steps for establishing a drone launch location according to various embodiments.
Figure 15:
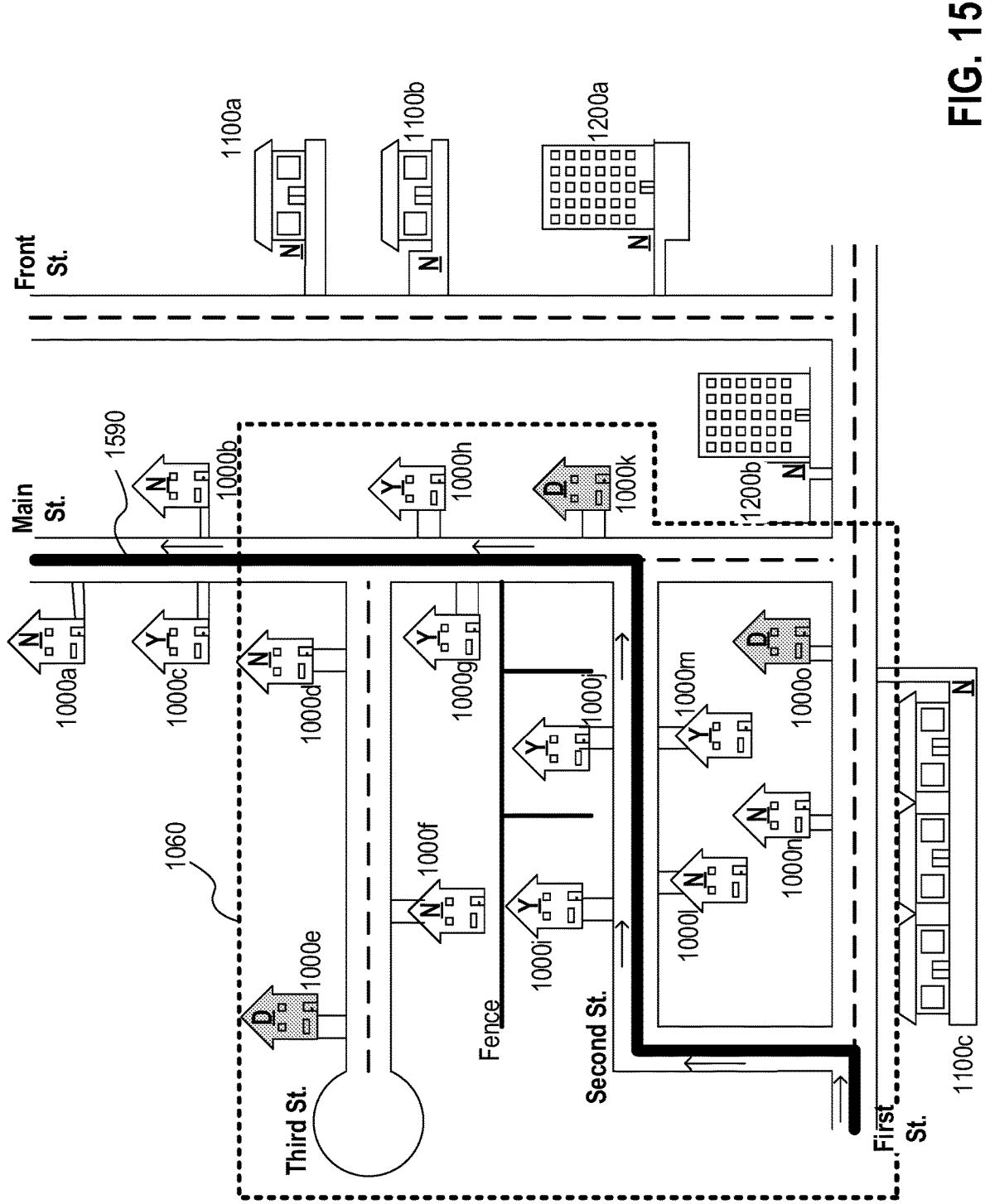
FIG. 15 depicts an example manual delivery vehicle travel path relative to various delivery locations according to various embodiments.

As indicated in FIGS. 14-15, the mapping computing entity 110 may be configured to determine whether autonomous delivery is available for one or more autonomous-delivery eligible shipments/items. Specifically, FIG. 14 is a flowchart showing an example method for determining whether autonomous delivery is available for various shipments/items, and FIG. 15 provides a schematic illustration of a scenario in which autonomous delivery is available according to the methodology of FIG. 14.

As shown at Block 951 of FIG. 14, an example method for establishing autonomous delivery eligibility begins by identifying geofenced areas identified as autonomous-delivery eligible. For example, various neighborhoods may be identified as autonomous delivery eligible, such that various shipments/items destined for delivery to locations within the neighborhood may be delivered autonomously while other shipments/items destined for delivery to locations within the neighborhood are delivered manually.

Upon identifying a geofenced area identified as autonomous-delivery eligible, the mapping computing entity 110 is configured to identify one or more autonomous-delivery eligible shipments/items destined for delivery to locations within the identified geofenced area, as indicated at Block 952. As noted above, the autonomous-delivery eligible shipments/items may be indicated as being autonomous-delivery eligible in a shipment/item profile corresponding to the shipment/item.

As noted at Block 953, various embodiments comprise steps for establishing a delivery route for manual deliveries. Such a manual delivery vehicle route may be established according to the methodology discussed in reference to FIG. 6, above. Although shown as occurring after Blocks 951 and 952, it should be understood that the steps reflected by Blocks 951-953 may be performed in any order.

With reference to FIGS. 14-15, the established manual delivery vehicle route 1590 and the one or more autonomous-delivery eligible shipments/items may be compared against geofence-delivery criteria to determine whether autonomous delivery is available for one or more shipments/items. For example, the geofence-delivery criteria may specify a minimum number of manual deliveries within the geofenced area to enable autonomous delivery of various shipments/items. In certain embodiments, the minimum number of manual deliveries may specify the overall minimum number of manual deliveries for any number of autonomous deliveries. For example, the geofence-delivery criteria may indicate that there must be at least three manual deliveries scheduled within the geofenced area for autonomous delivery to be available for any shipments/items. In certain embodiments however, the minimum number of manual deliveries may specify a minimum number of manual deliveries for each scheduled autonomous delivery within the geofenced area. For example, the geofence-delivery criteria may indicate that there must be at least two manual deliveries scheduled within the geofenced area for each autonomous delivery scheduled within the geofenced area. As a more specific example, to deliver one shipment/item autonomously within the geofenced area, there must be at least two scheduled manual deliveries within the geofenced area. By extension to delivery two shipments/items autonomously, there must be four manual deliveries within the same geographical area.

As yet another example, the geofence-delivery criteria may specify a minimum estimated presence time for the manual delivery vehicle 100 to be located within the geofenced area. The estimated presence time may be determined based on an estimated elapsed delivery time at each manual delivery serviceable point within the geofenced area. In certain embodiments, the estimated presence time may comprise the cumulative estimated delivery time at each of the manual delivery serviceable points, the estimated travel time for the manual delivery vehicle 100 within the geofenced area, and/or the like.

In certain embodiments, the geofence-delivery criteria may be established for each geofenced area independently. For example, a first geofenced area may have a first set of geofence-delivery criteria associated therewith, and a second geofenced area may have a second set of geofence-delivery criteria associated therewith.

With reference to the scenario illustrated in FIG. 9, initially assume the geofence-delivery criteria specifies an absolute minimum number of manual deliveries required for any number of autonomous deliveries within the same geofenced area. For purposes of discussion, assume the defined minimum number of manual deliveries is 4. Accordingly, because there are 4 scheduled manual deliveries within the geofenced area (at Residences 1000$i$, 1000$j$, 1000$g$, and 1000$h$; indicated with the "Y" indicator on each), the geofence-delivery criteria is determined to be satisfied, as indicated at Block 955 of FIG. 14. Accordingly, autonomous-delivery is available to all 3 autonomous-delivery eligible serviceable points (Residences 1000$e$, 1000$k$, and 1000$o$; indicated with the "D" indicator and shaded for emphasis). Thus, as indicated at Block 956 of FIG. 14, the mapping computing entity 110 would set the autonomous vehicle launch location as the first delivery serviceable point approached by the manual delivery vehicle 100 that is positioned within geofenced area 1060 (i.e., Residence 1000$i$ in the scenario illustrated in FIG. 15). As discussed in reference to FIG. 6, the launch location for the autonomous vehicle 140 may be set to any of a variety of locations, such as the location where the manual delivery vehicle 100 first crosses into geofenced area 1060. The autonomous vehicle(s) 140 would be expected to complete all of the autonomous deliveries before the manual delivery vehicle 100 completes all of the manual deliveries within the same geofenced area 1060.

Again with reference to FIG. 9, now assume the geofence-delivery criteria specifies a minimum number of manual deliveries required for each autonomous delivery within the geofenced area. For purposes of discussion, assume the defined minimum number of manual deliveries for each autonomous delivery is 2. Accordingly, because there are 4 scheduled manual deliveries within the geofenced area 1060, only 2 autonomous deliveries may be completed. As discussed in greater detail herein, the mapping computing entity 110 may utilize any of a variety of methodologies for resolving autonomous delivery conflicts to determine which autonomous-delivery eligible shipment/item should be reclassified as a manual delivery shipment/item. For example, because reclassifying the delivery to Residence 1000$k$ as a manual delivery would not require a change to the manual delivery vehicle route, the mapping computing entity 110 may reclassify the delivery to Residence 1000$k$ as a manual delivery, as indicated at Block 957. As indicated in the prior example, the mapping computing entity 110 would set the autonomous vehicle launch location as the first delivery serviceable point approached by the manual delivery vehicle 100 that is positioned within geofenced area 1060 (i.e., Residence 1000$i$ in the scenario illustrated in FIG. 15) for autonomous deliveries to Residences 1000$e$ and 1000$o$. As discussed in reference to FIG. 6, the launch location for the autonomous vehicle 140 may be set to any of a variety of locations, such as the location where the manual delivery vehicle 100 first crosses into geofenced area 1060. The autonomous vehicle(s) 140 would be expected to complete all of the autonomous deliveries before the manual delivery vehicle 100 completes all of the manual deliveries within the same geofenced area 1060.

In certain embodiments, a determination of whether the manual delivery vehicle 100 will satisfy the geofence-delivery criteria may be made in real-time, by comparing a mapped representation of the manual delivery vehicle route (inclusive of scheduled stops) against the boundaries of a geofenced area, as illustrated in FIG. 15. However, as discussed herein, various embodiments may determine whether one or more delivery serviceable points are eligible for autonomous delivery based on linked delivery serviceable points stored within a serviceable point profile, based on delivery serviceable points identified within a cluster profile, and/or the like. As noted above, FIG. 16 provides an example of information/data stored within a serviceable point profile for residence 1000i that may be utilized to determine whether autonomous delivery is available to various locations within geofenced area 1060. Accordingly, a determination of whether autonomous delivery for shipments/items destined to various locations within geofenced area 1060 may be determined by querying the serviceable point profiles corresponding to various locations with the geofenced area 1060 to identify linked serviceable points within the common geofenced area 1060. The mapping computing entity 110 may determine how many of the linked serviceable points have corresponding manual deliveries scheduled to their locations, and how many of the serviceable points have autonomous deliveries schedule to their respective locations. The mapping computing entity 110 may then compare the number of manual deliveries (and/or the estimated elapsed time of manual deliveries) and/or the number of autonomous deliveries against the geofence-delivery criteria to determine whether autonomous delivery is available for any of the shipments/items, as indicated in FIG. 14.

D. Resolving Autonomous Delivery Eligibility Conflicts

The forgoing methodologies for establishing autonomous delivery eligibility may result in scenarios in which autonomous delivery to a particular location may be available from a plurality of launch locations, and/or the mapping computing entity 110 may be required to select only a subset of autonomous-delivery eligible shipments/items to reclassify as manual delivery shipments/items. The mapping computing entity 110 may be configured to resolve such conflicts to optimize the overall delivery activities (inclusive of both manual deliveries and autonomous deliveries) assigned to a particular manual delivery vehicle 100. For example, the mapping computing entity 110 may be configured to minimize resource usage by the manual delivery vehicle 100, the autonomous vehicle 140, and/or the like.

1. Selecting One of a Plurality of Possible Launch Locations

In certain embodiments, autonomous delivery may be available to a particular autonomous delivery serviceable point from a plurality of possible launch locations. With reference to FIG. 12, for example, if both office buildings 1200a and 1200b were indicated as possible launch locations, residence 1000k may be within an autonomous delivery range of both office buildings 1200a and 1200b. In order to determine which of the possible launch locations should be utilized for autonomous delivery, the mapping computing entity 110 may apply a delivery criteria hierarchy to select a particular launch location for an autonomous delivery. The delivery criteria hierarchy may comprise one or more criteria to be utilized to identify an optimal launch location for autonomous delivery. The criteria may be organized in a descending order of importance, such that the most-important criteria that resolves an outstanding conflict is automatically applied to establish an optimal launch location.

In certain embodiments, the delivery criteria hierarchy may cause the mapping computing entity 110 to analyze a plurality of autonomous delivery conflicts simultaneously to generate an optimal delivery plan for the manual delivery vehicle 100. An example delivery criteria hierarchy is discussed below, although it should be understood that any criteria or combination of criteria may be utilized to resolve conflicts.

As an example, a delivery criteria hierarchy may consider the criteria listed in the chart below, beginning with the criteria identified as having the highest importance, and sequentially considering additional criteria having descending importance until the conflict is resolved.

| Importance Ranking | Criteria |
| --- | --- |
| 1 | Maximizing the total number of autonomous deliveries. |
| 2 | Minimizing the distance travelled by the manual delivery vehicle along the delivery route. |
| 3 | Minimizing the distance travelled by the autonomous vehicles. |
| 4 | Launching from a location having a larger estimated duration. |
| 5 | Delivering from an earlier-approached launch location. |
| 6 | Random selection. |

In certain embodiments, launch locations for various shipments/items may be selected in order to maximize the total number of autonomous deliveries that may be performed within the confines of applicable autonomous-delivery criteria. For example, the autonomous delivery criteria may set a maximum number of autonomous deliveries that may be performed from any one launch location. Accordingly, launch locations for particular shipments/items may be delegated between various shipments/items to maximize the total number of shipments/items that may be delivered autonomously. As a specific, and simplified example, assume the maximum number of autonomous deliveries that may be made from a particular launch location is 1. In such an embodiment, if a first shipment/item may be delivered autonomously from either a first launch location or a second launch location, but a second shipment/item may only be delivered autonomously from the second launch location, then the mapping computing entity 110 sets the first shipment/item to be launched at the first launch location, and the second shipment/item to be launched at the second launch location.

In the event that the criteria for maximizing the total number of autonomous deliveries does not resolve outstanding conflicts, the mapping computing entity 110 may select appropriate launch locations to minimize the total distance travelled by the manual delivery vehicle 100 along the delivery route. For example, if autonomous delivery of a particular shipment/item may be achieved by launching from a first launch location or a second launch location, however launching from the second launch location would increase the distance travelled by the manual delivery vehicle 100 along the delivery route to add an additional manual delivery stop whereas launching from the first launch location would require the addition of an additional manual delivery vehicle route along a portion of the delivery route already scheduled to be travelled by the manual delivery vehicle 100, then the mapping computing entity 110 assigns the first launch location to the shipment/item.

In the event that the criteria for minimizing the distance travelled by the manual delivery vehicle 100 does not resolve outstanding conflicts, the mapping computing entity 110 may be configured to identify a launch location for one or more shipments/items to minimize the distance travelled by the autonomous vehicle 140. For example, the mapping computing entity 110 may be configured to select the launch location located geographically closer to the intended destination location for the shipment/item.

In the event that the criteria for minimizing the distance travelled by the autonomous vehicle 140 does not resolve outstanding conflicts, the mapping computing entity 110 may select a launch location corresponding to a manual delivery serviceable point having a longer estimated duration as the launch location for a particular shipment/item. For example, if the manual delivery vehicle 100 is expected to remain stationary at a first manual delivery serviceable point for a longer period of time than the expected time the vehicle will remain stationary at a second manual delivery serviceable point, the mapping computing entity 110 is configured to select the first manual delivery serviceable point as the launch location for the shipment/item.

In the event that the criteria for selecting a launch location having an expected longer duration does not resolve outstanding conflicts, the mapping computing entity 110 may select the earliest-in-time launch location along the manual delivery vehicle route as the launch location for autonomous delivery of a shipment/item.

Finally, as a fail-safe, the mapping computing entity 110 may be configured to randomly select a launch location for autonomous delivery for a shipment/item in the event none of the other criteria resolve outstanding conflicts in the selection of a launch location for a particular shipment/item.

It should be understood that, in certain embodiments, satisfying one of the delivery criteria may conceptually conflict with a separate delivery criteria. For example, maximizing the number of autonomous deliveries may cause the manual delivery vehicle 100 to travel a distance greater than otherwise possible. In such embodiments, the hierarchical nature of the delivery criteria resolves such conflicts, because once a delivery criteria solves a delivery conflict and selects an appropriate launch location for delivering a shipment/item autonomously, the mapping computing entity 110 does not further consider lower-ranked (or higher ranked) delivery criteria.

2. Selecting One of a Plurality of Autonomous-Delivery Eligible Shipments/Items for Reclassification as a Manual Delivery Serviceable Point.

In certain embodiments, applicable autonomous delivery criteria may indicate that only a subset of possible autonomous-delivery eligible shipments/items may actually be delivered autonomously. As indicated above, one potential reclassification criteria for identifying which of a plurality of shipments/items should be reclassified to be manual delivery eligible may be to identify a shipment/item that is already along an existing portion of a manual delivery vehicle route. However, certain embodiments may apply a reclassification criteria hierarchy, similar to the delivery criteria hierarchy described above. In various embodiments, the mapping computing entity 110 may be configured to apply criteria of decreasing identified importance to the plurality of possible shipments/items for reclassification until existing conflicts are resolved.

In certain embodiments, the reclassification criteria hierarchy may cause the mapping computing entity 110 to analyze a plurality of autonomous delivery conflicts simultaneously to generate an optimal delivery plan for the manual delivery vehicle 100. The reclassification criteria may be analyzed in combination (e.g., simultaneously) with the delivery criteria to create the optimal delivery plan for the manual delivery vehicle 100, for example to ensure that reclassification of various deliveries does not substantially increase the resources required to complete a delivery route (e.g., increasing delivery route time, decreasing number of autonomous deliveries, increasing estimated manual delivery vehicle fuel usage, and/or the like). An example reclassification criteria hierarchy is discussed below, although it should be understood that any criteria or combination of criteria may be utilized to resolve conflicts.

As an example, a reclassification criteria hierarchy may consider the criteria listed in the chart below, beginning with the criteria identified as having the highest importance, and sequentially considering additional criteria having descending importance until the conflict is resolved.

| Importance Ranking | Criteria |
|---|---|
| 1 | Maximizing the total number of autonomous deliveries. |
| 2 | Minimizing the distance travelled by the manual delivery vehicle along the delivery route. |
| 3 | Minimizing the distance travelled by the autonomous vehicles. |
| 4 | Providing an autonomous delivery preference to delivery locations having identified characteristics. |
| 5 | Random selection. |
| 6 | Maximizing the total number of autonomous deliveries. |

In certain embodiments, various shipments/items may be selectively reassigned for manual delivery to optimize the delivery of a plurality of shipments/items. For example, reassigning a particular shipment/item for manual delivery may result in a change in the route assigned to a corresponding manual delivery vehicle 100 that enables an increase in the number of shipments/items to be autonomously delivered. As a specific example, reassigning a shipment/item for manual delivery may reroute the manual delivery vehicle 100 along a street that would not have been traveled by the manual delivery vehicle but for the reassignment. That newly traveled street may be nearer to a plurality of autonomous delivery-eligible delivery serviceable points than any location along the prior manual delivery vehicle route, such that a greater number of shipments/items may be delivered autonomously as a result of the reassignment.

Thus, in instances in which two (or more) manual delivery vehicle route alternatives may be selected, wherein each route alternative results in at least one package being delivered manually and at least one package being delivered autonomously, the mapping computing entity 110 may utilize the reclassification criteria to select the manual delivery vehicle route alternative which results in the greatest number of shipments/items being eligible for autonomous delivery. As noted, the reclassification criteria may be applied after a manual delivery vehicle route is established (in which case the reclassification criteria may cause a modification to the manual delivery vehicle route) and/or the reclassification criteria may be applied during generation of the manual delivery vehicle route.

In the event that the reclassification criteria for maximizing the total number of autonomous deliveries does not resolve outstanding conflicts (e.g., for reassigning a subset of a plurality of shipments/items for manual delivery), the mapping computing entity 110 may select identify one or more shipments/items for reassignment to minimize the total distance traveled by the manual delivery vehicle 100 along the delivery route. For example, if one autonomous delivery eligible shipment destination is located near an existing portion of a manual delivery vehicle route, and a second autonomous delivery eligible shipment destination is located farther away from the existing portion of the manual delivery vehicle route, such that reassigning the second autonomous delivery eligible shipment/item for manual delivery would increase the distance traveled by the manual delivery vehicle 100, the mapping computing entity 110 may be configured to reassign the first shipment/item for manual delivery, while assigning the second shipment/item for autonomous delivery.

In the event that the reclassification criteria for minimizing the distance travelled by the manual delivery vehicle 100 does not resolve outstanding conflicts for reassigning a subset of a plurality of shipments/item for manual delivery, the mapping computing entity 110 may select one or more shipments/items for reassignment to manual delivery to minimize the distance travelled by the one or more autonomous vehicles 140. Because the autonomous vehicles 140 may have limited flight times (e.g., due to limited onboard power supplies), the mapping computing entity 110 may reassign one or more shipments/items for manual delivery to minimize the total distance travelled by the autonomous vehicles 140, thereby minimizing the risk of unanticipated power failures while the autonomous vehicles 140 are delivering shipments/items and are positioned away from the manual delivery vehicle 100.

In the event that the reclassification criteria for minimizing the distance travelled by the autonomous vehicles 140 does not resolve outstanding conflicts, the mapping computing entity 110 may select one or more shipments/items for reassignment to manual delivery to provide a preference for autonomous delivery to delivery destinations having one or more identified characteristics. For example, a delivery destination may receive more than a threshold number of shipments/items in a given time period (e.g., each week), the delivery destination may be associated with a delivery customer who has paid for premium autonomous delivery services, the delivery destination may have a favorable autonomous delivery configuration (e.g., minimal airborne obstructions, low crime rates, secure delivery location, predictable landing location for the autonomous vehicle 140 at the delivery destination, and/or the like), and/or the like. In such embodiments, the mapping computing entity 110 may retrieve information/data stored within a delivery destination profile and/or a customer profile to determine whether a particular delivery destination satisfies one or more preference criteria when reassigning shipments/items for manual delivery. Responsive to determining that a particular destination serviceable point and/or customer profile satisfies the preference criteria, the mapping computing entity 110 may reassign a different shipment/item for manual delivery such that a shipment/item destined for the delivery serviceable point determined to satisfy the preference criteria is delivered autonomously.

Finally, as a fail-safe, the mapping computing entity 110 may be configured to randomly select one or more shipments/items for reassignment to manual delivery in the event that none of the other criteria resolve outstanding conflicts in the selection of a shipment/item to be reassigned. The random selection may be performed according to parameters that ensure that the outstanding conflict is resolved by the random selection. For example, the random selection may be limited to only those shipments/items for which a conflict has arisen, such that the selection of one or more of the shipments/items for reassignment necessarily resolves the outstanding conflict.

As mentioned above, satisfying one of the reassignment criteria may conceptually conflict with a separate reassignment criteria. For example, maximizing the number of autonomous deliveries may cause the manual delivery vehicle 100 to travel a distance greater than otherwise possible. In such embodiments, the hierarchical nature of the reassignment criteria resolves such conflicts, because once a delivery criteria solves a delivery conflict and selects an appropriate launch location for delivering a shipment/item autonomously, the mapping computing entity 110 does not further consider lower-ranked (or higher ranked) delivery criteria.

E. Executing a Delivery Route

Once various shipments/items to be delivered by a particular manual delivery vehicle 100 have been assigned for autonomous delivery and/or manual delivery, the mapping computing entity 110 establishes a final delivery route (e.g., an ordered listing of deliveries to be performed by a manual delivery vehicle 100 and/or an assigned travel path for the manual delivery vehicle 100, including the location of scheduled stops for the manual delivery vehicle 100) and launch locations for one or more autonomous vehicles 140 to deliver shipments/items between the manual delivery vehicle 100 and the destination serviceable point corresponding to the shipments/items. In certain embodiments, the final delivery route may be stored in a memory associated with the mapping computing entity 110, and/or may be transmitted to an onboard computing entity for the manual delivery vehicle 100, a user computing entity 105 carried by the manual delivery vehicle operator, the onboard control system of the autonomous vehicles 140, and/or the like. In certain embodiments, the final delivery route may be viewable via a display associated with the computing entity. For example, the computing entity may be configured to generate a graphical display of a map indicating the assigned travel path for the manual delivery vehicle 100, the location of various manual delivery stops (e.g., indicated by one or more icons), the launch location for various autonomous vehicles 140 (e.g., indicated by one or more icons), the expected travel path for the various autonomous vehicles 140, the destination serviceable points for the autonomously delivered shipments/items (e.g., indicated by one or more icons), and/or the like.

In operation, the execution of various delivery (and/or pick-up) processes defined for the delivery route may be based at least in part on the location of the manual delivery vehicle 100 along the assigned manual delivery route (and/or the location of the manual delivery vehicle 100 relative to one or more delivery stops included in the ordered listing of delivery stops for the manual delivery vehicle 100). As noted, the manual delivery vehicle operator may be informed of the assigned manual delivery vehicle route via one or more computing entities onboard the manual delivery vehicle 100 and/or carried by the manual delivery vehicle operator. The manual delivery vehicle 100 may then traverse the assigned delivery route to proceed to various manual delivery serviceable points. As the manual delivery vehicle 100 moves, the onboard computing entity monitors the current location of the manual delivery vehicle 100 relative to established launch locations for the autonomous vehicles 140. Upon reaching an established launch location (e.g., which may be at a manual delivery serviceable point and/or any point along the assigned manual delivery vehicle route), the onboard computing entity of the manual delivery vehicle provides signals to onboard launch mechanisms of the manual delivery vehicle 100 and/or to the onboard control system of the autonomous vehicle 140 to initialize a launch sequence for the autonomous vehicle 140.

Once the autonomous vehicle 140 has launched from the manual delivery vehicle 100, the manual delivery vehicle 100 (and/or manual delivery vehicle operator) continue to perform assigned delivery operations for manual delivery shipments/items. Simultaneously, the autonomous vehicle 140 navigates to an assigned destination serviceable point for an autonomous delivery shipment/item, utilizing onboard location determining devices, onboard sensors, and/or the like to travel to the desired destination serviceable point while avoiding obstacles along the way. Once at the destination serviceable point, the autonomous vehicle 140 locates the appropriate delivery location (e.g., via onboard sensors), and deposits the shipment/item at the appropriate delivery serviceable point (e.g., on a front porch, on a balcony, on a printed delivery target, and/or the like). Once the autonomous vehicle 140 deposits the shipment/item at the delivery serviceable point, the autonomous vehicle 140 returns to the manual delivery vehicle 100. In various embodiments, the manual delivery vehicle 100 may have moved to a new location while the autonomous vehicle 140 was delivering the shipment/item, and accordingly the onboard control system of the autonomous vehicle 140 may be in electronic communication with the onboard computing entity of the manual delivery vehicle 100 to ascertain the current location of the manual delivery vehicle 100. The manual delivery vehicle 100 may periodically send updated location information/data to the autonomous vehicle 140, such that the autonomous vehicle 140 navigates to the location of the manual delivery vehicle 100. Accordingly, even if the manual delivery vehicle 100 is moving, the autonomous vehicle 140 receives continuously updated location information/data for the manual delivery vehicle 100. Once the autonomous vehicle 140 reaches the manual delivery vehicle 100, the autonomous vehicle 140 may land on the manual delivery vehicle 100 (e.g., via one or more landing mechanisms of the manual delivery vehicle 100). The autonomous vehicle 140 may then be stored in association with the manual delivery vehicle 100 and/or prepared for a future autonomous delivery (e.g., at a next assigned launch location).

In certain embodiments, the autonomous vehicle 140 may be configured to transmit location information/data to the manual delivery vehicle 100 onboard computing entity, such that the manual delivery vehicle 100 onboard computing entity may track the location of each autonomous vehicle 140 relative to the location of the manual delivery vehicle 100. In certain embodiments, the autonomous vehicle 140 may be configured to transmit a mayday alert to the manual delivery vehicle 100 if the autonomous vehicle 140 becomes disabled or trapped during an autonomous delivery. In such embodiments, the manual delivery vehicle operator may be informed of the location of the disabled and/or trapped autonomous vehicle 140, such that the manual delivery vehicle operator may deviate from a planned delivery route to retrieve the autonomous vehicle 140.

Moreover, in certain embodiments, the manual delivery vehicle 100 onboard computing entity may be configured to monitor the location of the autonomous vehicle 140 relative to manual delivery vehicle 100 to ensure the autonomous vehicle 140 is capable of returning to the manual delivery vehicle 100 (e.g., based on an estimated travel range of the autonomous vehicle 140). The manual delivery vehicle 100 onboard computing entity may be configured to generate an alert responsive to determining that the manual delivery vehicle 100 is exiting an estimated travel range of the autonomous vehicle 140, such that the manual delivery vehicle operator may stop the manual delivery vehicle 100 to await the return of the autonomous vehicle 140.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

In certain embodiments, a computing system determining whether autonomous delivery is available as discussed herein may be further configured to modify shipping schedules for various computing entities to synchronize deliveries among shipments/items destined for nearby addresses, as discussed in co-pending U.S. patent application Ser. No. 14/988,136, filed on Jan. 5, 2016, the contents of which is incorporated herein by reference in its entirety. For example, responsive to determining that autonomous delivery is unavailable for a shipment/item during an originally scheduled delivery date, the computing entity may query delivery schedules for adjacent delivery dates (e.g., a date before and/or a date after the original delivery date) to determine whether autonomous delivery would be available for the shipment/item if delivered on one of the adjacent delivery dates (e.g., based on the location of deliveries along a defined delivery route for the adjacent delivery dates). Responsive to determining that autonomous delivery would be available on an adjacent delivery date, the computing entity may be configured to modify the service level for the shipment/item (e.g., by speeding up shipment/item by increasing shipping level or by slowing down shipment/item by decreasing a shipping level) such that the autonomous delivery eligible item is delivered on the identified adjacent delivery date.

The invention claimed is:

1. An autonomous vehicle item delivery method for autonomously delivering at least one item to a destination location, the method comprising:
   determining at least one autonomous delivery-eligible item satisfies autonomous delivery criteria;
   identifying at least one manual delivery location as a launch location for an autonomous vehicle to depart a delivery vehicle for final delivery of the at least one autonomous delivery-eligible item satisfying the autonomous delivery criteria to the destination location; and
   causing the autonomous vehicle to depart from the delivery vehicle to deliver the at least one autonomous delivery-eligible item satisfying the autonomous delivery criteria to the destination location.

2. The method of claim 1, wherein the launch location is located within a predefined distance of the destination location for the at least one autonomous delivery-eligible item.

3. The method of claim 1, wherein identifying the at least one manual delivery location as the launch location comprises identifying a location where the delivery vehicle crosses a radius area of the destination location.

4. The method of claim 1, wherein identifying the at least one manual delivery location as the launch location is based on a determination that the delivery vehicle is estimated to remain at a particular manual delivery serviceable point for more than a threshold amount of time.

5. The method of claim 1, wherein the autonomous delivery criteria comprise a hierarchy of criteria for identifying the launch location, the hierarchy of criteria ranked for maximizing delivery of a total number of autonomous delivery-eligible items.

6. The method of claim 1, wherein identifying the at least one manual delivery location as the launch location comprises an analysis of simultaneous conflicts when delivering a plurality of autonomous delivery-eligible items.

7. The method of claim 1, further comprising reclassifying the at least one autonomous delivery-eligible item as at least one manual delivery-eligible item.

8. One or more non-transitory computer storage media having computer-executable instructions embodied thereon, that when executed by at least one processor, cause a computer system to perform a method for autonomously delivering at least one item to an autonomous delivery location, the method comprising:
receiving item data for the at least one item; and
determining a launch location along a manual delivery vehicle route from a first manual delivery location to the autonomous delivery location, the determining based at least in part on the item data and one or more established clusters of autonomous delivery locations, wherein an autonomous vehicle is configured to depart a manual delivery vehicle at the launch location to deliver the at least one item to the autonomous delivery location.

9. The media of claim 8, wherein the one or more established clusters of autonomous delivery locations comprise serviceable points for autonomous deliveries within a single geofenced area.

10. The media of claim 9, wherein the single geofenced area comprises a number above a threshold number of the serviceable points along the manual delivery vehicle route.

11. The media of claim 9, wherein the single geofenced area is defined around a neighborhood comprising either a plurality of residences or a particular subsection of a neighborhood.

12. The media of claim 8, wherein the one or more established clusters of autonomous delivery locations are determined based on location information of manual delivery locations.

13. The media of claim 8, wherein the item data comprises shipment instructions for the at least one item.

14. The media of claim 8, further comprising:
prior to determining the launch location, determining a recipient of the at least one item prefers autonomous delivery to manual delivery;
updating the item data based on the determining the recipient of the at least one item prefers autonomous delivery; and
prior to determining the launch location, determining the item data satisfies autonomous delivery criteria.

15. The media of claim 8, further comprising:
determining that a recipient of a second item prefers manual delivery to autonomous delivery; and
updating item data of the second item to indicate that autonomous delivery is not available for the second item.

16. An autonomous vehicle item delivery method for autonomously delivering at least one item to a destination location, the method comprising:
receiving item data for the at least one item; and
dynamically establishing a launch location along a manual delivery route based at least in part on the item data and on an estimated elapsed delivery time for delivering the at least one item to a particular manual delivery serviceable point along the manual delivery route, wherein an autonomous vehicle is configured to depart a manual delivery vehicle at the launch location to deliver the at least one item to the destination location corresponding to the particular manual delivery serviceable point.

17. The method of claim 16, further comprising:
prior to dynamically establishing the launch location, determining the estimated elapsed delivery time using historical delivery data of historical deliveries to the particular manual delivery serviceable point.

18. The method of claim 17, wherein the historical delivery data comprises an amount of time for a driver to: unbuckle, disembark from the manual delivery vehicle, and return to the manual delivery vehicle.

19. The method of claim 16, wherein the item data for the at least one item comprises an item size, an item weight, and contents of the item.

20. The method of claim 16, wherein the estimated elapsed delivery time was determined based on an amount of time the manual delivery vehicle would be positioned within a delivery radius surrounding the particular manual delivery serviceable point.

* * * * *

UNITED STATES PATENT AND TRADEMARK OFFICE
CERTIFICATE OF CORRECTION

| | | |
|---|---|---|
| PATENT NO. | : 11,435,744 B2 | Page 1 of 1 |
| APPLICATION NO. | : 16/921454 | |
| DATED | : September 6, 2022 | |
| INVENTOR(S) | : Jeffrey Cooper | |

It is certified that error appears in the above-identified patent and that said Letters Patent is hereby corrected as shown below:

In the Specification

Column 16, Line 57, delete "1x" and insert -- 1X --.

Column 30, Line 16, delete "1000l," and insert -- 1000l, --.

Column 30, Line 57, delete "1000l)," and insert -- 1000l), --.

Column 30, Line 59, delete "1000l" and insert -- 1000l --.

Column 30, Line 64, delete "1000l," and insert -- 1000l, --.

Column 31, Line 3, delete "1000l" and insert -- 1000l --.

Signed and Sealed this
Fourth Day of April, 2023

*Katherine Kelly Vidal*

Katherine Kelly Vidal
*Director of the United States Patent and Trademark Office*